(12) United States Patent
Chen

(10) Patent No.: US 7,111,010 B2
(45) Date of Patent: Sep. 19, 2006

(54) METHOD AND SYSTEM FOR MANAGING EVENT ATTRIBUTES

(75) Inventor: Li-Wen Chen, Cupertino, CA (US)

(73) Assignee: Hon Hai Precision Industry, Ltd., (TW)

( * ) Notice: Subject to any disclaimer, the term of this patent is extended or adjusted under 35 U.S.C. 154(b) by 643 days.

(21) Appl. No.: 09/963,145

(22) Filed: Sep. 24, 2001

(65) Prior Publication Data

US 2002/0059183 A1    May 16, 2002

Related U.S. Application Data

(60) Provisional application No. 60/309,633, filed on Aug. 1, 2001, provisional application No. 60/309,214, filed on Jul. 31, 2001, provisional application No. 60/265,373, filed on Sep. 25, 2000, provisional application No. 60/235,390, filed on Sep. 25, 2000.

(51) Int. Cl.
*G06F 17/00* (2006.01)

(52) U.S. Cl. .................................. 707/102; 703/17
(58) Field of Classification Search ................ 707/4, 707/100, 102; 703/17
See application file for complete search history.

(56) References Cited

U.S. PATENT DOCUMENTS

| | | | |
|---|---|---|---|
| 4,965,758 A * | 10/1990 | Sherman | .......................... 716/6 |
| 4,972,504 A | 11/1990 | Daniel, Jr. et al. | |
| 5,036,314 A | 7/1991 | Barillari et al. | |
| 5,168,445 A | 12/1992 | Kawashima et al. | |
| 5,191,522 A | 3/1993 | Bosco et al. | |
| 5,261,041 A * | 11/1993 | Susman | ...................... 345/473 |
| 5,299,115 A | 3/1994 | Fields et al. | |
| 5,546,576 A * | 8/1996 | Cochrane et al. | ............... 707/2 |
| 5,615,109 A | 3/1997 | Eder | |
| 5,659,724 A * | 8/1997 | Borgida et al. | ................. 707/3 |
| 5,701,460 A * | 12/1997 | Kaplan et al. | ................... 707/3 |
| 5,715,450 A | 2/1998 | Ambrose et al. | |
| 5,717,835 A | 2/1998 | Hellerstein | |
| 5,721,903 A | 2/1998 | Anand et al. | |
| 5,758,355 A | 5/1998 | Buchanan | |
| 5,787,437 A | 7/1998 | Potterveld et al. | |
| 5,794,246 A | 8/1998 | Sankaran et al. | |
| 5,806,061 A | 9/1998 | Chaudhuri et al. | |
| 5,822,743 A | 10/1998 | Gupta et al. | |
| 5,832,503 A | 11/1998 | Malik et al. | |
| 5,854,746 A | 12/1998 | Yamamoto et al. | |
| 5,870,746 A | 2/1999 | Knutson et al. | |
| 5,873,096 A | 2/1999 | Lim et al. | |

(Continued)

FOREIGN PATENT DOCUMENTS

WO    WO 00-57311    9/2000

OTHER PUBLICATIONS

Ronald J. Brachman, et al., Mining Busines Databases, Communications of the ACM, vol. 39, No. 11, Nov. 1996.

(Continued)

*Primary Examiner*—Wayne Amsbury
(74) *Attorney, Agent, or Firm*—Fliesler Meyer LLP

(57) ABSTRACT

The present invention provides techniques for managing and analyzing business information. Specific embodiments provide persons with business or other non-technical fields with the capability to create, edit, and work with data models, profiles, and reports for business and other information. Specific embodiments can enable business and other non-technical users with enhanced understanding of information, and greater capabilities to manipulate relationships between various data entities in databases, for example.

30 Claims, 40 Drawing Sheets

U.S. PATENT DOCUMENTS

| | | | |
|---|---|---|---|
| 5,893,075 A | | 4/1999 | Plainfield et al. |
| 6,012,152 A | * | 1/2000 | Douik et al. ................... 714/26 |
| 6,044,374 A | | 3/2000 | Nesamoney et al. |
| 6,049,821 A | | 4/2000 | Theriault et al. |
| 6,064,375 A | | 5/2000 | Velez et al. |
| 6,151,601 A | | 11/2000 | Papierniak et al. |
| 6,154,213 A | * | 11/2000 | Rennison et al. ........... 715/854 |
| 6,823,299 B1 | * | 11/2004 | Contreras et al. ............. 703/14 |

OTHER PUBLICATIONS

Peter Brooks, March of the Data Marts, DBMS, vol. 10, No. 3, Mar. 1997 (printed from www.dialogweb.com).

Michael Krippendorf and Il-Yeol Song, The Translation of Star Scheme into Entity-Relationship Diagrams, IEEE, 1997, pp. 390-395.

Joseph M. Firestone, Object-Oriented Data Warehousing, Executive Information Systems, Inc., White Paper No. Five, Aug. 7, 1997.

Joe Greene and Advanced Information Systems, INC., Oracle8 Server Unleashed, Chapter 30—Data Warehouses, 1998, Sams Publishing (printed from www.books24x7.com).

Vivekanand Gopalkrishnan et al., Star/Snowflake Schema Driven Object-Relational Data Warehouse Design and Query Processing Strategies, Lecture Notes in Computer Science, No. 1676, pp. 11-22, Springer-Verlag, 1999.

* cited by examiner

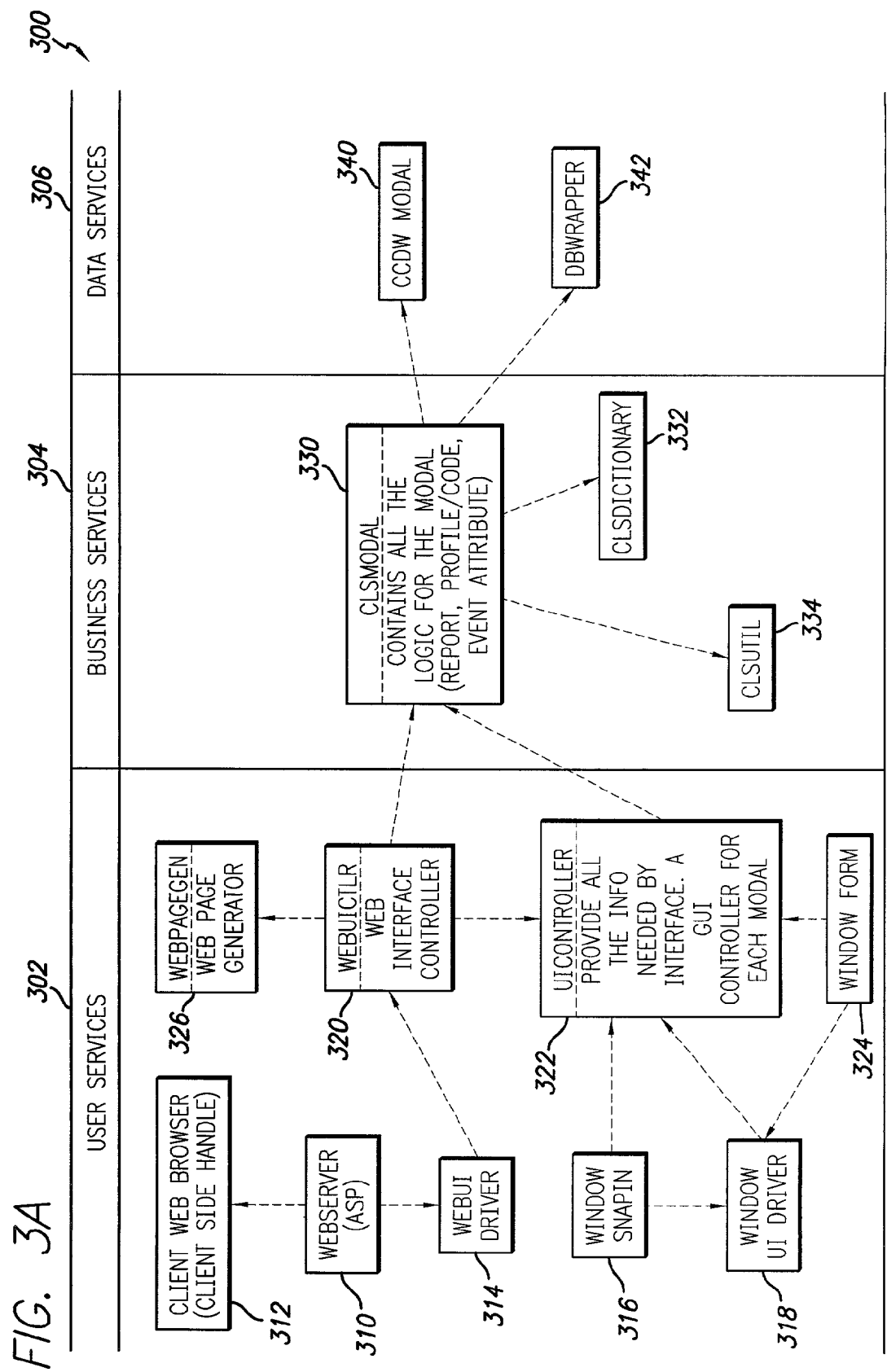

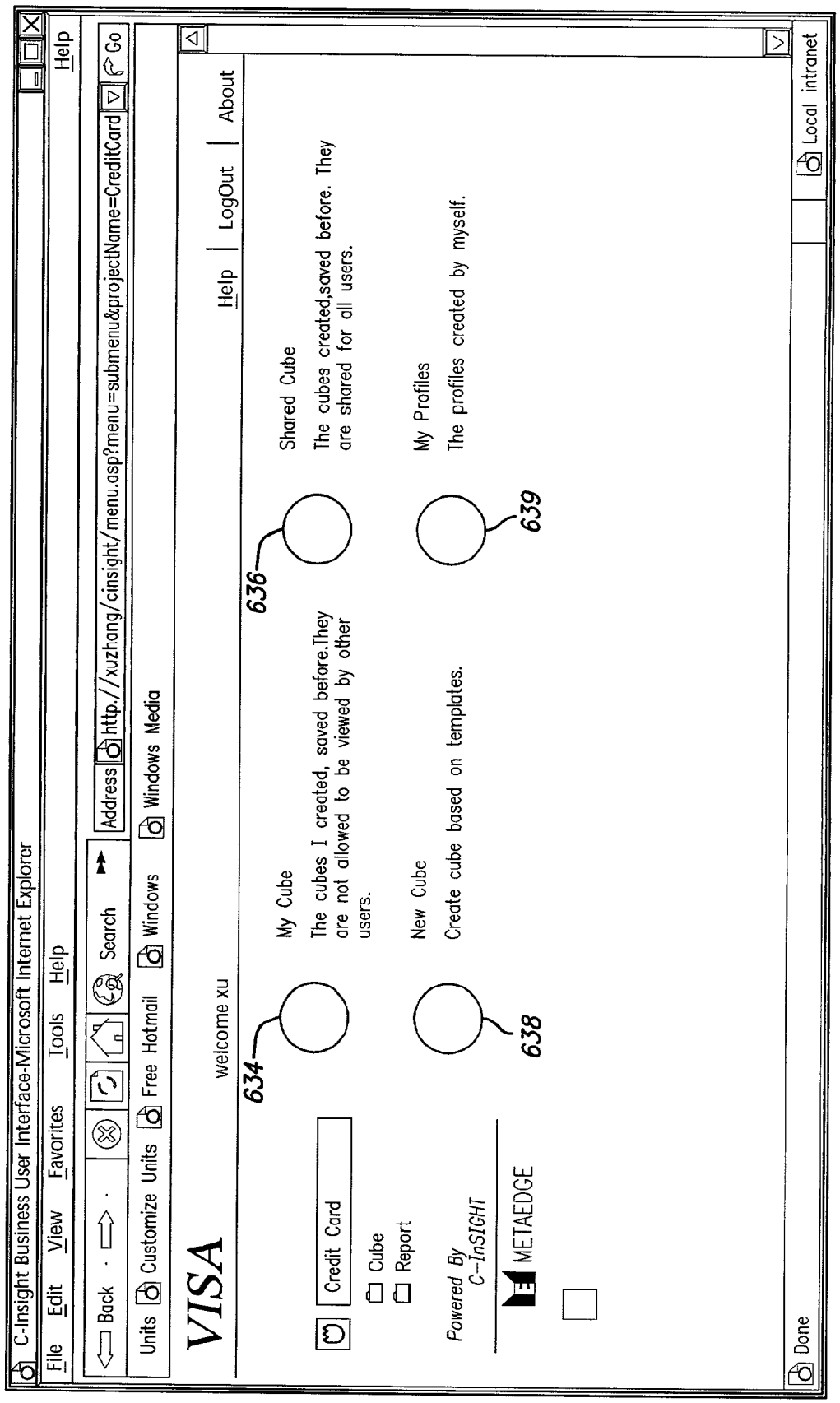

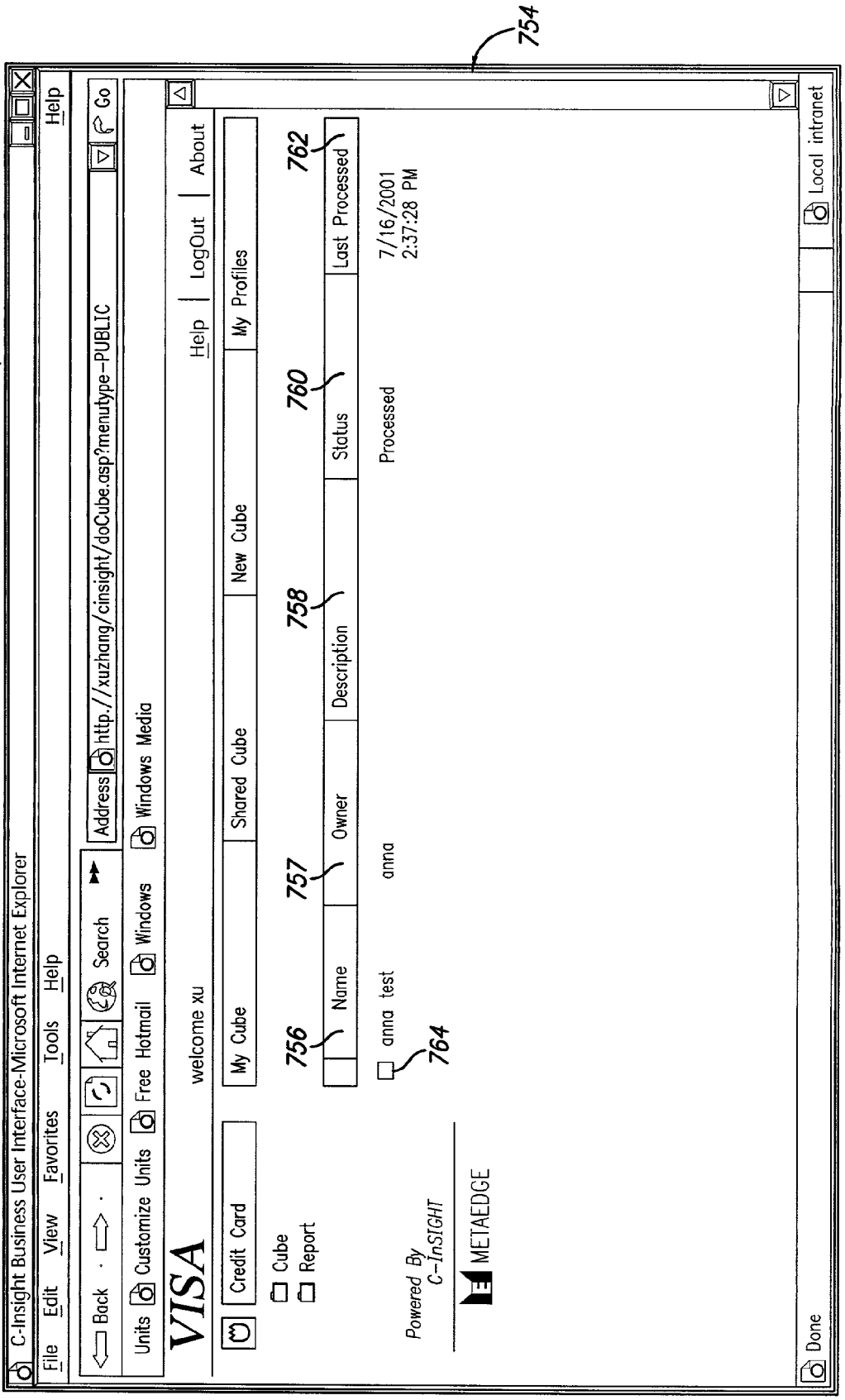

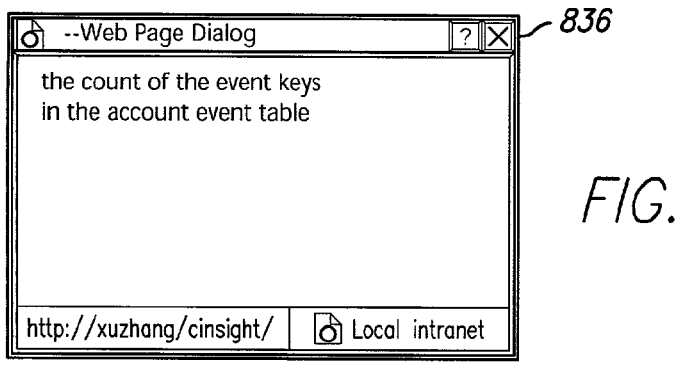
FIG. 8C
FIG. 8D
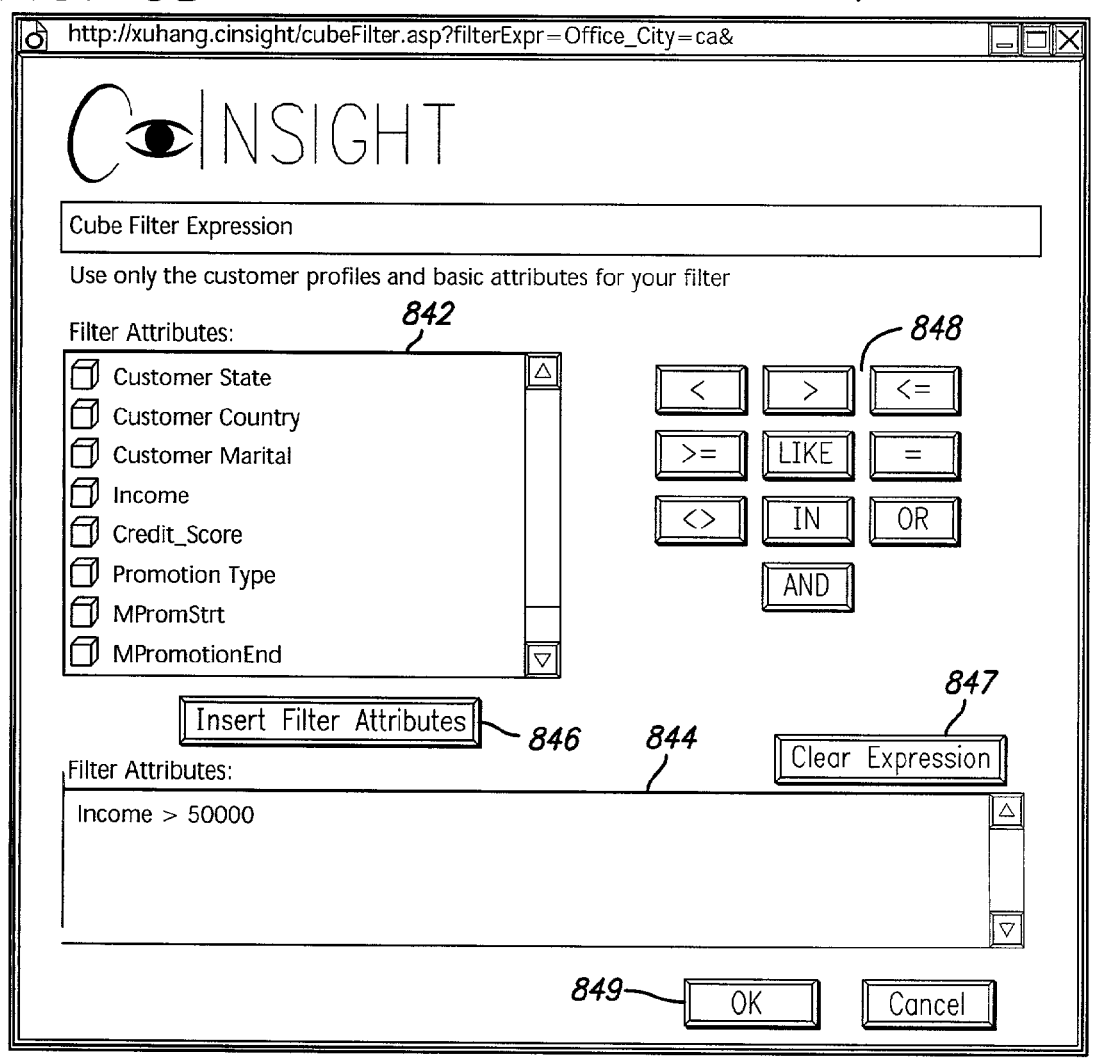

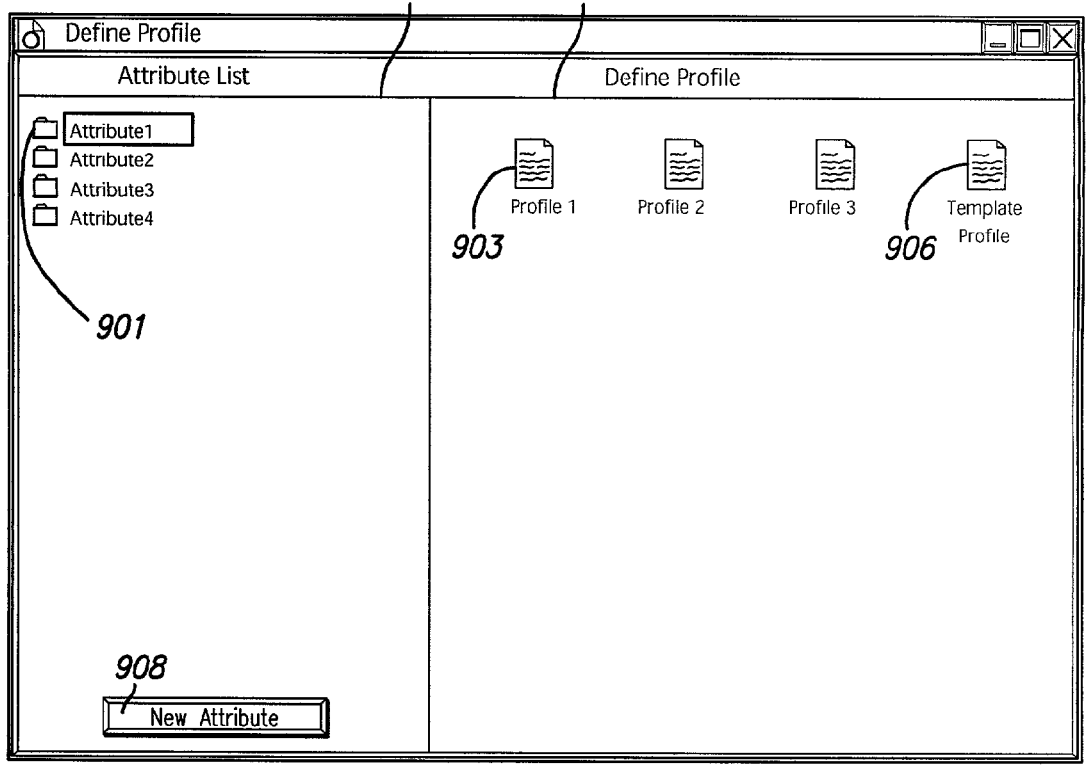
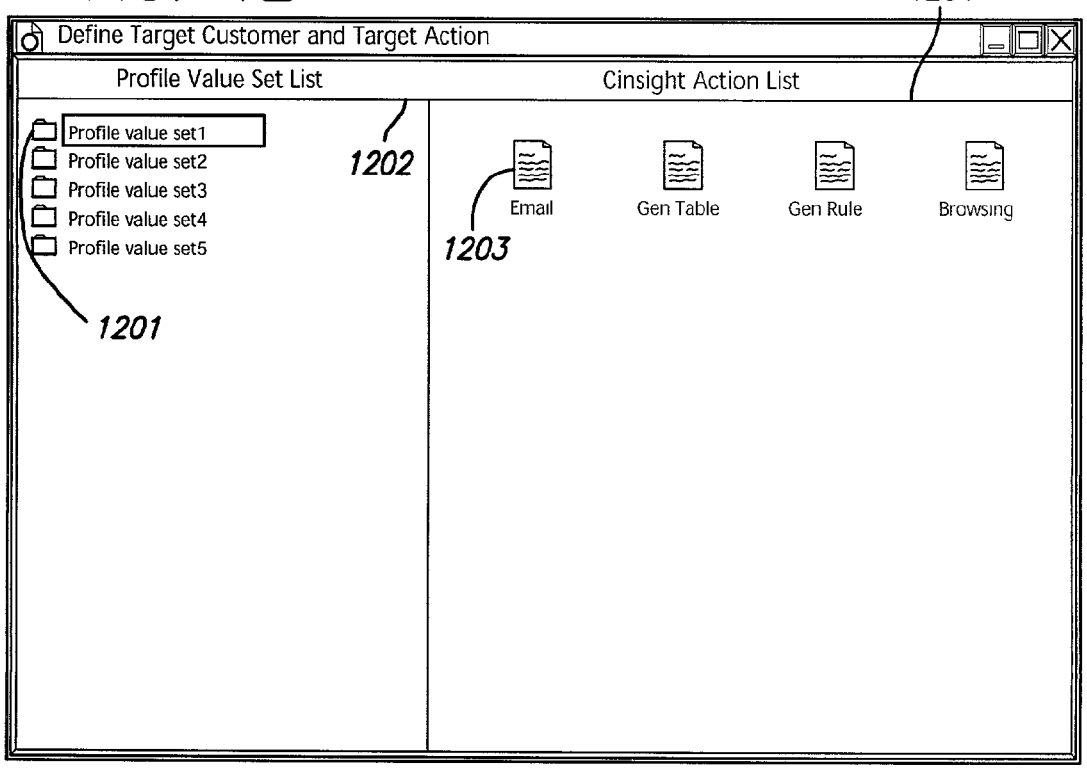

VISA welcome xu                                   Help | LogOut | About

Credit Card

| My Cube | Shared Cube | New Cube | | My Profiles |
|---|---|---|---|---|
| | Delete All | Process All | Reset | Submit |

| | Name | Description | Status | Last Processed | Action | Delete | Process |
|---|---|---|---|---|---|---|---|
| ☐ | ProfileIncome | anna's income code | New | | | ☐☐☐☐☐☐ | ☐ |
| ☐ | GenderProf | gendercode | New | | | ☐☐☐☐☐☐ | ☐ |
| ☐ | GenderProf | b | New | | | ☐☐☐☐☐☐ | ☐ |
| ☐ | a | | | | | | |
| ☐ | genderProf2 | xu's genderCode | New | | | ☐☐☐☐☐☐ | ☐ |
| ☐ | IncomeByRange | IncomeByRangeCode | New | | | ☐☐☐☐☐☐ | ☐ |
| ☐ | incomePerEvPlot | incomeByPerev | New | | | ☐☐☐☐☐☐ | ☐ |
| ☐ | ProfileGender | income attribute Gender segmentation code | New | | | ☐☐☐☐☐☐ | ☐ |
| ☐ | IncomeByRange | Uses the customers' income (k) Groups by low: low-middle; middle; | New | | | ☐☐☐☐☐ | ☐ |
| ☐ | GenderCode | gender | New | | | ☐☐☐☐☐ | ☐ |
| ☐ | IncomePerGender | Uses the customers' income (k) Groups by low: low-middle; middle; | New | | | ☐☐☐☐☐ | ☐ |
| ☐ | CanderCodeA | gender | New | | | ☐☐☐☐☐ | ☐ |
| ☐ | IncomePerEv | Uses the customer income (k) Groups by low: low-middle; middle; | Modified | | | ☐☐☐☐☐ | ☐ |
| ☐ | CodeIncome | Uses the customer income (k) Groups by low: low-middle; middle; | New | | | ☐☐☐☐☐ | ☐ |

Submit

☐ Cube
☐ Report

Powered By
C-InSIGHT

METAEDGE

*1102* — GenderProf
*1104* — GenderCode
*1106* — (action icons)
*1108* — (action icon)
*1110* — (checkbox column)
*1112* — (checkbox column)

METHOD AND SYSTEM FOR MANAGING EVENT ATTRIBUTES

CROSS-REFERENCES TO RELATED APPLICATIONS

This application claims priority from the following U.S. Provisional Patent Applications, the disclosure of which, including all appendices and all attached documents, is incorporated by reference in its entirety for all purposes:

U.S. Provisional Patent Application Ser. No. 60/235,390, to Li-Wen Chen entitled, "METHOD AND SYSTEM FOR ANALYZING CUSTOMER BEHAVIOR BASED UPON EVENT ATTRIBUTES," filed Sep. 25, 2000;

U.S. Provisional Patent Application Ser. No. 60/235,373, to Li-Wen Chen entitled, "USER INTERFACE AND METHOD FOR ANALYZING CUSTOMER BEHAVIOR BASED UPON EVENT ATTRIBUTES," filed Sep. 25, 2000;

U.S. Provisional Patent Application Ser. No. 60/309,214, to Li-Wen Chen entitled, "BUSINESS USER INTERFACE DESIGN SYSTEM AND METHOD," filed Jul. 31, 2001; and U.S. Provisional Patent Application Ser. No. 60/309,633, to Li-Wen Chen entitled, "METHOD AND SYSTEM FOR MANAGING EVENT ATTRIBUTES," filed Aug. 1, 2001.

The following commonly-owned co-pending applications, including this one, are being filed concurrently and the others are hereby incorporated by reference in their entirety for all purposes:

1. U.S. patent application Ser. No. 09/963,145, filed Sep. 24, 2001, by Li-Wen Chen entitled, "METHOD AND SYSTEM FOR MANAGING EVENT ATTRIBUTES,"; and
2. U.S. patent application Ser. No. 09/963,062, filed Sep. 24, 2001 by Li-Wen Chen, entitled, "USER INTERFACE AND METHOD FOR ANALYZING CUSTOMER BEHAVIOR BASED UPON EVENT ATTRIBUTES,".

BACKGROUND OF THE INVENTION

The present invention relates generally to techniques for providing decision support, and in particular to techniques for visualizing and relationships among marketing and other business information.

Decision support technologies provide business information consumers with tools and techniques for analyzing information. Techniques such as statistics, report generators, such as On Line Analytical Processing (OLAP), and so forth, provide ways for business decision makers to use business information in making business decisions. However, many conventional approaches are often limited in scope or capability, providing only a static view of the whole picture.

While certain advantages to conventional approaches are perceived, opportunities for further improvement exist. For example, according to conventional technologies, modeling of data is done using rudimentary database relationship diagrams. While these diagrams explain the information in a manner understandable to database system programmers and other such persons having a technical background, these methods are not convenient for business and marketing professionals.

What is needed are improved techniques for business and marketing professionals in managing and analyzing information.

SUMMARY OF THE INVENTION

The present invention provides techniques for managing and analyzing event based business information. Specific embodiments provide models that enable persons with business or other non-technical fields understand and manipulate relationships between various data entities in databases, which represent events and information about events. Event based information can provide the business decision maker with valuable insights into the customer's perception of an enterprises' product or service in the marketplace. For example, in accordance with specific embodiments of the present invention, event based attributes may be used to provide answers to event based activity questions, such as: (1) How many insurance claims have been opened, then closed, then reopened? (2) How many services have been cancelled within six months of subscription? (3) How many services have been in subscription for at least six months? Knowing the answer to these questions can assist the business decision maker with selecting and managing an appropriate market mix, maintaining quality of service, entry into new lines of business and the like.

In a representative embodiment, a method for managing information is provided. The method comprises, for example, receiving an input of information indicating one or more events. An input of one or more attributes is received for each event. One or more nodes are displayed for each of the one or more events. Further, one or more edges is displayed for two or more of the events. There are one or more nodes for each of the one or more events and the one or more edges for two or more events form a graph. The method further includes creating a query to a database based upon the graph.

In a specific embodiment, the method further comprises receiving an input indicating a filter expression for information in said database and storing said filter expression in said at least one node for each of said one or more events. In some embodiments, a graphical user interface (GUI) is used to define the filter expression. The attributes can comprise one or more of a time, an event type, an event value, for example. In a specific embodiment, the method further comprises receiving an input indicating an event duration expression for information in said database and storing said event duration expression in said at least one edge for each of said at least two of said plurality of events.

In a specific embodiment, the one or more edges is indicated by dragging and dropping a first one of the one or more events to a second one of the one or more events. The one or more nodes can correspond to one or more events. The one or more edges can correspond to a temporal relationship between any two or more events.

In a specific embodiment, the method further includes opening one or more nodes and selecting attribute information from a menu comprising a plurality of attributes for inclusion into the node. Further, the method can also include opening one or more edges and selecting attribute information from a menu comprising a plurality of attributes for inclusion into the edge.

In another representative embodiment, the invention provides a computer program product. The computer program product comprises code that receives an input of information indicating one or more events and code that receives for each event an input of one or more attributes. Code that displays at least one node for each of the one or more events is also included in the computer program product. Further, the computer program product can include code that displays one or more edges for at least two of the plurality of events.

The at least one node for each of the one or more events and the one or more edges for at least two of the plurality of events form a graph. The computer program product also includes code that creates a query to a database based upon the graph and a computer readable storage medium for holding the codes.

In a yet further representative embodiment, the invention provides an apparatus for managing information. The apparatus comprises a processor and a memory. The processor is operative to receive an input of information indicating one or more of events and to receive for each event an input of one or more of attributes. The processor is operative to display at least one node for each of the one or more of events and to display one or more of edges for at least two of the plurality of events. The at least one node for each of the one or more of events and the one or more of edges for at least two of the plurality of events form a graph. The processor is operative to create a query to a database based upon the graph.

In a representative embodiment, a method for managing information is provided. The method comprises, for example, displaying one or more profiles to a user. One or more cubes are also displayed. An input from a user indicating a selected one from the one or more profiles and a selected one from the one or more cubes is received. The method also includes updating a selected one from the one or more cubes with information from the selected one from the one or more profiles. In one representative embodiment, the one or more of profiles is added into the selected one from the one or more cubes replacing an existing dimension within the selected one from the one or more cubes. In another representative embodiment, the one or more profiles are redefined using segmentation codes and attributes. The method further comprises redefining the profiles using a graphical user interface (GUI). In some specific embodiments, the attributes, profiles and segmentation codes are combinable.

In a representative embodiment, access permissions control access to shared ones of the plurality of cubes and to restrict access to private ones of the plurality of cubes. In a representative embodiment the method further comprises browsing a cube's data and structure. The method further comprises opening the one or more cubes; and selecting the one or more cubes as a template.

In a representative embodiment the method further comprises defining a structure of a new cube based upon at least one component of an existing cube. In another representative embodiment, the method of claim 1 comprises indicating a selected one from the one or more profiles and a selected one from the one or more cubes comprises dragging and dropping the selected one from the one or more profiles to a selected one from the one or more cubes.

In a representative embodiment, a computer program product for managing information is provided. The computer program product comprises, for example, code that displays one or more profiles. Code that displays one or more cubes is also part of the computer program product. Further, the product can include code that receives an input from a user indicating a selected one from the one or more profiles and a selected one from the one or more cubes and code that updates the selected one from the one or more cubes with information from the selected one from the one or more profiles. A computer readable storage medium for holding the codes is also part of the computer program product.

In a representative embodiment, a system for managing data is provided. The system comprises, for example, a computer; an information store, operable to contain the data; a database interface software process that maintains the data in the information store; a metadata repository; and a web user interface (UI) driver software process that is operative to provide a user interface.

In a representative embodiment, an apparatus for managing information is provided. The apparatus includes a processor and a memory. The processor is operative to display one or more profiles, and to display one or more cubes. The processor is further operative to receive an input from a user indicating a selected one from the one or more profiles and a selected one from the one or more cubes. Further, the processor updates the selected one from the one or more cubes with information from the selected one from the one or more profiles.

In various specific embodiments, profiles may be added into cubes to replace existing dimensions. A GUI allows the users to redefine profiles with segmentation codes and attributes. Attributes, profiles and segmentation codes can be combined. Access permissions can be used to control access to shared cubes as well as to restrict access to private cubes. A browsing function provides the capability to browse a cube and view the cube's data and structure. Cubes may be opened, selected as templates, and the like. Then, a structure of a new cube may be defined based upon one or more of the components of an existing cube.

Numerous benefits are achieved by way of the present invention over conventional techniques. Specific embodiments according to the present invention provide techniques for working with information to analyze relationships underlying various components of information. Specific embodiments provide functionality that enables persons with business or other non-technical fields to understand and manipulate relationships between various data entities in databases, for example. Various applications are supported by specific embodiments. For example, multidimensional models, statistical computations, rule based systems, report generators, and the like can be used with various specific embodiments in order to enable the decision maker to understand, analyze and present relationships among various information entities.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 3A illustrates representative software architecture in a specific embodiment of the present invention.

FIG. 6D illustrates a representative menu screen in a specific embodiment of the present invention.

FIG. 7E illustrates a representative information browsing interface in a specific embodiment of the present invention.

FIGS. 8B–8C illustrate a representative create new cube structure interface in a specific embodiment of the present invention.

FIGS. 8D–8E illustrate a representative cube filter interface in a specific embodiment of the present invention.

FIG. 9A illustrates a representative define profile interface in a specific embodiment of the present invention.

FIG. 11 illustrates a representative profile interface in a specific embodiment of the present invention.

FIG. 12 illustrates a representative define target customer set interface in a specific embodiment of the present invention.

DESCRIPTION OF THE SPECIFIC EMBODIMENTS

Figure 1:
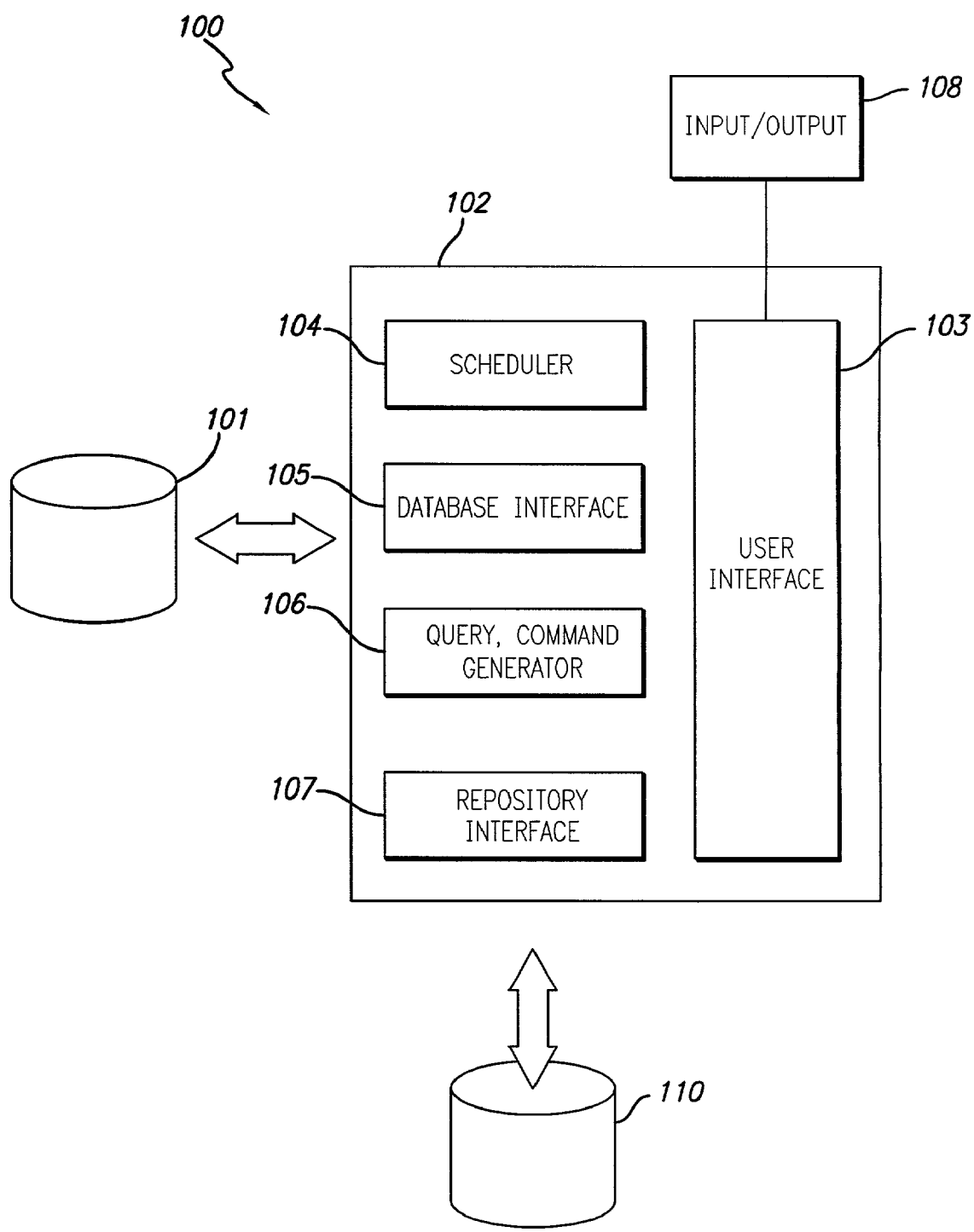
FIG. 1 illustrates a conceptual drawing of a representative architecture of a system suitable of embodying a decision support application in a specific embodiment of the present invention.

The present invention provides techniques for managing and analyzing business information. Specific embodiments provide persons with business or other non-technical fields with the capability to create, edit, and work with data models, profiles, and reports for business and other information. Specific embodiments can enable business and other non-technical users with enhanced understanding of information, and greater capabilities to manipulate relationships between various data entities in databases, for example.

The following definitional list contains terms that will be used herein to describe some of the many different embodiments of the present invention. This list is being provided to assist the reader and is not intended to limit the present invention to any particular embodiment.

Reverse Star Schema: A Reverse Star Schema is a subject focused data model in which a business subject comprises a focal point, and activity and/or event data related to the subject is organized in relation to the focal point. A Reverse Star Schema can comprise a federated star schema that can evolve and grow to include more embedded star schema.

Cube: An n-dimensional data set depicting one or more relationships among data in a database. Each cube can be "unfolded" to reveal component dimensions and fact tables. The fact tables comprise measurement data. Dimension tables comprise index data. Each cube may be modified to have new dimensions based upon a profile. Typically, new cubes are built by an information technology (IT) group within an enterprise. Specific embodiments enable business users to be able to create new reports by redefining dimensions within profile data of an existing report. Embodiments can provide business users the ability to discover meaningful metrics relative to business issues using such redefinition of previously created reports or templates.

Designers: A designer has an understanding of an enterprise's data. The data may be contained within a data warehouse, for example, or distributed throughout the enterprise. The designer can define database schemas, such as a Reverse Star Schema, for example, as well as attributes, profiles, cubes, jobs, maintenance policies, and the like. Accordingly, a Designer may have privileges to define/edit/read/ every object known to the system.

Business Users: A business user, also known as a power user, is an end user who has privileges including defining certain objects and access to reports. A business user typically understands business terms, such as reports, profiles, segmentations, attributes and business events, for example. The business user can define reports, cubes, profiles, segmentation codes based on a given Reverse Star Schema and the like, but may be isolated from defining/modifying the Reverse Star Schema. Business users can also generate target customer sets using a Window interface.

End Users: An end user can have privileges including read access for various types of reports, such as static reports and dynamic reports.

Attributes: Attributes are property data that describes a business entity, such as customers, suppliers, and the like. In specific embodiments, attributes are described using terms such as, gender, income, level, and the like.

Segmentation codes: One or more segmentation codes can be used to segment business data by defining ranges of attribute values. For example, a data attribute such as income level can be segmented into income levels of $0–$10,000; $10,001–$50,000; $50,001–$100,000; and over $100,000.

Profile: A profile comprises attributes and segmentation codes of interest to business users.

Event: An event represents customer activity found in event based transaction table. For example, in telecommunication event can be a subscription, a service conversion, a change of equipment, a change in price plan, a cancellation.

Event graph: An event graph represents a sequence of events over time and connected by a common entity such as customer id, service id, . . . For example, a customer 'A' subscribed to a service, then the customer 'A' changed equipment, then the customer 'A' converted the service type, and then customer 'A' cancelled the service.

Event Attribute: An event attribute is an instance of an event graph. Multiple event attributes can be defined based on one event graph. Event attributes contain information about the time duration between two events in the event graph and a filter expression for the event or event lookup table of each event in the event graph.

FIG. 1 illustrates a representative architecture of a system suitable for embodying a decision support application in a specific embodiment of the present invention. As shown in FIG. 1, in a specific embodiment, a system 100 for managing and analyzing information comprises a computer system 102, coupled to database 101, a metadata repository 110, and an optional input/output device(s) 108, which can be a console, display screen or the like. In specific embodiments, metadata repository 110 may be combined with or co-located with database 101. In some specific embodiments, one or both of metadata repository 110 and database 101 may be located on the computer system 102, while in alternative embodiments, one or both of metadata repository 110 and database 101 may be located on another computer system (not shown), which may be a server computer, for example. In some specific embodiments, a network may connect computer system 102 with a server computer having access to database 101 and/or metadata repository 110, so that a client-server relationship is established. However, a client-server relationship is not necessary to practice the invention.

A plurality of logic resident on computer system 102 provides various functions to the user. This logic may comprise hardware, software, and/or a combination of hardware and software in various specific embodiments. For example, a database interface logic 105 maintains the information in the database 101. A query/command generator logic 106 provides access to the information in the database 101. A scheduler logic 104 coordinates the events and actions in the computer system 102. A repository interface logic 107 provides an interface to metadata repository 110. A user interface logic 103 enables users to create and view logical models, subject models and physical models, and the like. Further, in various specific embodiments, users can create applications such as 3-dimensional diagrams, such as display 401 of FIG. 4E, for example, reports, perform data mining, enter, edit and apply rules, compute statistics, and so forth using applications and facilities of computer system 102.

Figure 2:
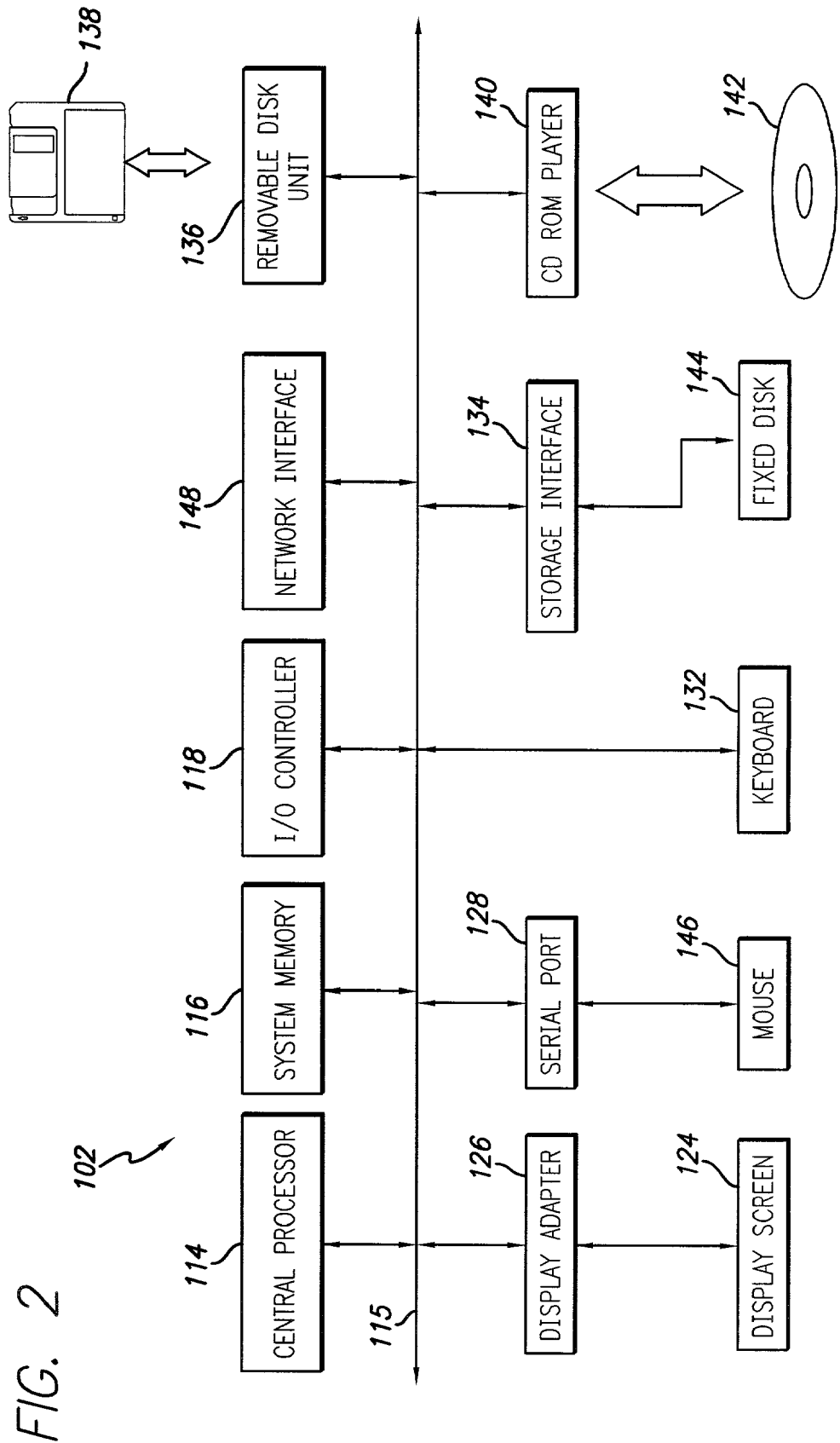
FIG. 2 illustrates a representative computer system suitable for implementing a specific embodiment of the present invention.

FIG. 2 illustrates a representative computer system suitable for implementing a specific embodiment of the present invention. As shown in FIG. 2 a computer system 102 suitable for embodying a specific embodiment of the invention. Computer system 102 includes a bus 115, which interconnects a variety of components and subsystems. Bus 115 interconnects a central processor 114, a system memory 116, an input/output controller 118, a display screen 124 via a display adapter 126, a serial port 128, a keyboard 132, a fixed disk drive 144 via storage interface 134, and a removable disk drive 136. Removable disk drive 136 is operative to receive a removable disk 138. Many other devices may be connected to bus 115. For example, an external device such as a printer (not shown), and/or a scanner (not shown) may be connected via an I/O controller 118. Mouse 146 can be connected to serial port 128. A network interface 148 can be included to provide connectivity to one or more networks, including the Internet. Many other devices and subsystems (not shown) may be connected in a similar manner. Also, it is not necessary for all of the devices shown in FIG. 2 to be present to practice the present invention. Further, the devices and subsystems may be interconnected in different ways from that shown in FIG. 2 in various specific embodiments. Source code to implement the present invention may be operatively disposed in system memory 116 and/or stored on storage media such as fixed disk 144 or removable disk 138.

FIG. 3A illustrates representative software architecture in a specific embodiment of the present invention. Representative software architecture 300 in FIG. 3A comprises a plurality of software code that may be operatively disposed in system memory 116 and/or stored on storage media such as fixed disk 144 or removable disk 138 of FIG. 2. In a representative embodiment, software architecture 300 comprises a plurality of user services 302, a plurality of business services 304, and a plurality of data services 306.

In a specific embodiment, user services 302 comprise a web server 310, for example. A client web browser 312 is communicatively coupled to the web server 310, enabling a client to interact with the web server 310. A web user interface (UI) driver 314 is operatively coupled with the web server 310 to provide a user interface in conjunction with a window snap in 316 and a window user interface (UI) driver 318. Web user interface (UI) driver 314 is further coupled with a web UI controller 320, which provides control functions for the user interface in conjunction with a UI controller 322. Output from the web UI controller 320 is provided to a web page generator 326. UI controller 322 provides the information needed for a graphical user interface (GUI) controller for each modal. A window form 324 is operatively coupled to the UI controller 322.

In a specific embodiment, business services 304 comprises a clsModal 330, which contains logic for presenting GUI information, such as report process, a profile/code process, and an event attribute process. ClsModal 330 may be operatively coupled to a clsDictionary 332, as well as one or more clsUtils 334. In a specific embodiment, data services 306 comprise a CCDW Model 340, and a DBWrapper 342. These processes provide interface to the database 101 of FIG. 1.

Figure 3B:
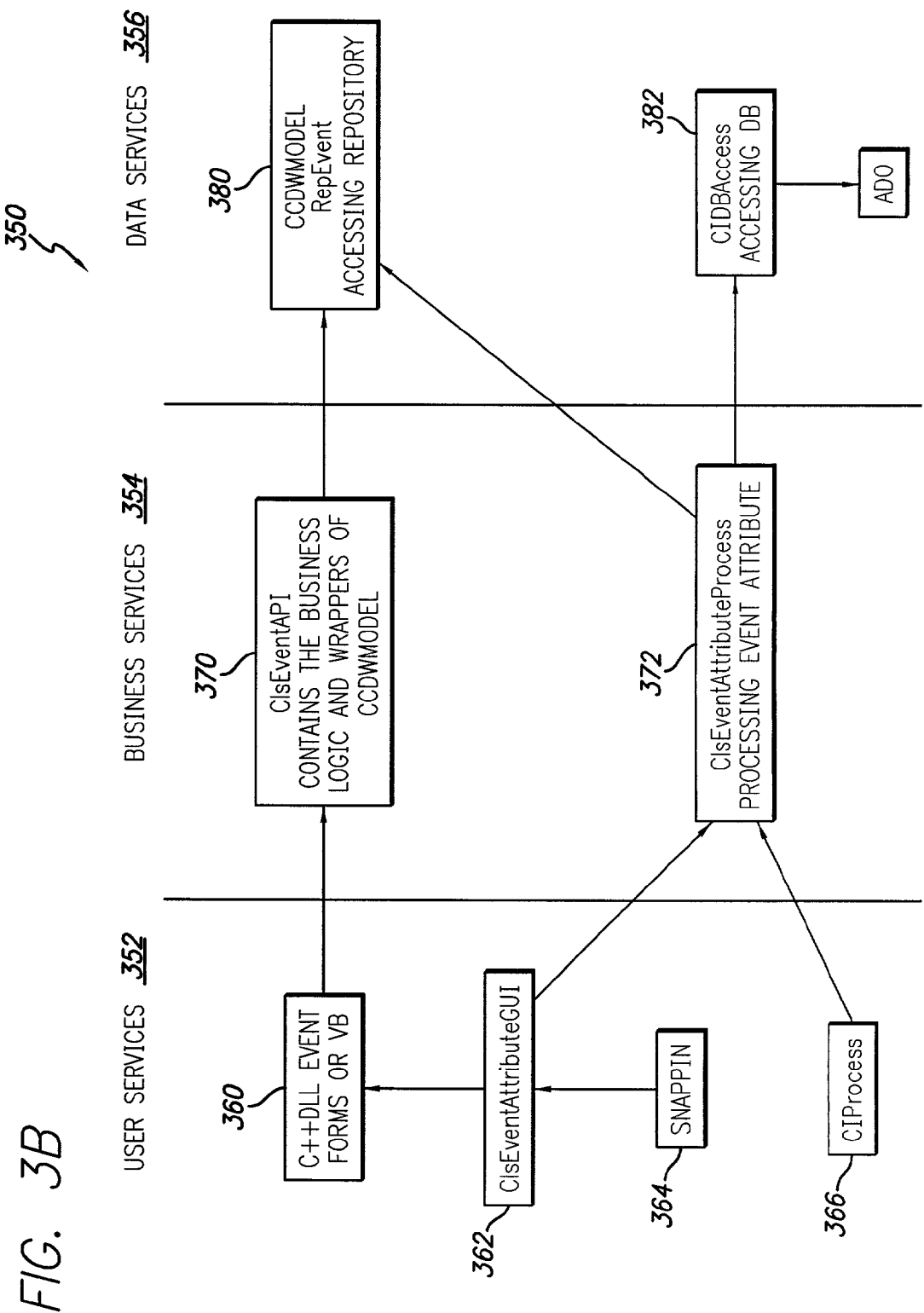
FIG. 3B illustrates representative software architecture in another specific embodiment of the present invention.

FIG. 3B illustrates representative software architecture in another specific embodiment of the present invention. Representative software architecture 350 in FIG. 3B comprises a plurality of software code that may be operatively disposed in system memory 116 and/or stored on storage media such as fixed disk 144 or removable disk 138 of FIG. 2. In a representative embodiment, software architecture 350 comprises a plurality of user services 352, a plurality of business services 354, and a plurality of data services 356.

In a specific embodiment, user services 352 comprise a dynamically linked library (DLL) 360 of event forms or VB, which may be written in the C++ programming language, for example. A ClsEventAttributeGUI 362 is communicatively coupled to the dynamically linked library (DLL) 360. A snappin module 364 is coupled to ClsEventAttributeGUI 362. A CIProcess module 366 is also part of the user services 352.

In a specific embodiment, business services 354 comprises a ClsEventAPI 370, which contains logic for business functions and wrappers. A ClsEventAttributeProcess module 372 processes event attributes. In a specific embodiment, data services 356 comprise a CCDWModal 380, and a CIDBAccess module 382. These processes provide interface to the database 101 of FIG. 1.

Figure 4A:
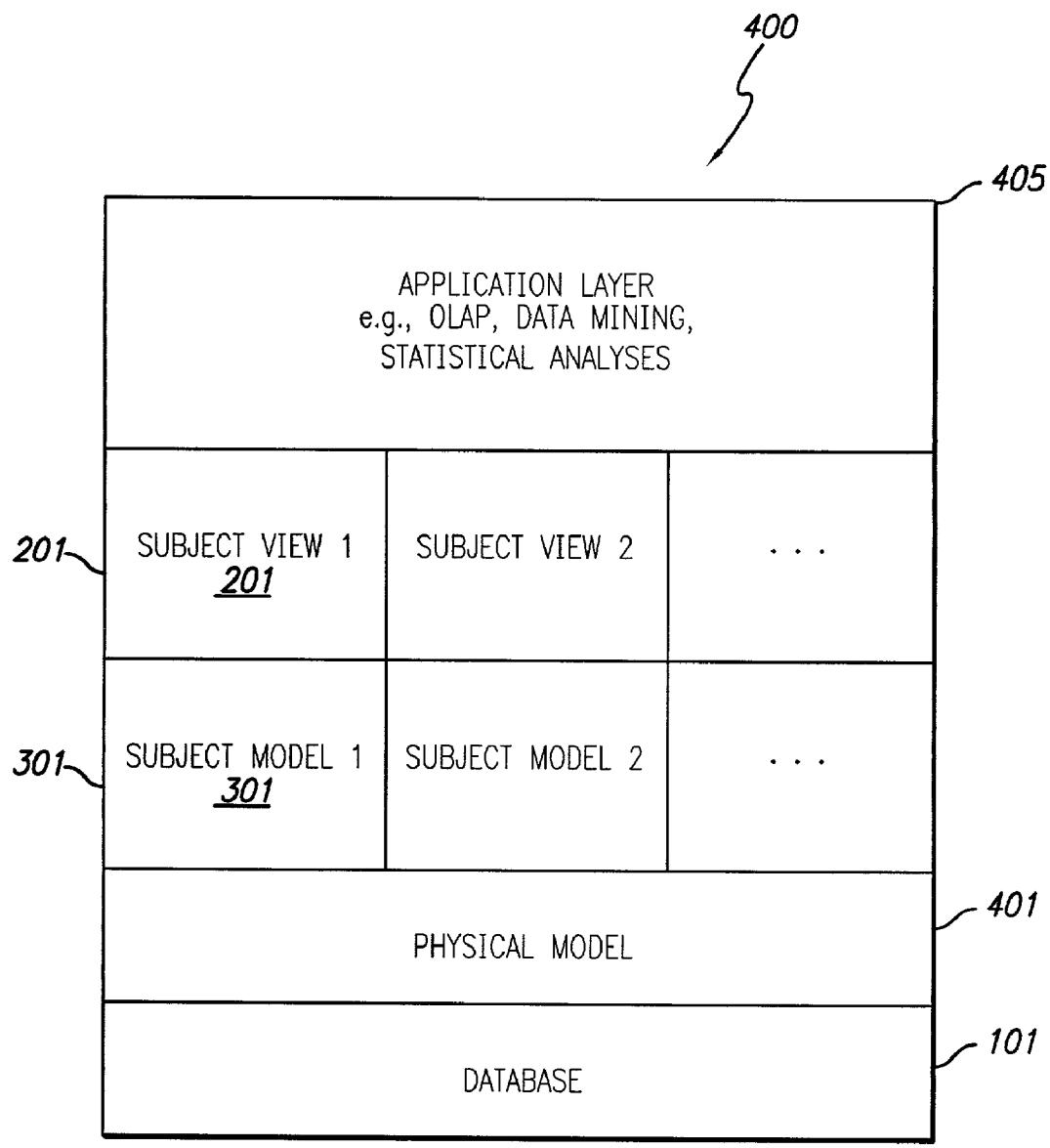
FIGS. 4A–4D illustrate representative types of information in a specific embodiment of the present invention.

FIG. 4A illustrates a representative application information architecture capable of supporting a decision support application in a specific embodiment of the present invention. As shown by FIG. 4A, an architecture diagram 400 comprises of database 101 that contains information about a business process in a specific embodiment. The database 101 contains a plurality of data elements. The data contained within database 101 may be organized in a variety of different ways, which may be called schema. In a specific embodiment, database 101 is a relational database. A physical model 401 conceptualizes relationships between various data elements within database 101. Physical models, such as, for example relational models, provide one or more relationships between information elements, such as a customer, a transaction, a product, and so forth, stored in the relational database 101. Representative examples of physical models will be described herein with reference to specific embodiments of FIG. 4D. Physical model 401 may be derived from one or more subject models, such as subject model 301. Subject model 301 comprises a reverse star schema (RSS) relationship among a plurality of data elements stored in the database 101. Subject model 301 provides a way for users and consumers of the data in database 101 to think about the relationships among the data in a useful way. Representative examples of subject models will be described herein with reference to specific embodiments of FIG. 4C.

One or more logical models, such as logical model 201, provide a subject view of the relationships described by the subject model 301. Logical model 201 centers about a single business subject, such as a customer, or a product, for example, that is the focus of one or more business analyses. Logical model 201 provides a way for users and consumers of the data in database 101 to view relationships between different data elements in the database 101 in a hierarchical way. Representative examples of logical models will be described herein with reference to specific embodiments of FIG. 4B.

The logical models support applications at an application layer 405. Application layer 405 includes one or more applications, such as OLAP, statistical models, and so forth, that may be used in various specific embodiments of the present invention. The specific embodiment having a software architecture shown in FIG. 4A can support a multiple subject system, in which different applications run using the data stored in the database 101. Accordingly, more than one subject model and more than one subject view may be included in some specific embodiments of the present invention.

Figure 4B:
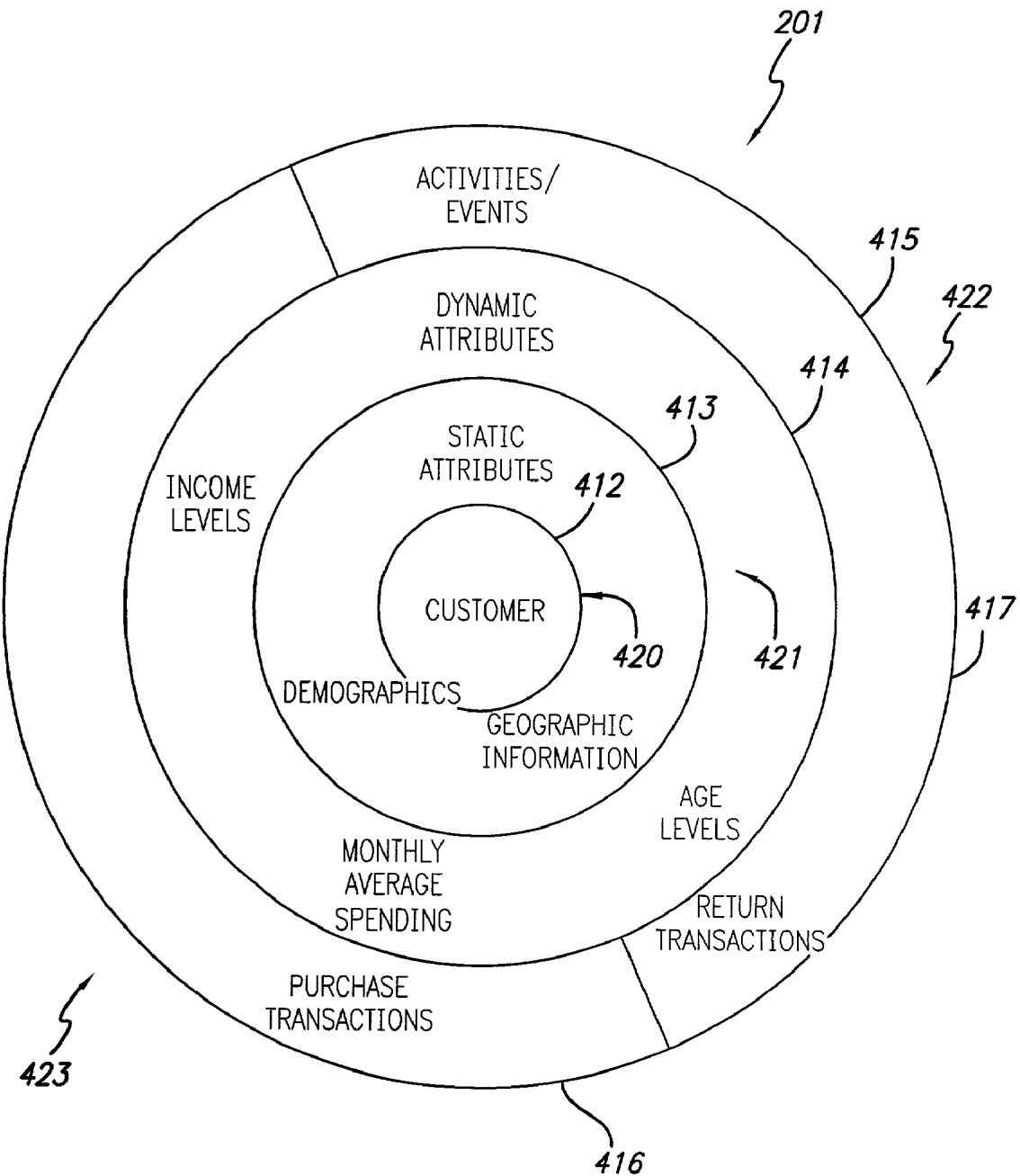

FIG. 4B illustrates a representative logical model in a specific embodiment of the present invention. In FIG. 4B, a logical model 201 for a single subject system in a specific embodiment is shown. Logical model 201 comprises a single business subject, such as customer, which is the center concept 412 of logical model 201. In various specific embodiments, the business subject could be product, sales, line of business or the like. Surrounding the center concept 412 are one or more static attributes 413, such as demographics of a customer, or geographic information about a customer. Further, one or more dynamic attributes 414 may be derived from the static attributes and activities/events 415. For example, one or more age levels may be derived from demographic information about the customer. Further, one or more activities and events 415 may be defined for the center concept 412. For example, a purchase transaction and a return transaction are activities/events relating to the center point customer. Accordingly, in FIG. 4B, the customer is the center concept 412, while geographic information and demographics are static attributes 413. These are merely representative examples of the many possible static attributes that may be used in various specific embodiments of the present invention. Purchase transactions 416 and return transactions 417 are examples of activities/events 415. Surrounding the static attributes 413 are one or more dynamic attributes 414, which may be derived from the static attributes 413 and/or from one or more activities and events 415. For example, one or more age levels, a dynamic attribute, may be derived from demographic information about the customer, a static attribute. One or more activities and events 415 may be defined for the center concept 412.

Dynamic attributes 414 can also be derived from activities/events 415. For example, a monthly average spending level can be derived from the purchase transactions 416 information belonging to the activities/events 415. Accordingly, a user may derive various dynamic attributes and profiles about the center concept 412 of the logical model 201, such as an age level, an income level, a monthly average spending level, and so forth. Dynamic attributes 414, static attributes 413 and center concept 412 comprise a focal group 421. Activities/events 415 may be divided into customized groups. A core component 420 comprises center concept 412. A first customized group 423 comprises information entities in purchase transactions 416, as well as lookup information related to products involved in the transactions (not shown). A second customized group 422 comprises return transactions 417, as well as lookup information related to products involved in the transactions (not shown).

Figure 4C:
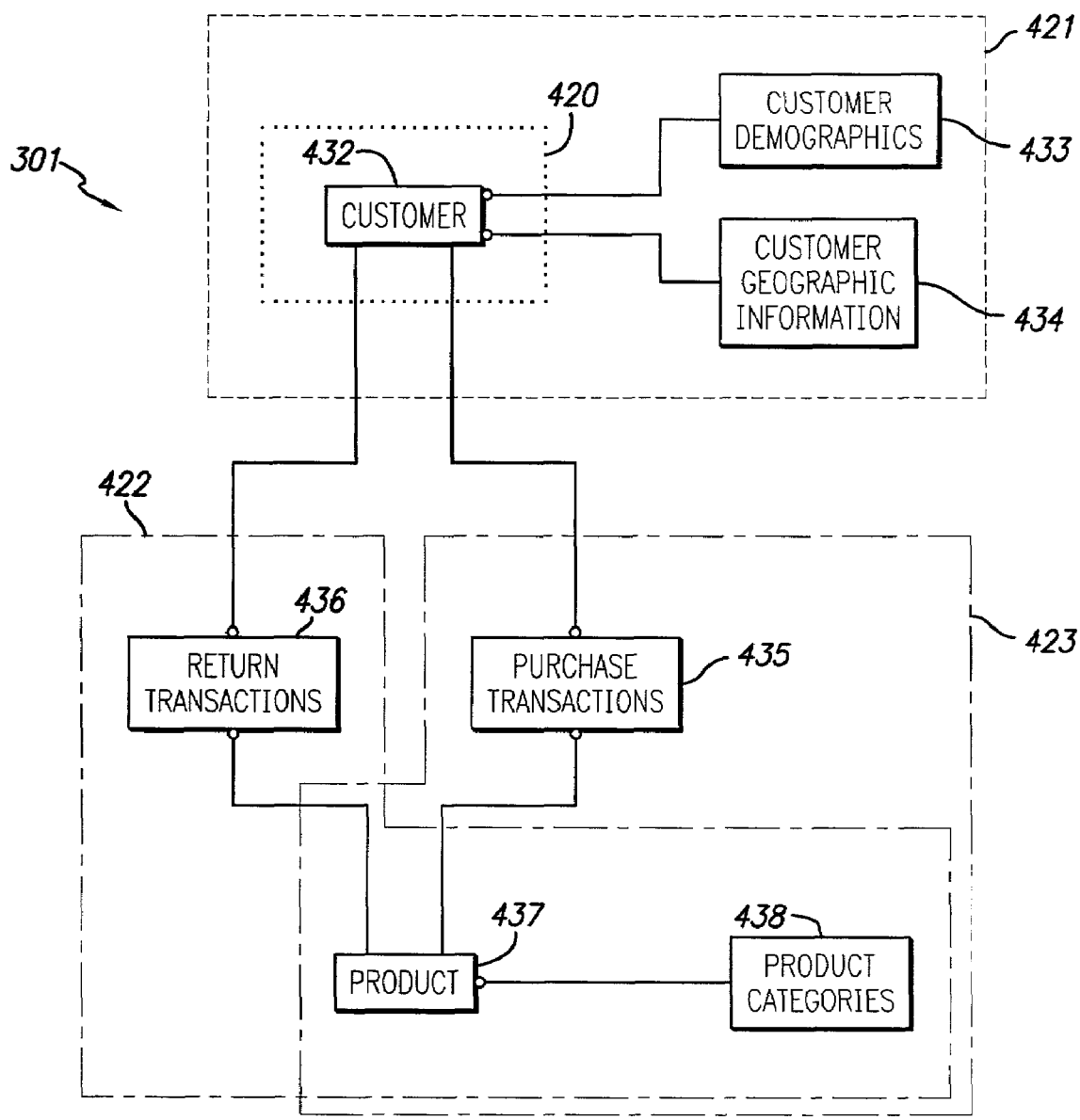

FIG. 4C illustrates a derived subject model in a specific embodiment of the present invention. In FIG. 4C, a derived subject model 301 corresponding to the logical subject model 201 of FIG. 4B in a specific embodiment is shown. Derived subject model 301 comprises a plurality of relationships between a plurality of groups and information entities in database 101, as illustrated by logical model 201. Logical model 201 provides a customer centric view, with the core component 420 comprising center concept 412, the customer. Accordingly, the derived subject model 301 comprises a customer entity 432. Static attributes are represented by a customer demographics entity 433, which comprises demographics information for each customer in customer entity 432, and a customer geographic entity 434, which comprises geographical information about each customer in customer entity 432. A purchase transaction entity 435 comprises merchant purchase transaction data, such as a time, a date, an amount, a description, and so forth, for a plurality of purchase transactions entered into by customers in customer entity 432. A return transaction entity 436 comprises merchant return transaction data, such as a time, a date, and a returning item, and so forth, for a plurality of return transactions entered into by customers in customer entity 432.

A product entity 437 comprises product information that describes the merchant and its characteristics, such as a product name, a description, a price, and so forth. A product categories entity 438 comprises product classification information. In a specific embodiment, the entities comprising the derived subject model 301 have a reverse star schema arrangement, with the customer entity 432 comprising a core component 420, as indicted by a dotted line in FIG. 4C. Customer entity 432, customer demographics entity 433 and customer geographic entity 434 comprise a focal group 421. A first customized group 422 comprising of return transaction entity 436, product entity 437 and product categories entity 438 provides information related to the core component 420; customer entity 432. A second customized group 423 comprising of purchase transaction entity 435, product entity 437 and product categories entity 438 provides another set of information related to the core component 420, the customer entity 432. Accordingly, the remainder of the information entities in the derived subject model 301 is arranged according to their relationships with the core component 420. A variety of other arrangements and relationships among the entities in the derived subject model 301 may also be used in various specific embodiments according to the present invention.

Figure 4D:
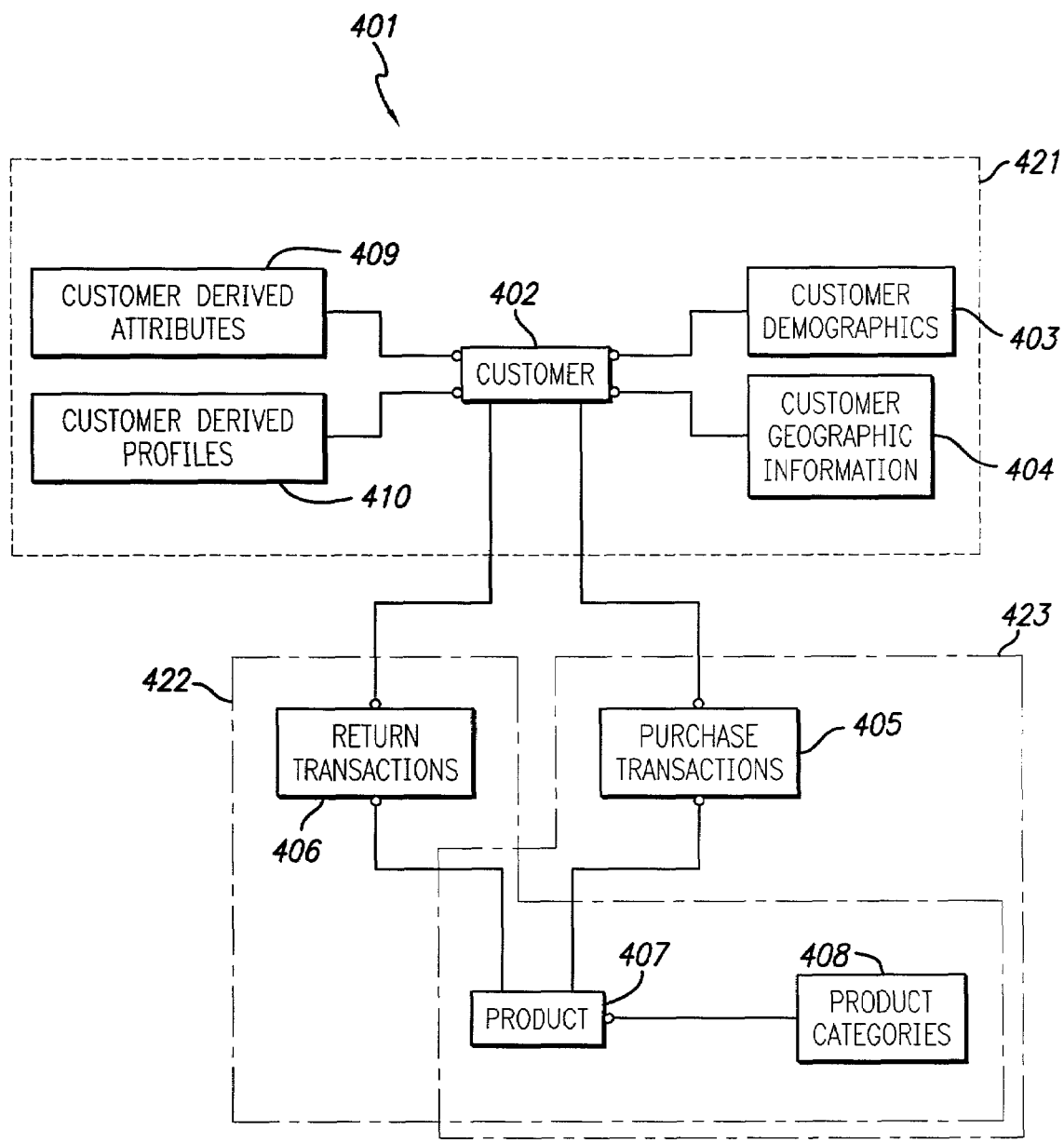

FIG. 4D illustrates a physical model in a specific embodiment of the present invention. In FIG. 4D, a physical model 401 corresponding to the derived subject model 301 of FIG. 4C in a specific embodiment is shown. Physical model 401 is a relational model that illustrates relationships between entities of customer, transaction, and product that are incorporated in information stored in the database 101. In a specific embodiment, the database is a relational database, however, other methods of storing and retrieving information may be used in various other specific embodiments as will be evident to those skilled in the art. In physical model 401, a plurality of dynamic attributes and profiles has been derived from the derived subject model 301. A star schema organization of the data entities in the focus group 421 is created dynamically by a software process in a specific embodiment. In a specific embodiment, C-INSight™, a product of MetaEdge Corporation, of Sunnyvale, Calif., provides the capability to dynamically derive attributes and profiles from static data and to create a star schema, and, hence a multidimensional cube, dynamically.

The physical model 401 comprises a customer entity 442 that is central to the focus group 421. Static attributes are represented by a customer demographics entity 403, which comprises demographics information for each customer in customer entity 402, and a customer geographic entity 404, which comprises geographical information about each customer in customer entity 402. One or more dynamically derived attributes may also comprise focus group 421. For example, in a specific embodiment illustrated by FIG. 4D, a customer derived attributes 409 and a customer derived profiles 410 include derived information about customers in customer entity 402.

A first customized group 422 comprises a return transactions entity 406, which comprises merchant return transaction data, such as a time, a date, and a returning item, and so forth, for a plurality of return transactions entered into by customers in customer entity 402. Further, customized group 422 comprises a product entity 407, which comprises product information that describes the merchant and its characteristics, such as a product name, a description, a price, and so forth, and a product categories entity 408, which comprises product classification information.

A second customized group 423 comprises a purchase transaction entity 405, which comprises merchant purchase transaction data, such as a time, a date, an amount, a description, and so forth, for a plurality of purchase transactions entered into by customers in customer entity 402. Customized group 423 further comprises product entity 407, and product categories entity 408.

Figure 5A:
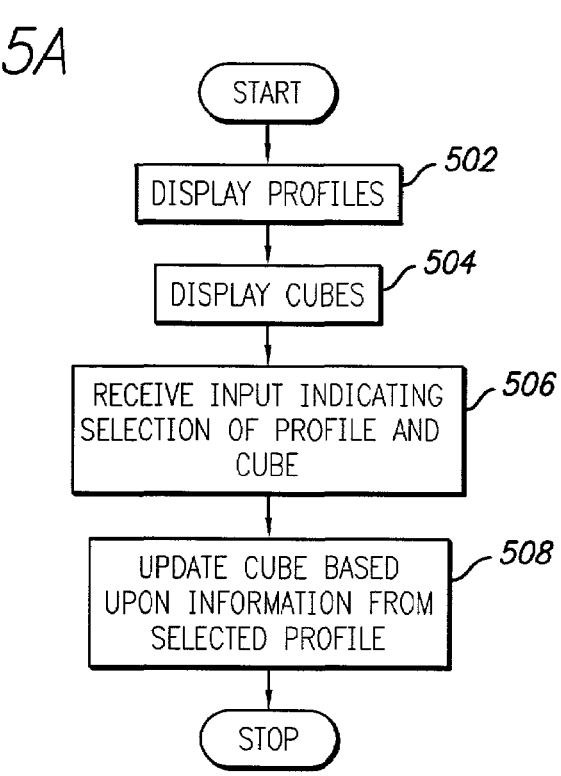
FIGS. 5A–5D illustrate flowcharts of representative processes in a specific embodiment of the present invention.

FIG. 5A illustrates a flowchart of representative process for cube generation in a specific embodiment of the present invention. As shown by flowchart 501 in FIG. 5A, the method for managing information comprises displaying one or more of profiles 502. Further, the method includes displaying one or more of cubes 504. An input from a user indicating a selected one from the one or more of profiles and a selected one from the one or more of cubes is received 506. The method also includes updating the selected one from the one or more of cubes with information from the selected one from the one or more of profiles 508. In a specific embodiment, during updating, at least one of the plurality of profiles is added into the selected one from the one or more of cubes replacing an existing dimension within the selected one from the one or more of cubes. In a specific embodiment, the one or more of profiles are redefined using segmentation codes and attributes. For example, a graphical user interface (GUI) may be used to provide input according to which the profiles are redefined. In a specific embodiment, attributes, profiles and segmentation codes are combinable to create new profiles.

Figure 5B:
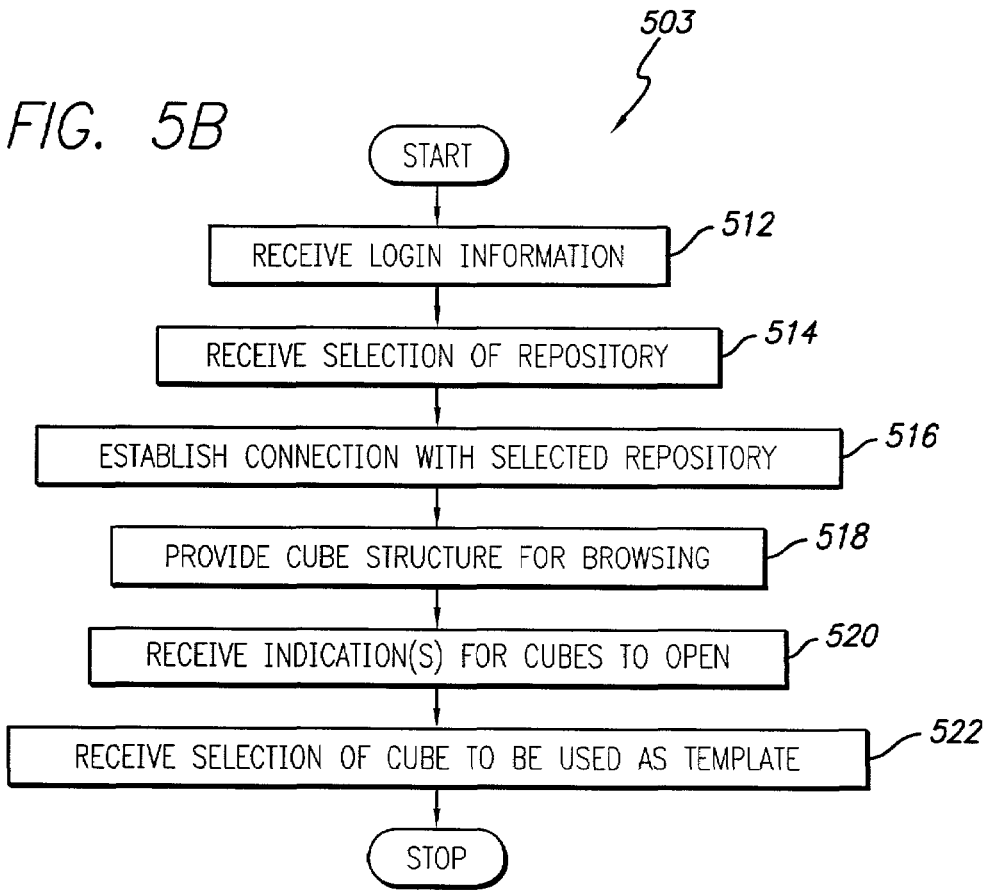

In a specific embodiment, access permissions control access to shared ones of the plurality of cubes and to restrict access to private ones of the plurality of cubes. FIG. 5B illustrates a flowchart of representative process for cube generation in a specific embodiment of the present invention. As shown by flowchart 503 in FIG. 5B, the user completes a login process 512. Login process 512 includes receiving an identifier associated with the user and authenticating the user as a user having access privileges to create, modify, and work with cube reports, profiles, segmentation codes, and the like. Then, the user selects a repository 514. The repository can be selected from one or more repositories available in certain specific embodiments. Next, a connection with the selected repository is established 516. Then, the user can browse a cube's data and structure 518. The user can open one or more of the cube(s) 520. Then, the user can select one or more of cubes to use as a template(s) 522.

Figure 5C:
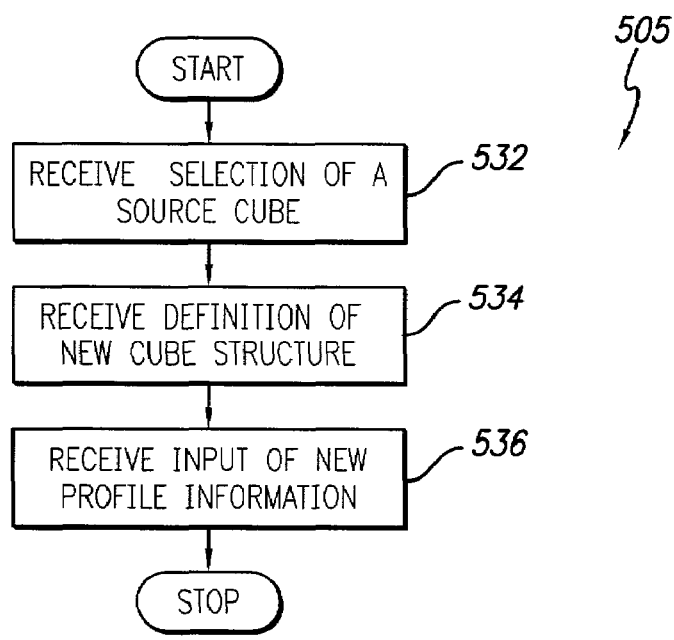

FIG. 5C illustrates a flowchart of representative process for cube generation in a specific embodiment of the present invention. As shown by flowchart 505 in FIG. 5C, the user completes selection of a cube from which to derive a new user defined cube 532 using a process such as described herein above with reference to flowchart 503 of FIG. 5B, for example. Then, the user defines the new cube structure 534. The user can define a structure for a new cube based upon at least one component of an existing cube. Next, the user creates a new profile 536. In a specific embodiment, the user can create profiles by indicating a selected one from the one or more profiles, or redefine profiles from attributes, segmentation codes, and the like, by dragging and dropping the selected one from the one or more of profiles to the cubes.

Figure 5D:
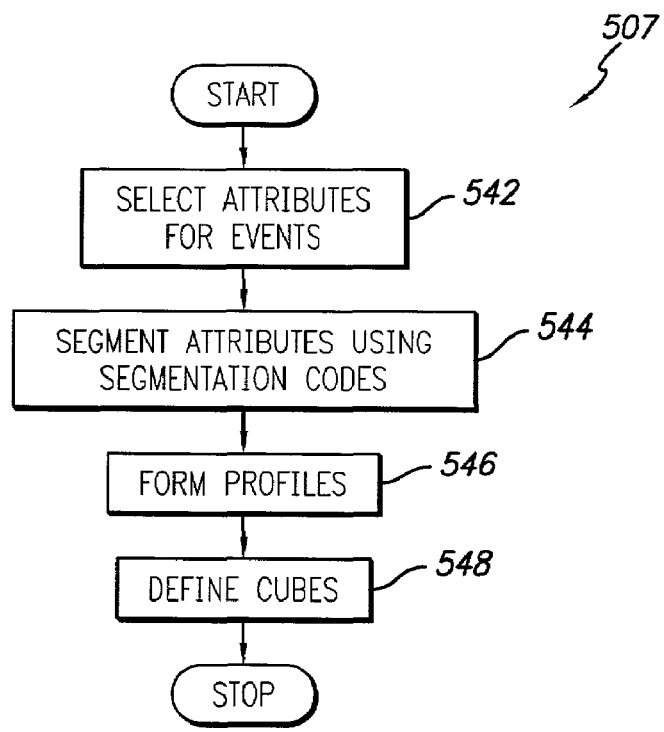

FIG. 5D illustrates a flowchart of representative process for cube generation in a specific embodiment of the present invention. As shown by flowchart 507, attributes are selected 542 based upon events. Then, the attributes are segmented 544 using one or more segmentation codes. Profiles are formed 546 from the attributes and segmentation codes. Cubes are defined 548 based upon the profiles. Cube reports may be static reports or dynamic reports.

Figure 6A:
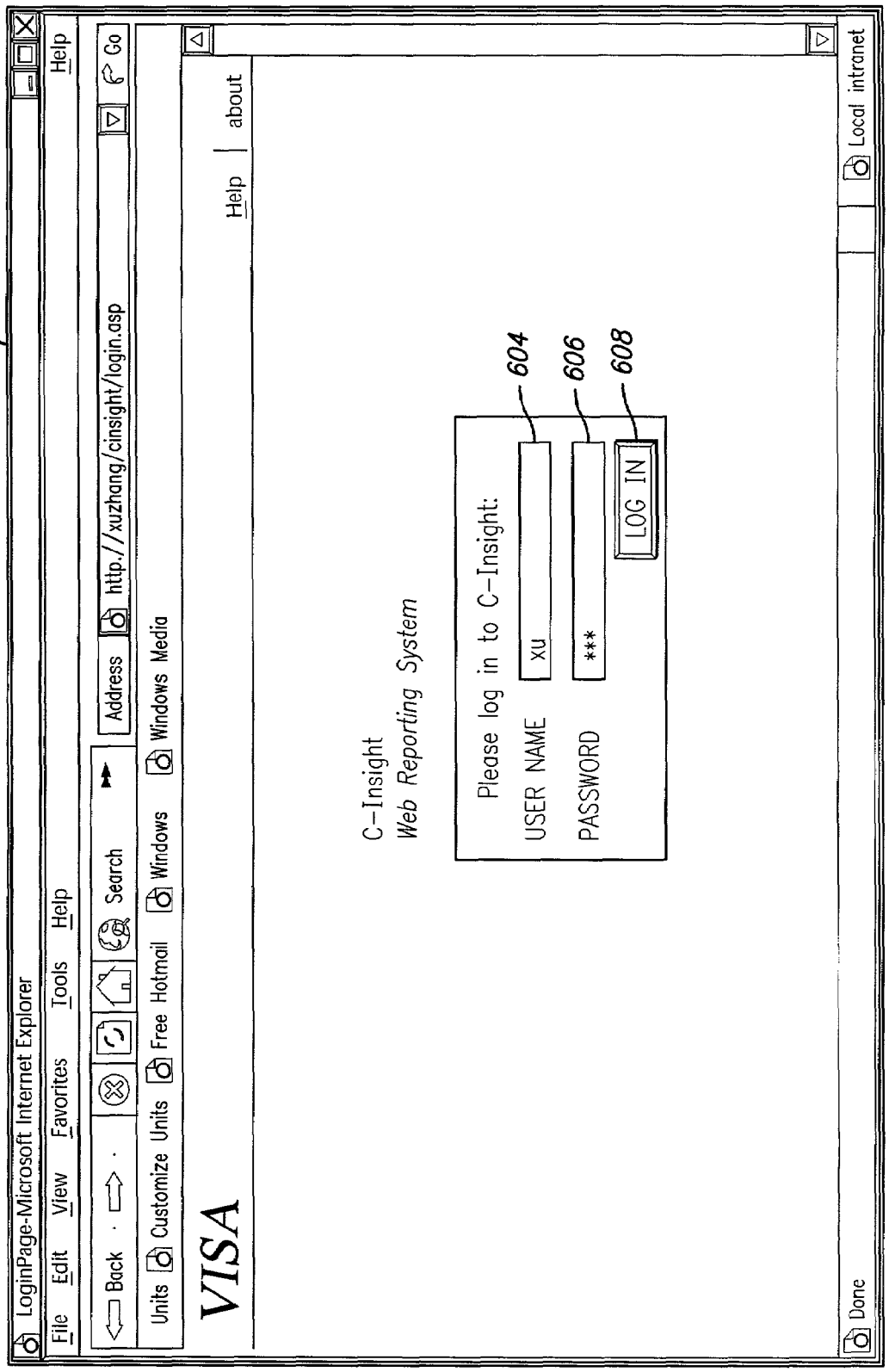
FIG. 6A illustrates a representative login screen in a specific embodiment of the present invention.

FIG. 6A illustrates a representative login screen in a specific embodiment of the present invention. In a specific embodiment, business users can login using either of a window interface and a web interface using a login panel 602. In a representative embodiment, the business user interface provides access to capabilities to create, edit, delete and process cubes, profiles, segmentation codes and reports, including static reports, offline dynamic reports and online dynamic reports. The business user can complete the login process by providing an identifier associated with the user into a user name field 604 and authentication information into a password field 606. The business user then clicks a login button 608 to commence authentication of the user as a business user having access privileges to create, modify, and work with cube reports, profiles, segmentation codes, and the like via a business user interface. In specific embodiments, a plurality of access permissions may be used to restrict access to the business user interface to business users. Other types of users can be blocked from viewing the business user interface.

Figure 6B:
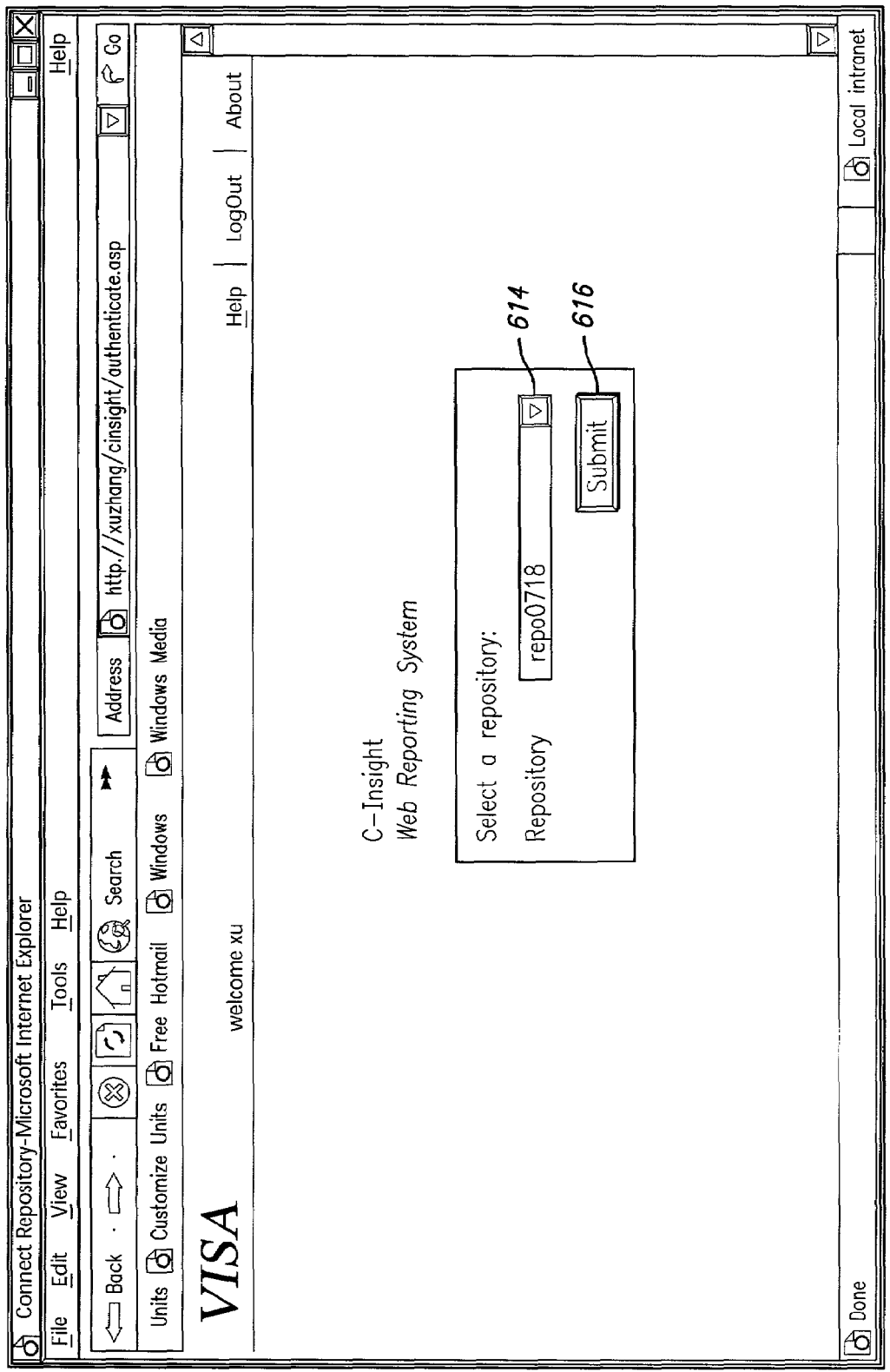
FIG. 6B illustrates a representative screen for connecting to a repository in a specific embodiment of the present invention.

FIG. 6B illustrates a representative screen for connecting to a repository in a specific embodiment of the present invention. In a specific embodiment, once a business user successfully completes the login process using the business user interface, the user will be presented with a repository selection panel 612 having a dropdown list 614 containing the available repositories that the current login user can access. The business user may scroll through the list of available repositories, select a repository of interest, and click submit button 616, in order to connect to the repository.

Figure 6C:
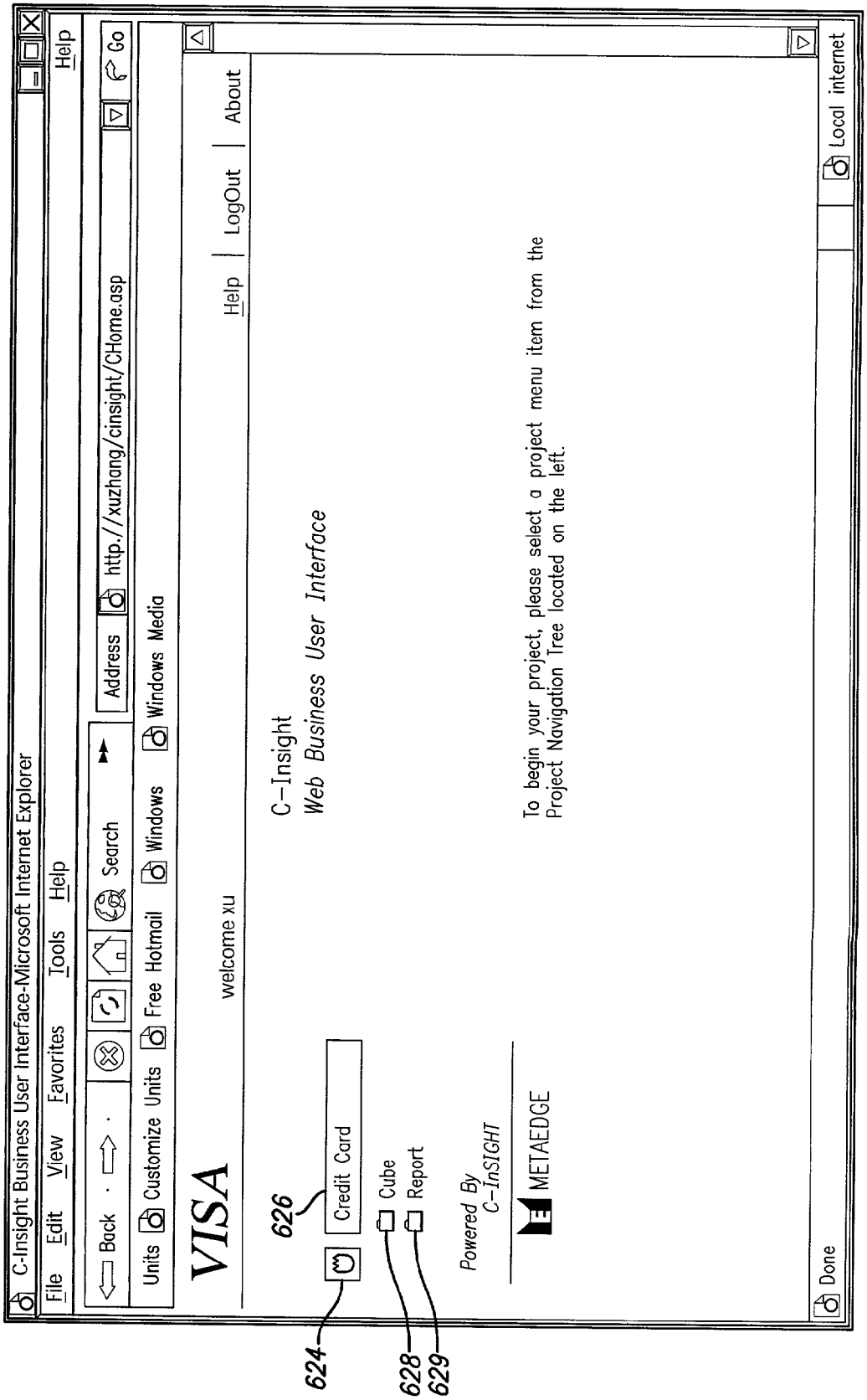
FIG. 6C illustrates a representative screen for selecting a project in a specific embodiment of the present invention.

FIG. 6C illustrates a representative screen for selecting a project in a specific embodiment of the present invention. In a specific embodiment, once a business user successfully completes connecting to a repository, the business user will be presented with a project list selection panel 622. The project list selection panel 622 comprises a project navigation tree 624 comprising one or more projects 626. In one specific embodiment, each project 626 further comprises a cube report function 628 for generating dynamic reports, and a report function 629 for generating static reports. The business user may select a project 626 from the project navigation tree 624 using the mouse, keyboard, or other type of input device to begin a project.

FIG. 6D illustrates a representative menu screen in a specific embodiment of the present invention. In a specific embodiment, when a business user selects cube report function 628 of selection panel 622, the business user will be presented with a cube menu panel 632. Representative cube menu panel 632 includes a variety of options, including a My Cube 634, a Shared Cube 636, a New Cube 638, and a My Profiles 639. These options enable the user to work with dynamic cube reports, and will next be described in further detail with reference to select specific embodiments.

My Cube: A My Cube menu option provides access to cubes created by the login user. A user can edit, delete, process and view the cube online using this option for cubes that have been processed successfully.

Shared cube: A Shared Cube menu option provides access to cubes created by other users that are the login user is allowed to view. The user can also view online cubes using this option for cubes that have been processed successfully.

New Cube: A Create New Cube menu option provides access to a profile and segmentation code menu with options for creating new cubes.

My Profiles: A My Profiles menu option provides access to profile and segmentation codes created by the login user. The user can edit, delete, and process profiles and segmentation codes using this interface.

Of course these options are merely illustrative of the wide variety of options that can be included in menu panel 632 in various specific embodiments. Accordingly, FIG. 6D is merely illustrative and not intended to be limiting. Variations and alternatives will be evident to those skilled in the art.

Figure 6E:
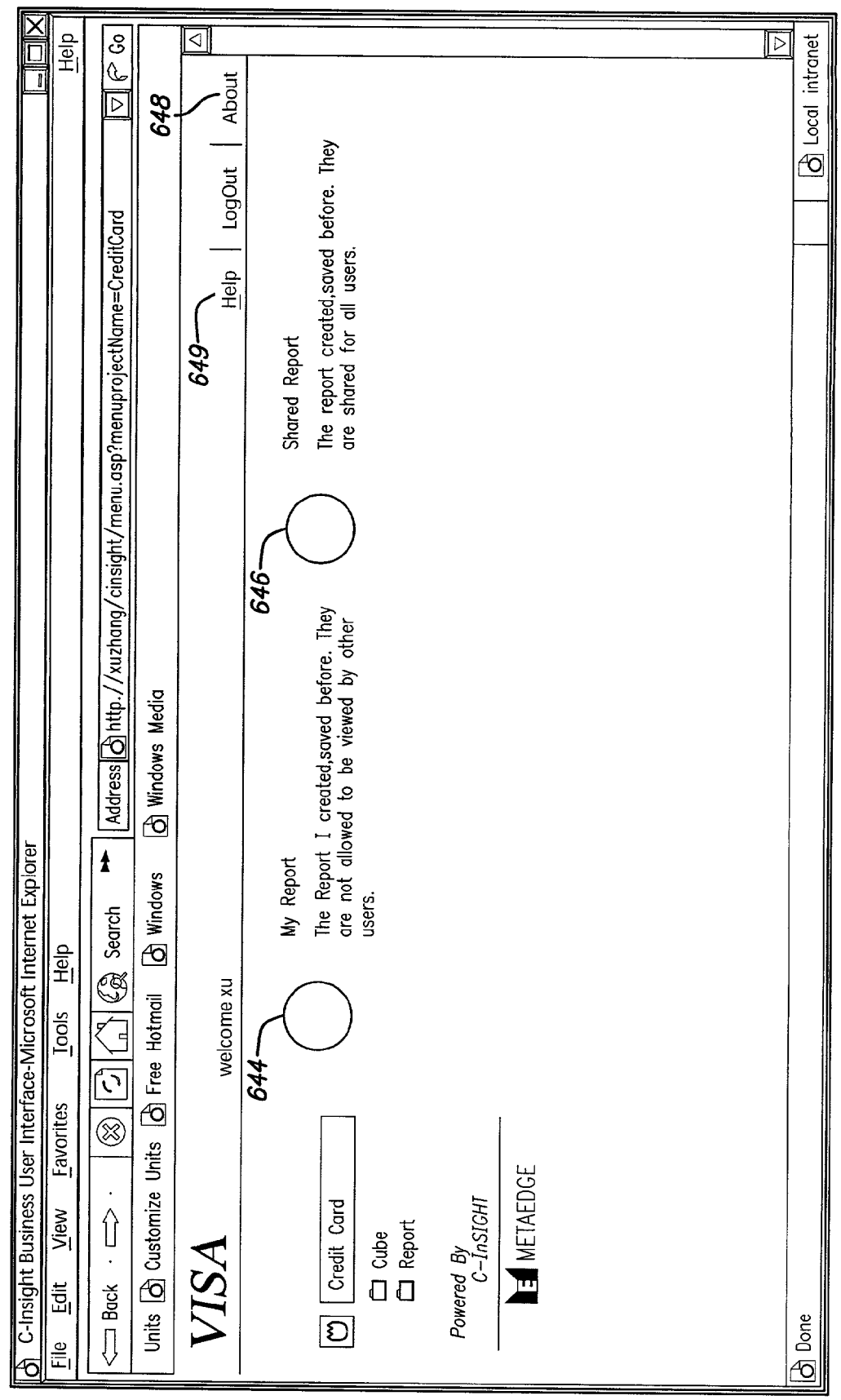
FIG. 6E illustrates a representative menu screen in a specific embodiment of the present invention.
Figure 6F:
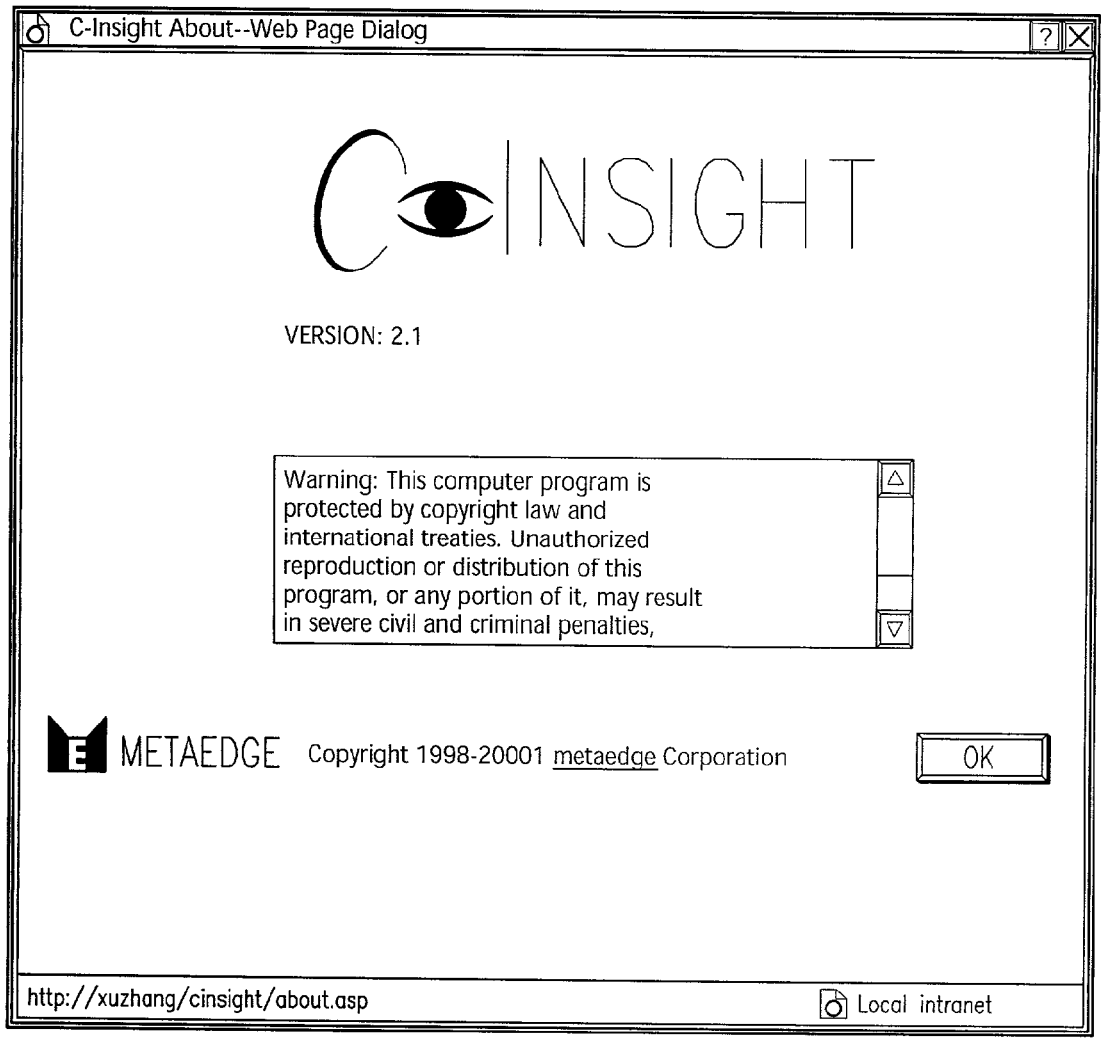
FIGS. 6F–6G illustrate representative informational screens in a specific embodiment of the present invention.
Figure 6G:
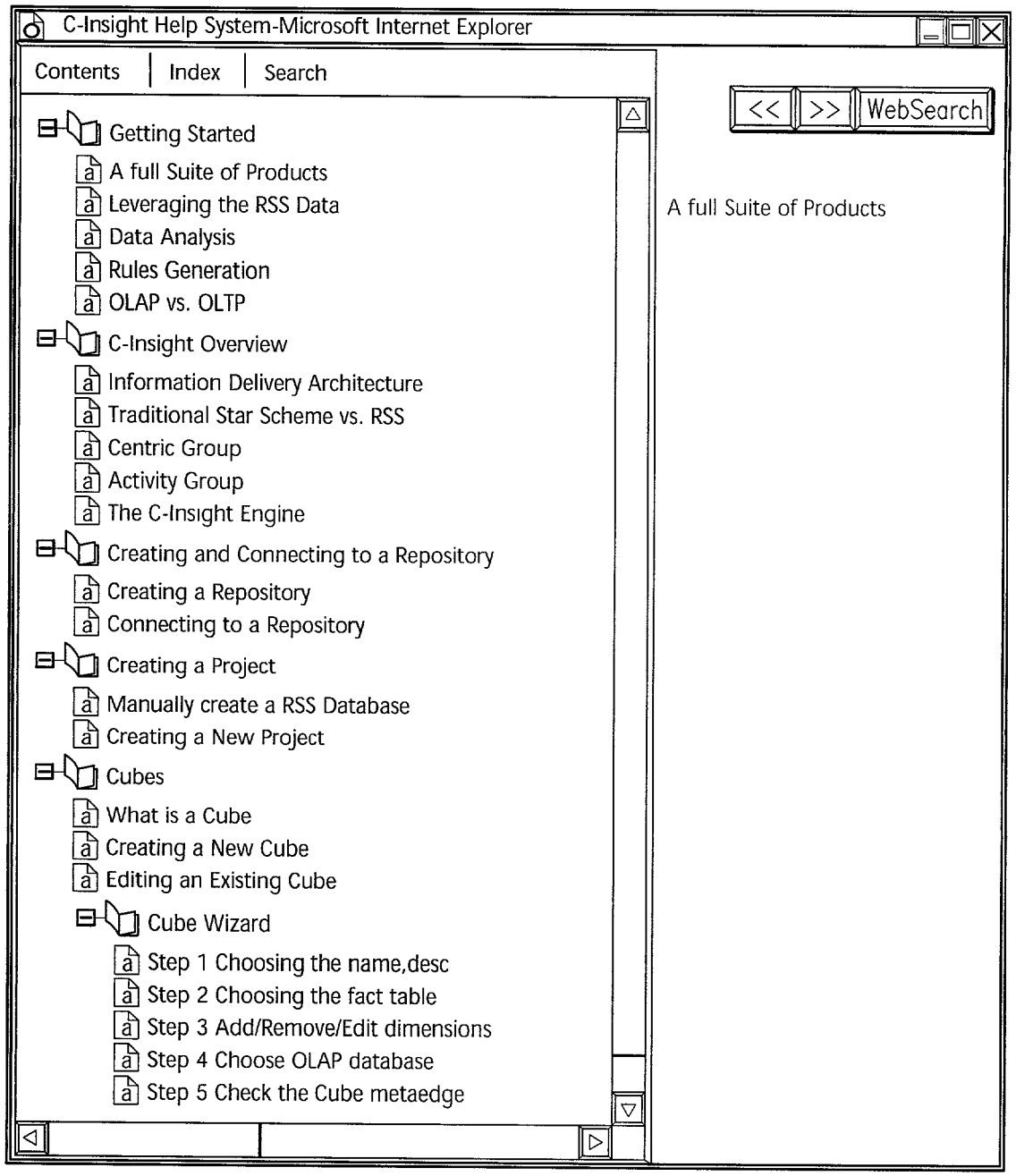

FIG. 6E illustrates a representative menu screen in a specific embodiment of the present invention. In a specific embodiment, when a business user selects static report function 629 of selection panel 622, the business user will be presented with a report menu panel 642. Representative report menu panel 642 includes a variety of options for creating and working with static reports, including a My Report 644 and a Shared Report 646 option. Representative report menu 642 further includes an About menu option 648 and a Help menu option 649. Selecting the About menu option 648 invokes a pop-up about window of FIG. 6F. Selection of the Help menu option 649 invokes a pop-up Help window of FIG. 6G. Static reports may be created from a cube, for example.

Users can select, edit, and display reports using a user interface provided by specific embodiments of the present invention. Reports can be either static or dynamic, in various specific embodiments. A static report can be shown as a spreadsheet format, for example. A dynamic report is a cube report that may have multiple dimensions that can be manipulated dynamically when viewed using a multi-dimensional display program using On-Line Analysis Processing (OLAP) technology, for example.

A business user can interface with information in the database via the Business User Interface. After the user logs in, a determination is made which interface to load according to the user/password pair. A Designer designs certain cube reports to be provided to business users. These cube reports are capable of being used as template for the business user to use in creating her own cube reports. The business user can view the cube reports, including template reports created by the designer, as well as the business user's own cube reports, create new cube reports, and modify or delete the business user's own cube reports. In a specific embodiment, information about the security level for each cube report, including cube reports in a designer interface, are kept in the repository database.

Figure 7A:
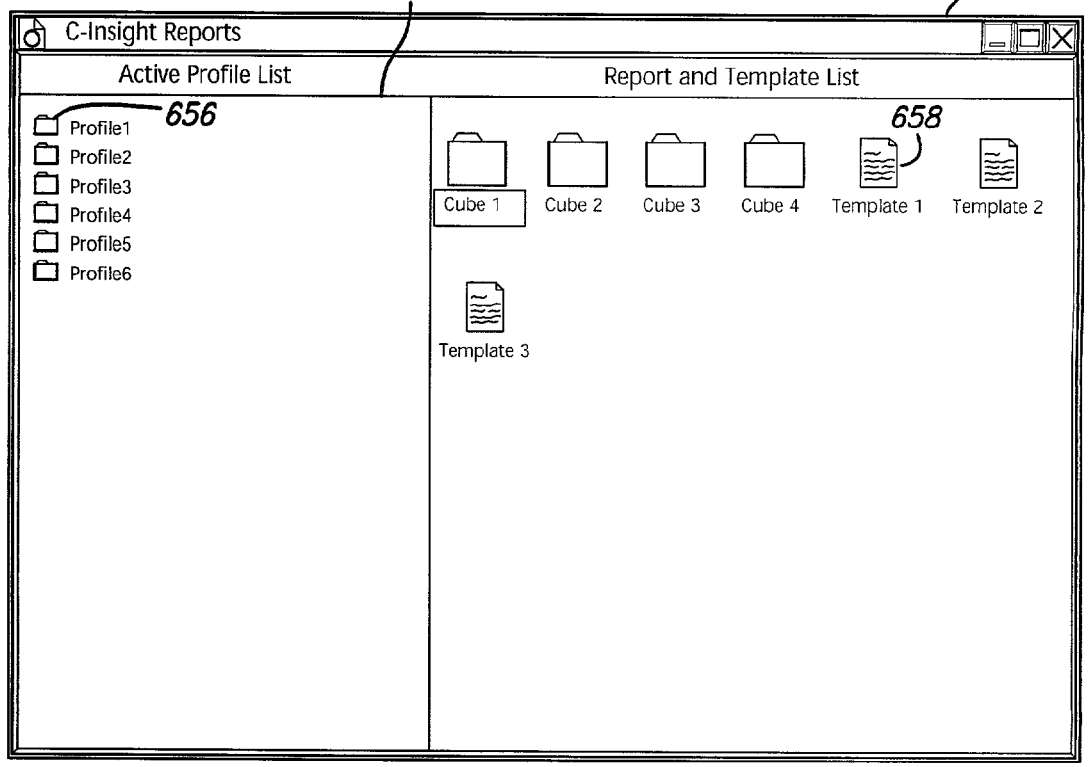
FIG. 7A illustrates a representative business report definition screen in a specific embodiment of the present invention.
Figure 7B:
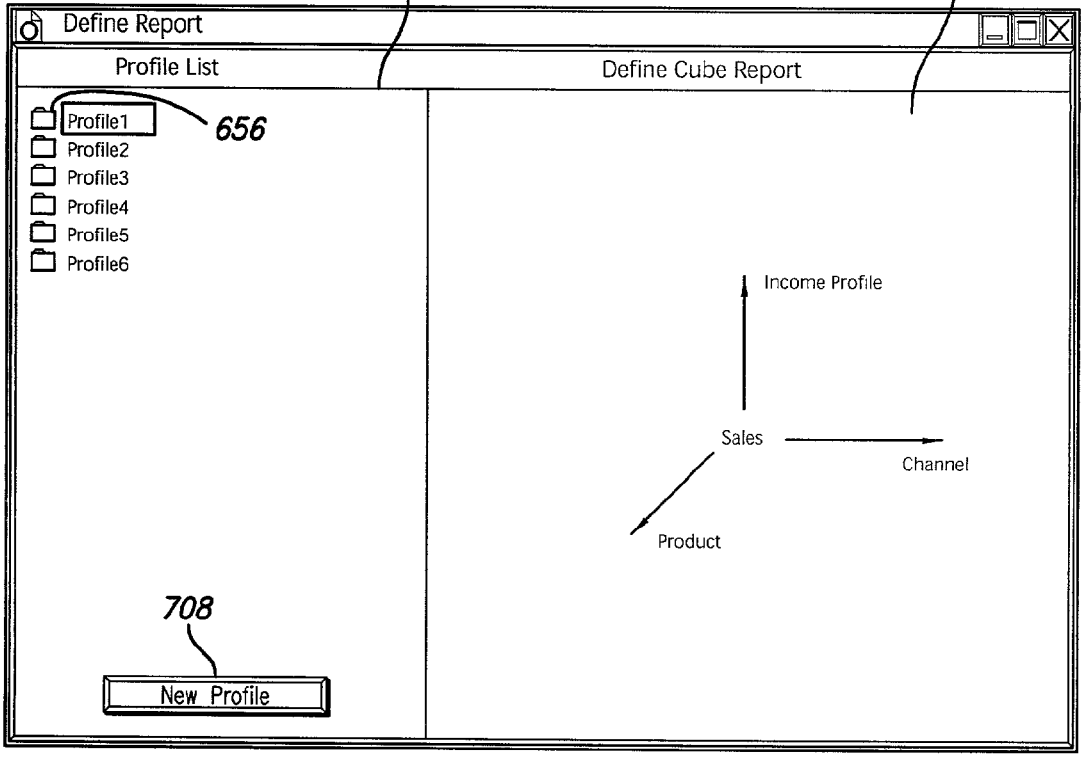
FIG. 7B illustrates a representative menu screen in a specific embodiment of the present invention.

FIG. 7A illustrates a representative business report definition screen in a specific embodiment of the present invention. In specific embodiments, reports may be pre-defined or template based. Pre-defined reports comprise reports in which a user has defined the dimensions. Typically, pre-defined reports are not changed at run time. Template reports comprise reports, in which customer profile dimensions can be added, deleted, or edited at run time. For example, adding a new customer profiles dimension to a template report may be accomplished by dragging and dropping a profile. FIG. 7A shows a report panel 650 having a profile panel 652 and a report and template panel 654. Profile panel 652 has a plurality of profiles displayed therein. These profiles comprise a set of user-defined profiles. The user can add a profile, such as Profile1 656, to a template report, such as template report 658, by dragging and dropping the Profile1 656 icon to the Template report 658. If a user would like to edit or delete profiles from template report 658, the user can double click on the template report icon 658 to invoke a "define business report" dialog as shown in FIG. 7B. The user can drag and drop a profile from the profile panel 652 to the report and template panel 654 in order to create either a profile dimension or cube filter.

FIG. 7B illustrates a representative business report definition screen in a specific embodiment of the present invention. In a specific embodiment, when a business user selects a template report, such as template report 658 in FIG. 7A, a "define business report" dialog 702 shown in FIG. 7B will be brought up. Using the define business report dialog 702, the user can view the report organization and add/delete dimensions. A profile panel 704 provides icons for available profiles. A "define cube report" panel 706 shows dimensions and detail information for a profile selected from the profile panel 704. For example, Profile1 656 in the profile panel 704 comprises sales data that is arranged according to dimensions of income profile, channel, and product. To add a new profile dimension for the report, the user can drag a profile from profile panel 704 and drop it into the define cube report panel 706. New profiles may be defined by clicking a "New profile" button 708 to bring up a "define new profile" dialog, which will be described in further detail herein below.

Figure 7C:
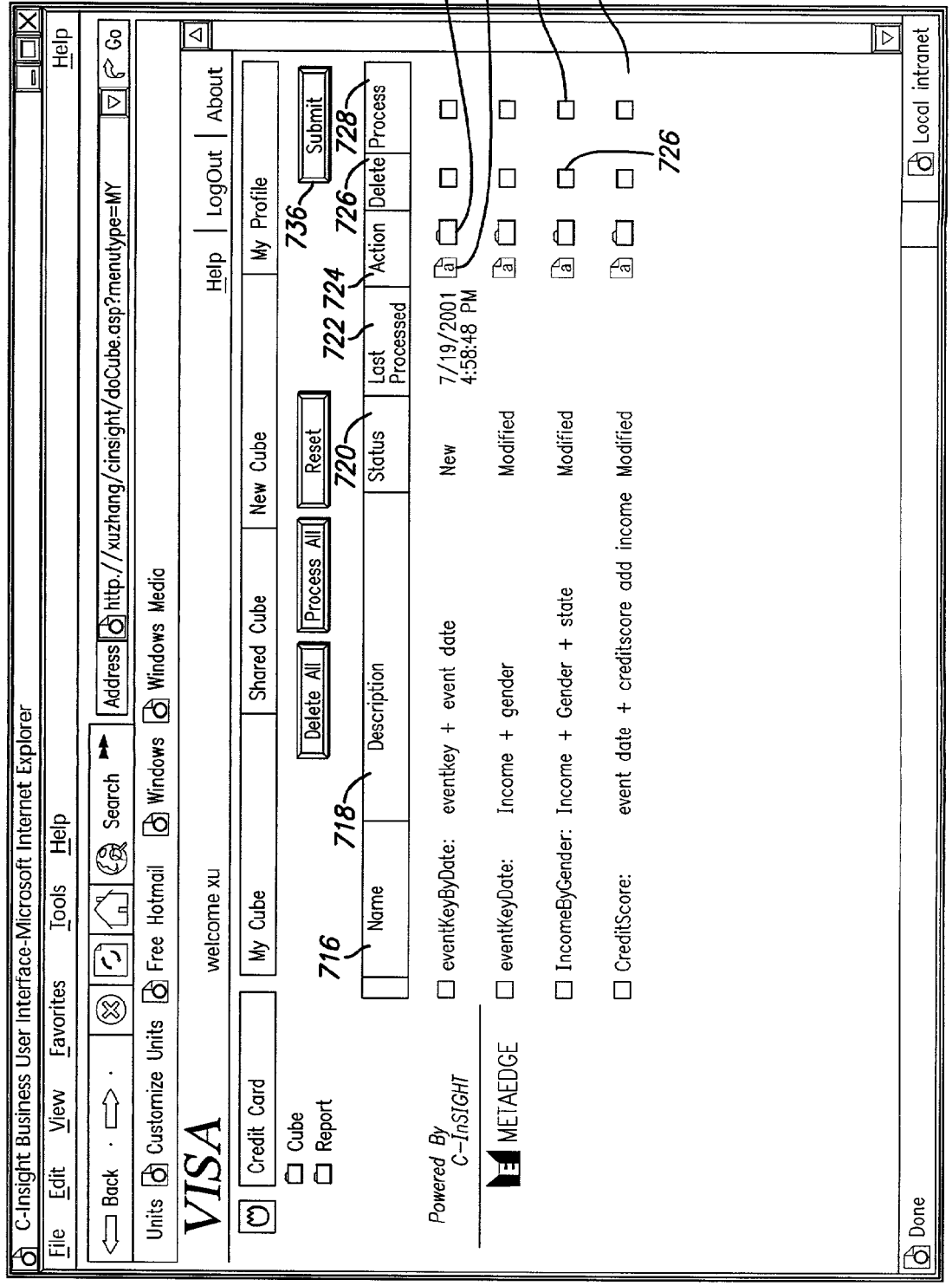
FIG. 7C illustrates a representative set permissions screen in a specific embodiment of the present invention.

FIG. 7C illustrates a representative menu screen in a specific embodiment of the present invention. In a specific embodiment, when a business user selects the My Cube 634 option on menu 632 in FIG. 6D, a My Cube interface 712 is presented to the user. In a specific embodiment, My Cube interface 712 provides a display area 714 in which a variety of information about cubes defined to the system can be displayed. For example, information such as a cube name 716, a description 718, a status 720, a date and/or time that the cube was last processed 722, one or more actions 724, a deletion selection option 726 and a process selection option 728 are displayed for cubes defined to the system in a specific embodiment. In a representative example, the user can select a particular cube by name, such as example cube "eventKeyDate1" as shown in display area 714. Selecting an edit option 730 from among actions 724 for this cube enables the user to edit an existing cube structure. The user can set permissions for the cube eventKeyDate1 by selecting a set permissions option 734 from among actions 724. These permissions enable the user to allow group(s) of users to view the cube. Checking deletion selection option 726 and pressing submit button 736 deletes the cube. Checking process selection option 728 and pressing submit button 736 processes the cube. Processing can run in another machine, or in the same machine as the selection panel 712 in various specific embodiments. Selecting the cube name enables a browse data function. This option can invoke an online cube interface that will link to a cube. In specific embodiments, the cube can be viewed using OLAP, for example.

Figure 7D:
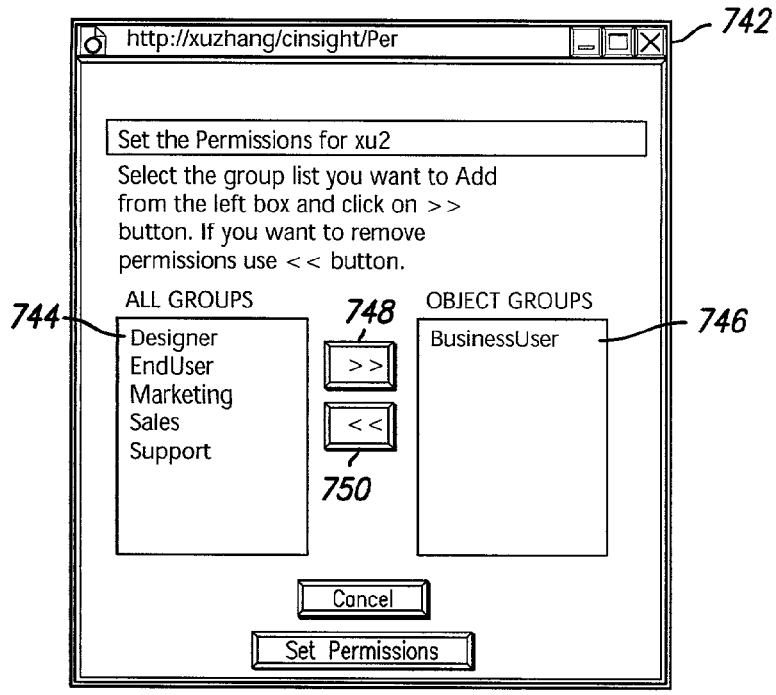
FIG. 7D illustrates a representative menu screen in a specific embodiment of the present invention.

FIG. 7D illustrates a representative set permissions screen in a specific embodiment of the present invention. In a specific embodiment, when a business user selects the set permissions option 734 of selection panel 712, the business user will be presented with a permissions dialog panel 742. Representative permissions dialog panel 742 includes an all groups panel 744 and an object groups panel 746. Selecting from the all groups panel 744 and clicking a right arrow button 748 adds a selected group to the object groups panel 746. Selecting from the object groups panel 746 and clicking a left arrow button 750 removes a selected group from the object groups panel 746. In specific embodiments, a variety of groups can be granted various permissions. For example, in the representative permissions dialog panel 742, permissions for the following groups can be set:

Predefined Group—A Predefined group has been defined for the user. Such predefined groups can be used to show different interfaces to different groups. Representative examples of predefined groups include: Designer, Business User, End User, and the like.

User Defined Group—User defined groups can be defined by a system administrator, for example, using a window interface.

FIG. 7E illustrates a representative menu screen in a specific embodiment of the present invention. In a specific embodiment, when a business user selects the Shared Cube 636 option on menu 632 in FIG. 6D, a Shared Cube interface 752 is presented to the user. In a specific embodiment, Shared Cube interface 752 provides a display area 754 in which a variety of information about shared cubes defined to the system can be displayed. For example, information such as a cube name 756, an owner name 757, a description 758, a status 760, and a date and/or time that the cube was last processed 762 are displayed for shared cubes defined to the system in a specific embodiment. Shared cube interface 752 allows a user to view another user's cube. For example, in a representative example, the user can select a particular shared cube by name, such as example shared cube "anna.test" 764 shown in display area 754. In a specific embodiment, the name can also serve as a link to an online cube if the cube has been processed successfully.

A business user can generate new cubes, or modify existing cubes based upon information in the database via the Business User Cube Constructor Interface. A Designer or a Business User can create new cubes, reports, or profiles using facilities accessible through this interface. In a specific embodiment, information about the security level for each report, including cubes in designer interface, are kept in the repository database.

In specific embodiments, the user can generate a new report by adding, and/or editing one or more profile based dimensions to a report produced by a Designer, or to a previously created report.

In specific embodiments, the user can create a new cube by clicking on the 'New cube' menu item on the project level node. The list of the existing cube templates will be presented on the right pane of the Snap-In. The user can select one of the templates and click on 'New' menu item, or double-click on selected icon.

In specific embodiments, the user can generate a new profile through this interface based on existing attributes or/and codes. The user can also generate new codes and new event attributes. In a specific embodiment, derived attributes may be generated through this interface, while basic attributes and derived attributes can be generated through designer interface. User's can create new pathways to analyze information by creating segmentation codes for the information, then creating one or more profiles, and then creating a report.

Figure 7G:
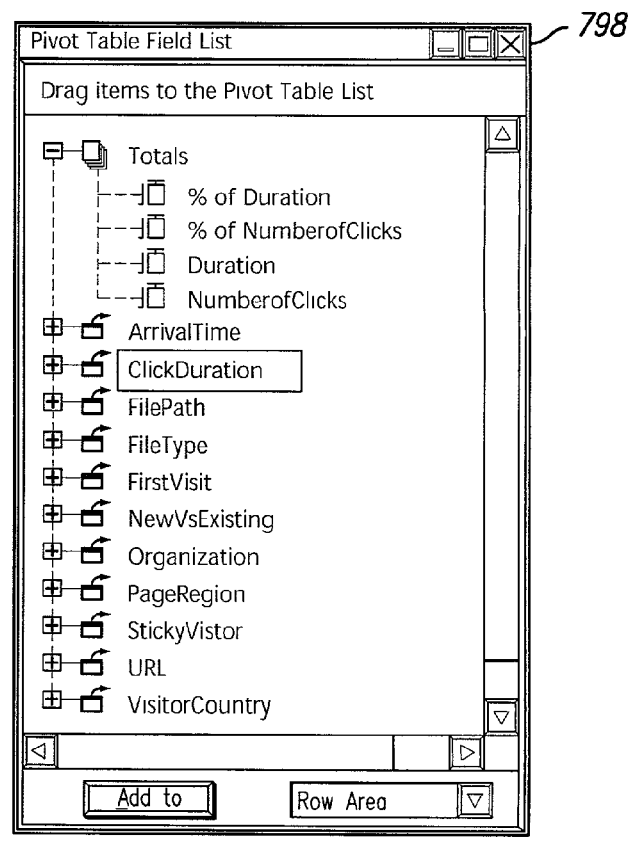
FIG. 7G illustrates a pivot table list in a specific embodiment of the present invention.
Figure 7F:
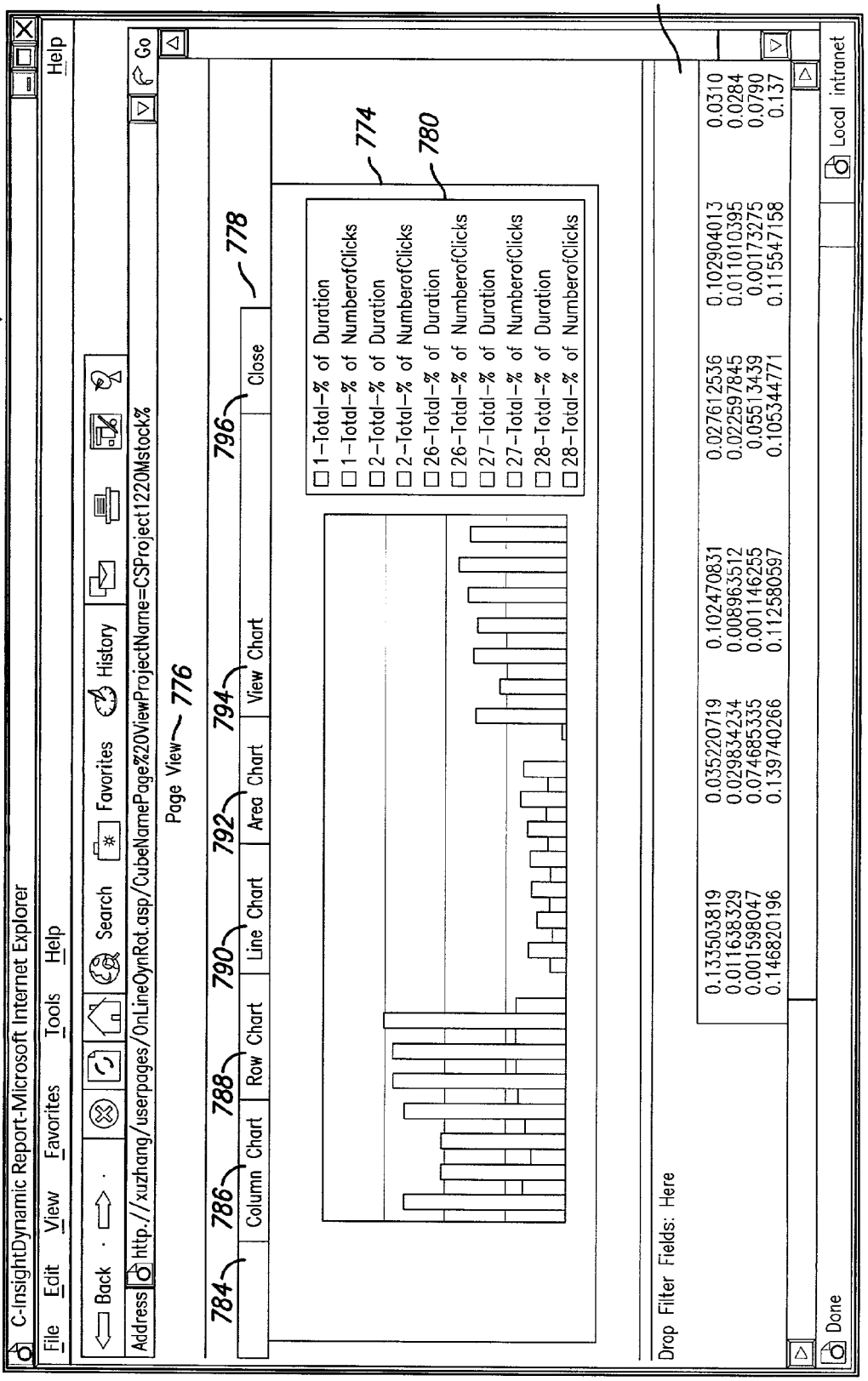
FIG. 7F illustrates a representative information browsing interface in a specific embodiment of the present invention.

FIG. 7F illustrates a representative information browsing interface in a specific embodiment of the present invention. In a specific embodiment, when a business user selects the name of a shared cube 764 Shared Cube interface 752 in FIG. 7E, a shared cube browsing interface 772 is presented to the user. In a specific embodiment, shared cube browsing interface 772 provides a display area 774 in which a variety of information about the shared cube 764 defined to the system can be displayed. For example, in a shared cube browsing interface 772 comprises a cube name 776, a menu bar 778, a pivot chart 780, and a pivot table 782. Menu bar 778 comprises one or more options such as a pivot table view 784, a column chart 786, a bar chart 788, a line chart 790, an area chart 792, a view pivot table and chart option 794, and a close button 796.

FIG. 7G illustrates a pivot table list in a specific embodiment of the present invention. In a specific embodiment, when a business user selects by pressing a view pivot table and chart button 794 of shared cube browsing interface 772, the business user will be presented with a field list 798. The field list 798 provides a variety of fields that can be dragged to the pivot table 782.

Figure 8A:
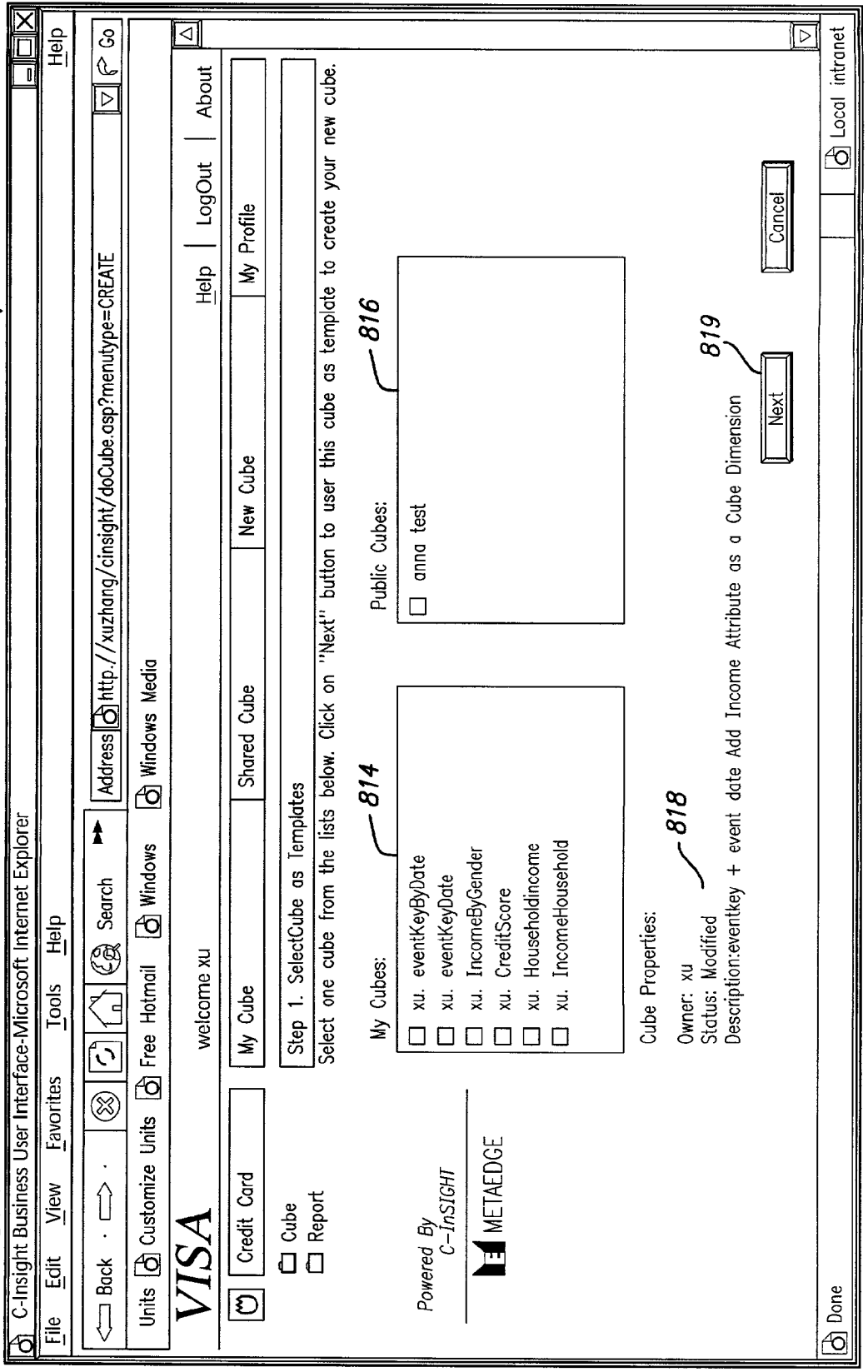
FIG. 8A illustrates a representative new user cube definition interface in a specific embodiment of the present invention.

FIG. 8A illustrates a representative new user cube definition interface in a specific embodiment of the present invention. In a specific embodiment, when a user clicks on a new menu popped up from a cube folder, a new user cube definition panel 812 is displayed. When the user creates a new cube from an existing cube, this step may be skipped. The new user cube definition interface panel 812 is invoked when the user clicks on New Cube menu on the top menu bar. The new user cube definition interface panel 812 comprises a my cube panel 814 and a public (shared) cube group panel 816. The user chooses a cube of interest from either My Cube group or Shared Cube group. The cube owner, status and description for the cube are displayed in cube properties box 818. When the user clicks the "Next" button 819, a create cube panel is displayed.

Figure 8B:
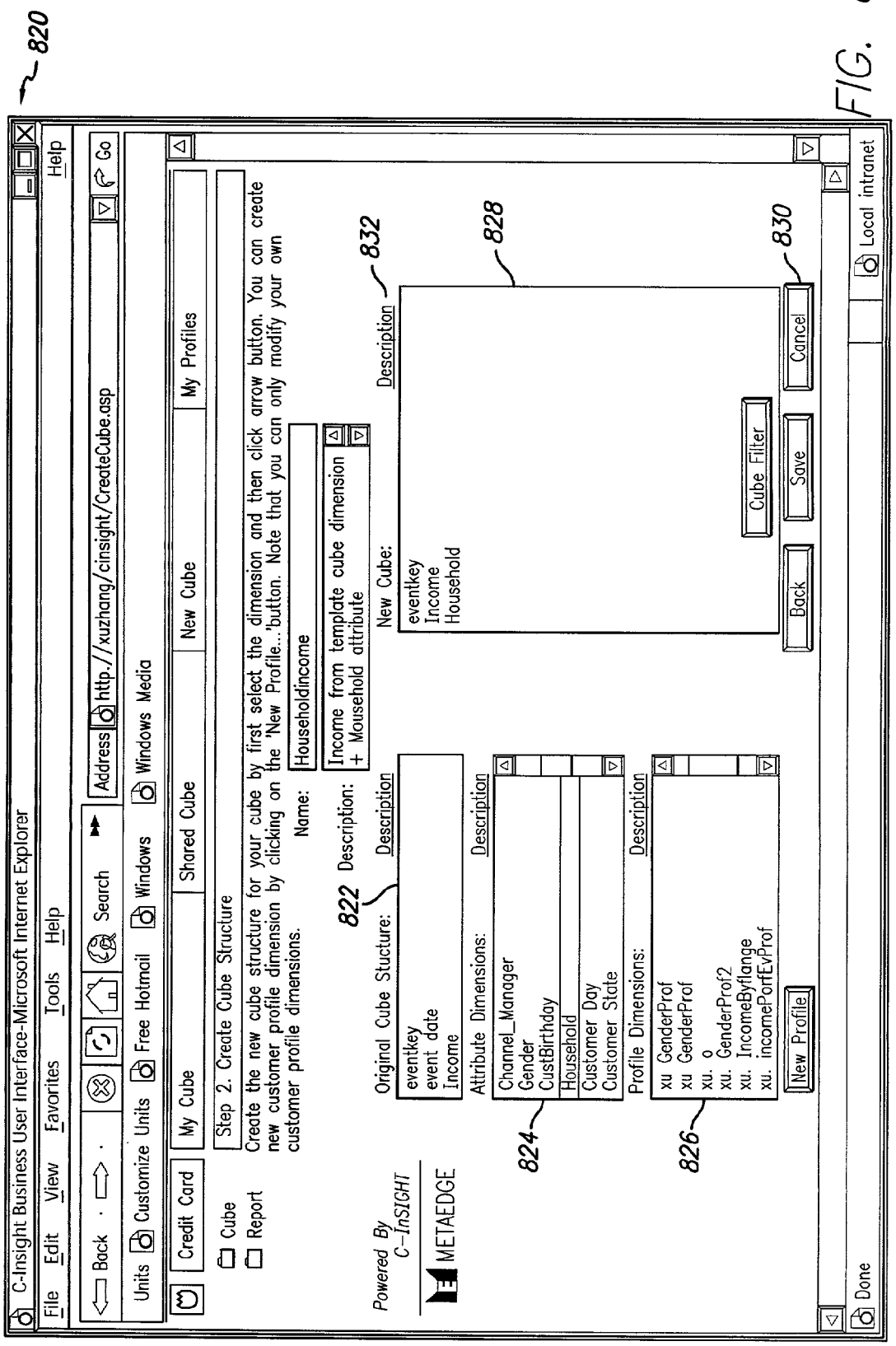

FIG. 8B illustrates a representative create new cube structure interface in a specific embodiment of the present invention. In a specific embodiment, the create new cube structure interface 820 may be used to build a new cube based on a designer cube or a business user cube. Create new cube structure interface 820 comprises an original cube structure window 822, that lists dimensions from a user-selected cube chosen from new user cube definition interface panel 812 of FIG. 8A. An attribute dimensions panel 824 lists attributes available for a user to use as dimensions in his/her new cube. A profile dimension panel 826 lists profiles available for a user to use as dimensions in his/her new cube. A new cube panel 828 lists dimensions selected for the new cube. When a user opens this dialog after selecting a cube, dimensions from the user-selected cube will be displayed in panel 828. A cube filter button 830 enables the user to invoke a cube filter interface, as discussed herein below with reference to FIG. 8D. A description link 832 invokes a description.

Clicking on a list item in any panel and then clicking on a corresponding description link 832 on the top right of the list box will bring up a pop up window 836 containing a description for the selected item(s) as shown in FIG. 8C.

Figure 8E:
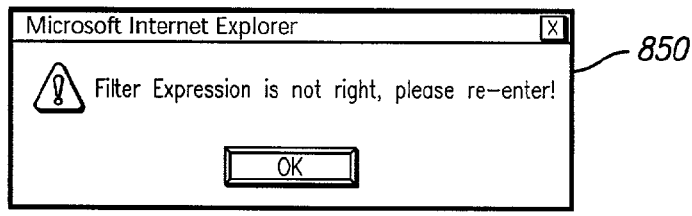

FIG. 8D illustrates a representative cube filter interface in a specific embodiment of the present invention. The cube filter interface 840 enables a user to define a filter based upon attributes. A representative cube filter interface 840 comprises a filter attributes panel 842 having a listing of one or more attributes that may be incorporated into a filter. A user can select particular ones from the filter attributes panel 842 using a mouse, touch screen or other pointing device, and add the selected filter attribute to a filter expression contained in a filter expression field 844 by clicking an insert filter attribute button 846. One or more relationship indications can be selected from a relationships panel 848, and adding the relationship by clicking the insert filter attribute button 846. A clear expression button 847 enables the user to start over, if desired. A syntax check is performed on the filter expression after the user clicks on an "OK" button 849. If the filter expression syntax is right, this window will be closed and the user can be returned back to a previous panel. If the syntax of the entered filter expression is not right, a message popup window 850, as shown in FIG. 8E, will appear to ask the user to retype the filter expression. This will narrow the chance of processing failure.

FIG. 9A illustrates a representative define profile interface in a specific embodiment of the present invention. Using a define new profile interface panel 900, the user can add new attributes into a existing profile by dragging one or more attributes, such as attribute 901, for example, from a left panel 902 and dropping the attributes into a profile, such as profile 903, for example, within a right panel 904. The user can also create a new profile by dropping an attribute into a profile named "Template profile" 906, which will create a new profile. The user can also edit a profile by right clicking on a profile icon and selecting the "Edit" function from a pop-up menu, or by double clicking the profile icon to start a Profile Editing dialog.

Further, the user can choose to define a new attribute for a profile by clicking a "New Attribute" button 908 at the bottom of the left panel 902. A new dialog will start, from which the user can select an event-based attribute, and select an event graph to create an event-based dynamic attribute, which is described in greater detail herein below with reference to FIGS. 11–17C. Alternatively, or in addition, the user can select a state-based attribute that will bring the user into an aggregation interface.

Figure 9B:
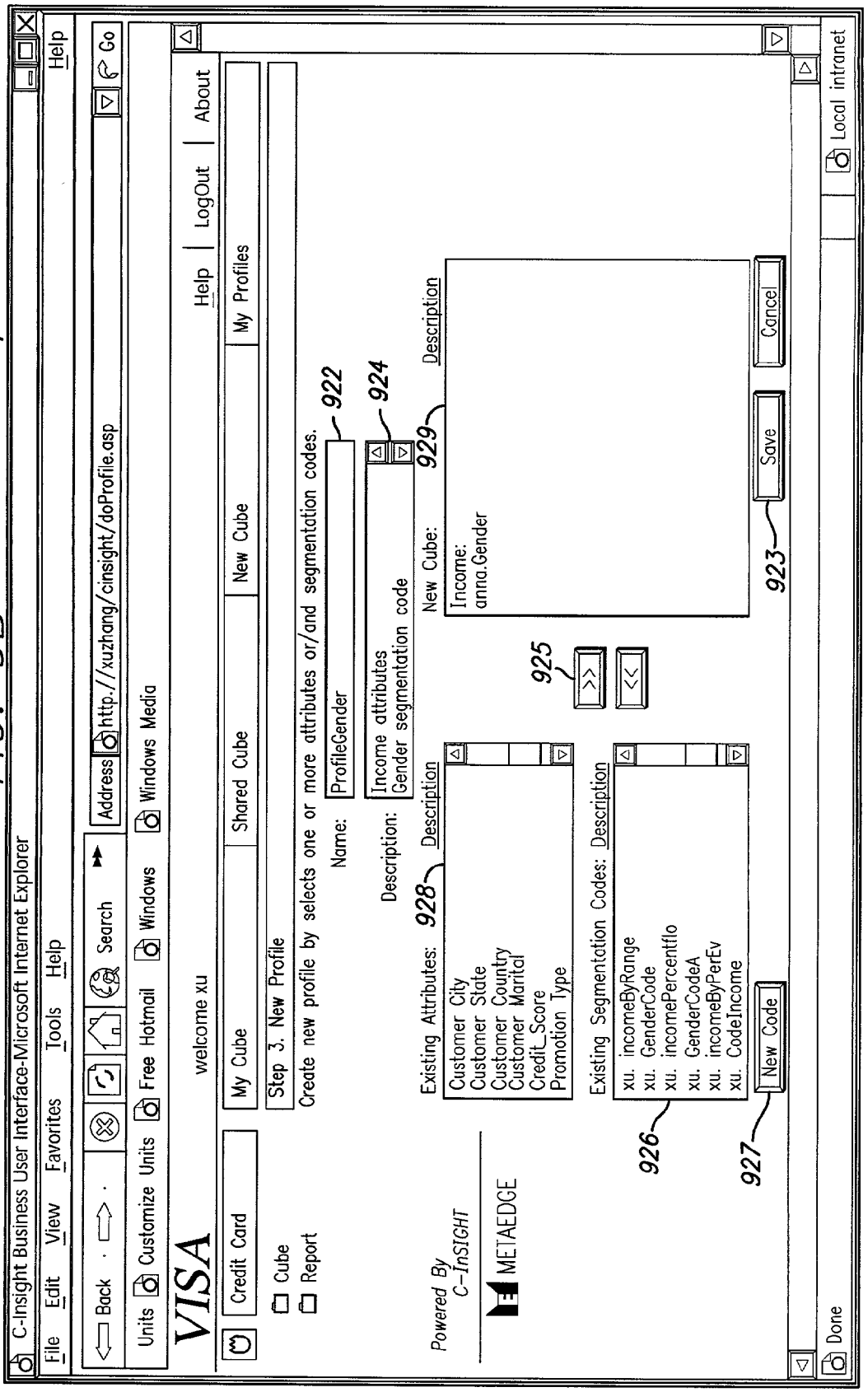
FIGS. 9B–9C illustrate a representative create new profile interface in a specific embodiment of the present invention.
Figure 9C:
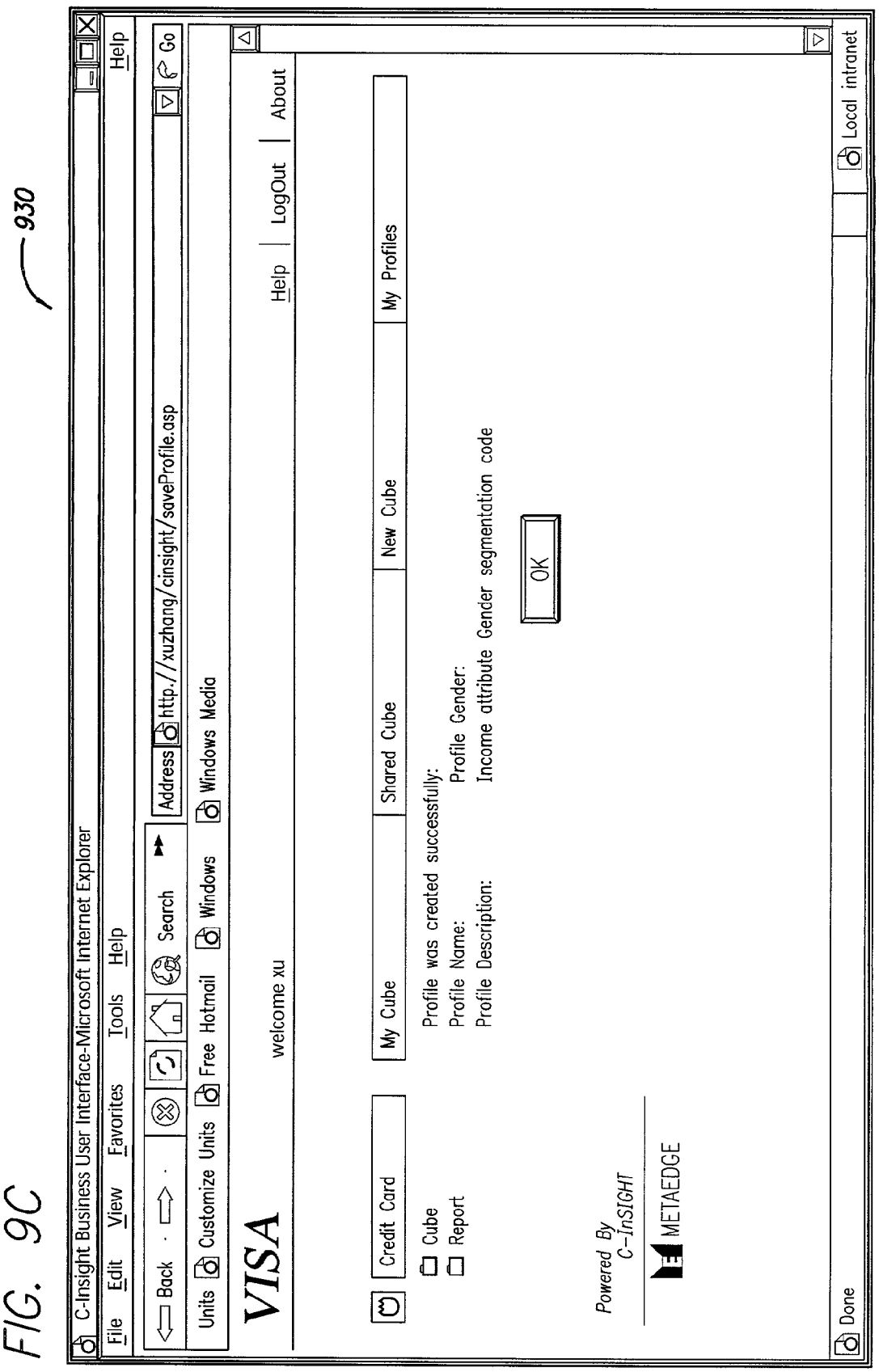

FIG. 9B illustrates a representative create new profile interface in another specific embodiment of the present invention. Using a create new profile interface panel 920, the user can create a new profile by using existing segmentation codes and attributes, including basic attributes, derived attributes, and event attributes. Create new profile interface panel 920 includes a new profile name field 922, a descriptive profile core table field 924, for receiving information about the new profile. An existing attributes panel 928 comprises a place to display one or more existing attributes from which the user may select to include in the new profile. An existing segmentation codes panel 926 comprises a place to display one or more existing segmentation codes from which the user may select to include in the new profile. The user can select one or more of the existing attributes and/or the existing segmentation codes for inclusion into the new profile using select and deselect arrow buttons 925. Alternatively, or in addition, the user can choose to create one or more new segmentation codes by clicking a new code button 927 to invoke a define new segmentation code interface panel 1000 of FIG. 10A. The newly generated profile will appear in a new profile list 929. The user can choose to add it to the new cubes. Clicking on a Save button 923 will create a new profile in the repository. FIG. 9C illustrates a representative save Profile confirm page in a specific embodiment of the present invention. The save profile confirm page 930 is displayed to provide the user with feedback that the profile was created successfully.

Figure 10B:
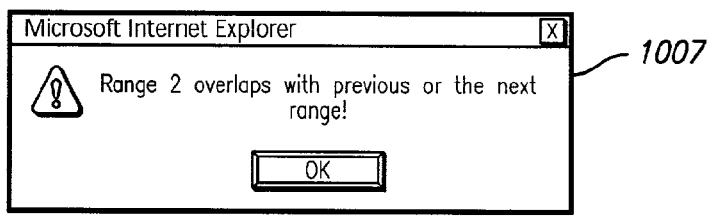
FIGS. 10A–10B illustrate a representative define new segmentation code interface in a specific embodiment of the present invention.
Figure 10E:
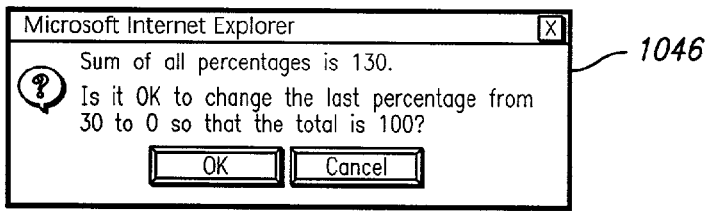
FIGS. 10C–10E illustrate representative define segmentation code by percentage interfaces in a specific embodiment of the present invention.
Figure 10G:
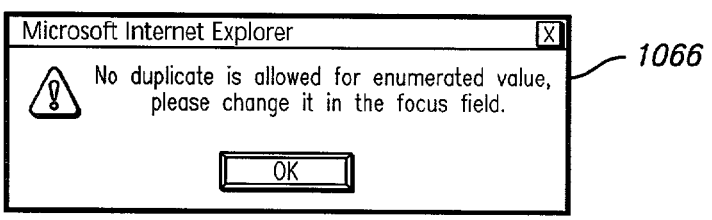
FIGS. 10F–10G illustrate a representative define segmentation code by enumeration interface in a specific embodiment of the present invention.
Figure 10A:
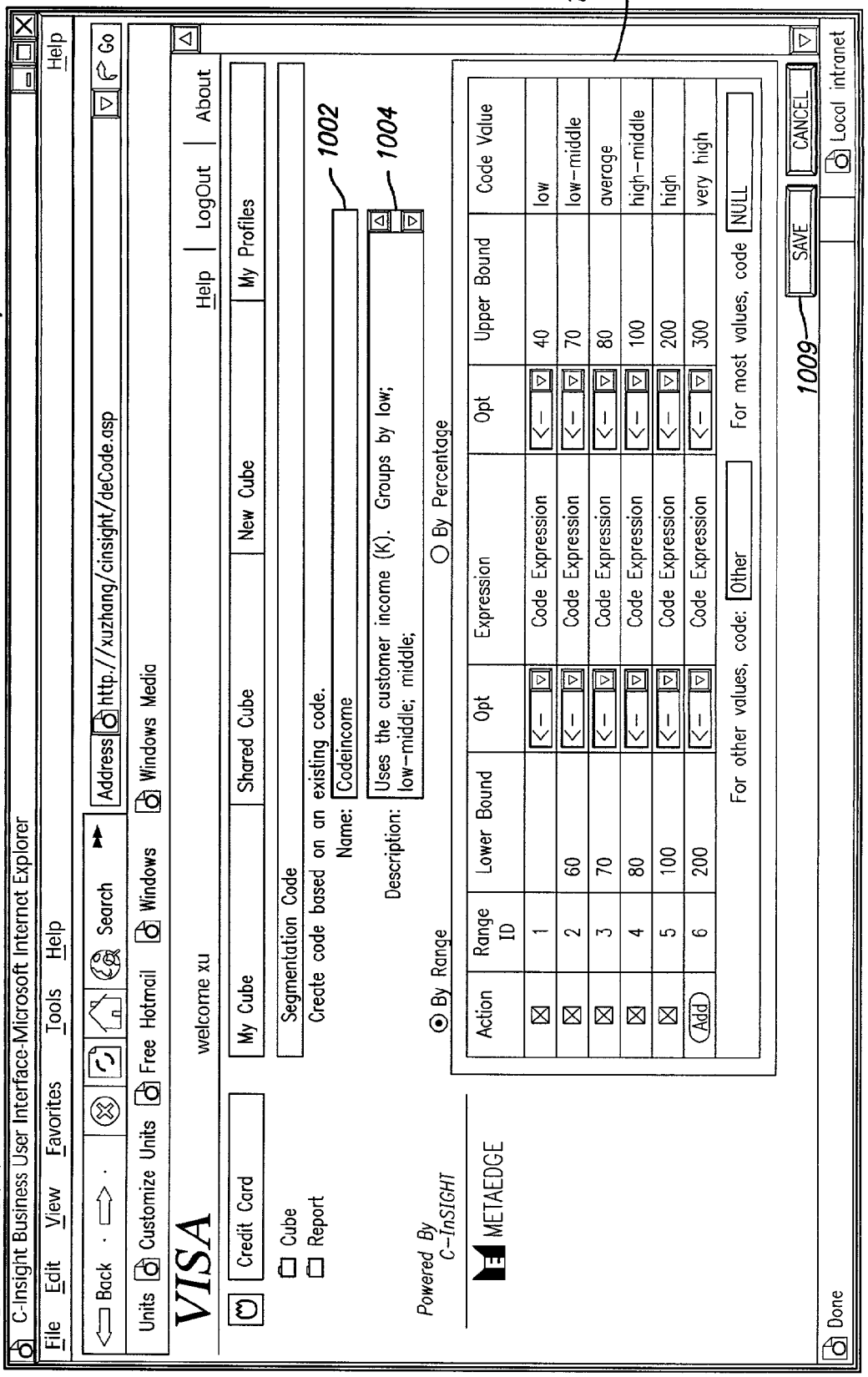

FIG. 10A illustrates a representative define new segmentation code interface in a specific embodiment of the present invention. Using a define segmentation code interface panel 1000, the user can create a segmentation code based upon an existing code or attributes. The user can click on an existing segmentation code to enable a new code button. The user can click on the new code button to invoke a new segmentation code interface panel 1000 in order to create a new code based on an existing code. Users can build a code segmentation expression by selecting from a list of available attributes. New segmentation code interface panel 1000 comprises a code name field 1002, a description field 1004, for displaying information about the code. A define segmentation code by range interface panel 1008 comprises a place to display area for one or more existing segmentation codes and ranges for the codes, code expressions, and code values from which the user may selectively choose to include in the new segmentation code. Once the user has input her selections, she can click a save button 1009 to invoke an error checking process for determining overlap of lower and upper bounds for the segmentation code. If an error is detected, an error check overlapping of lower bound and upper bound screen, such as error checking screen 1007 illustrated by FIG. 10B is displayed.

Figure 10C:
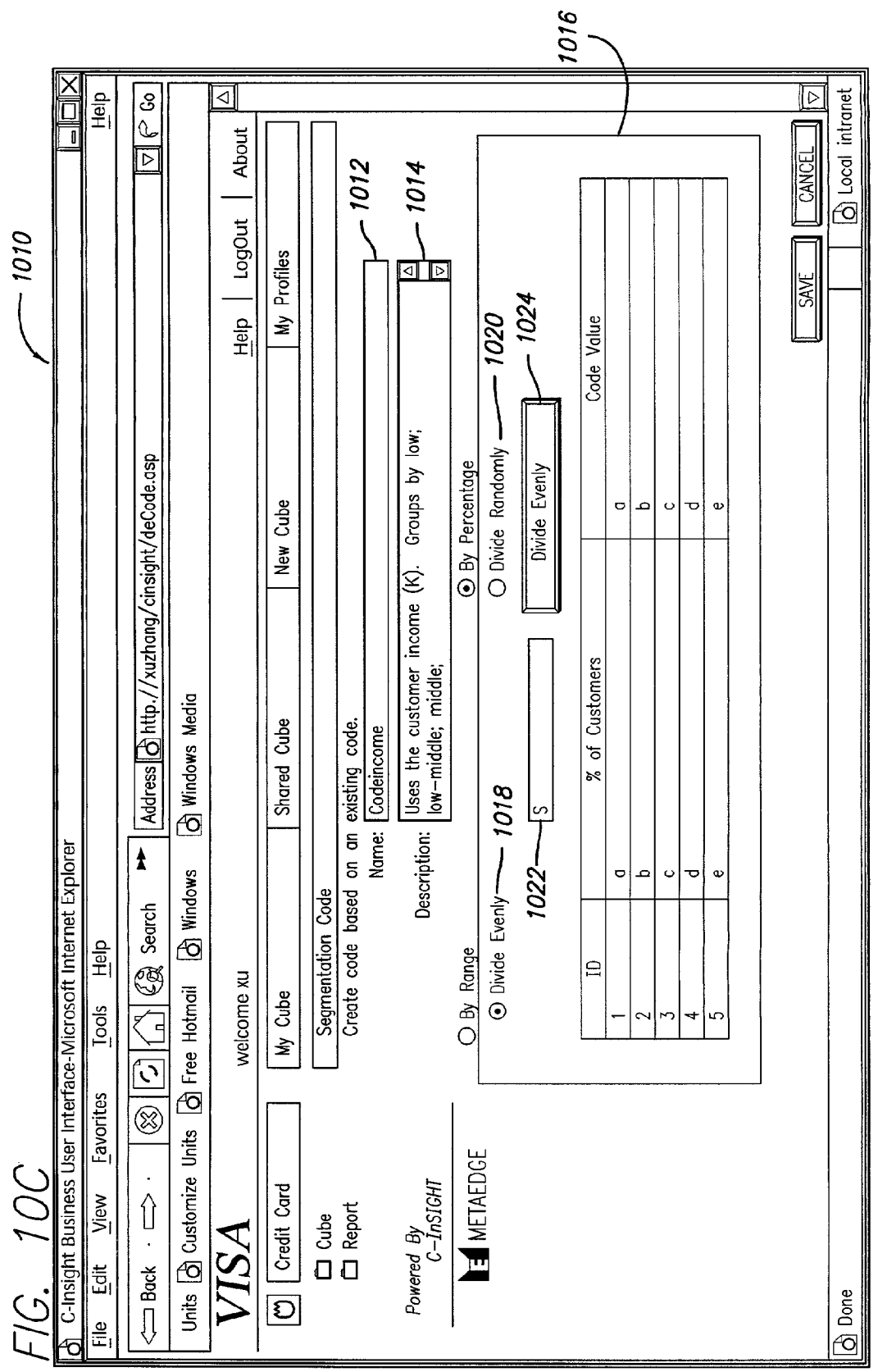

FIG. 10C illustrates a representative define segmentation code by percentage interface in a specific embodiment of the present invention. As illustrated by interface panel 1010 of FIG. 10C, segmentation codes can be divided evenly by percentage in a specific embodiment of the present invention. Define segmentation code interface panel 1010 comprises a code name field 1012, and a description field 1014 for displaying information about the code. A define segmentation code by percentage interface panel 1010 comprises a display area 1016 for displaying one or more existing segmentation codes, percentages for the codes, and code values. The user may selectively choose to divide the segmentation code evenly by clicking a Divide Evenly button 1018, or to divide the segmentation code randomly by clicking a Divide Randomly button 1020. Here, the user has chosen to divide the new segmentation code evenly, so a number of divisions field 1022 is provided to receive input of a number of divisions. After the user enters a desired number of divisions into the number of divisions field 1022, she can click a divide evenly button 1024 to apply the input to the segmentation code.

Figure 10D:
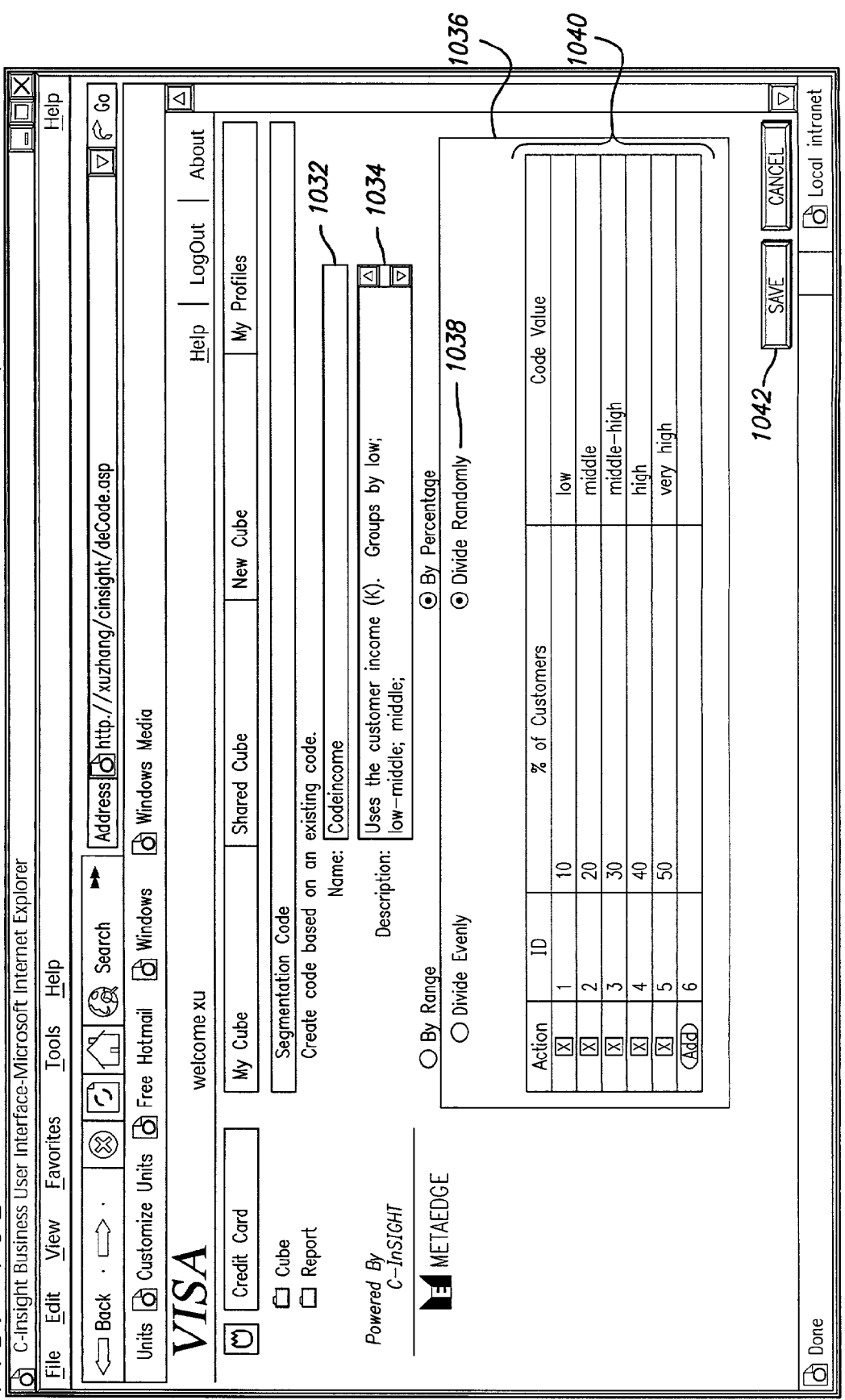

FIG. 10D illustrates a representative define segmentation code by percentage interface in a specific embodiment of the present invention. As illustrated by interface panel 1030 of FIG. 10D, segmentation codes can be divided randomly by percentage in a specific embodiment of the present invention. Define segmentation code interface panel 1030 comprises a code name field 1032, and a description field 1034 for displaying information about the code. A define segmentation code by percentage interface panel 1030 comprises a display area 1036 for displaying one or more existing segmentation codes, percentages for the codes, and code values. Here, the user has selectively chosen to divide the segmentation code randomly by clicking a Divide Randomly button 1038. Accordingly, a plurality of segmentation division fields 1040 is provided in display area 1036 in order to receive input of information about one or more segmentations. Once the user has input her segmentations, she can click a save button 1042 to invoke an error checking process for determining that the percentages entered total 100% for the segmentation code. If an error is detected, an error check summation screen 1046, such as illustrated by FIG. 10E is displayed.

Figure 10F:
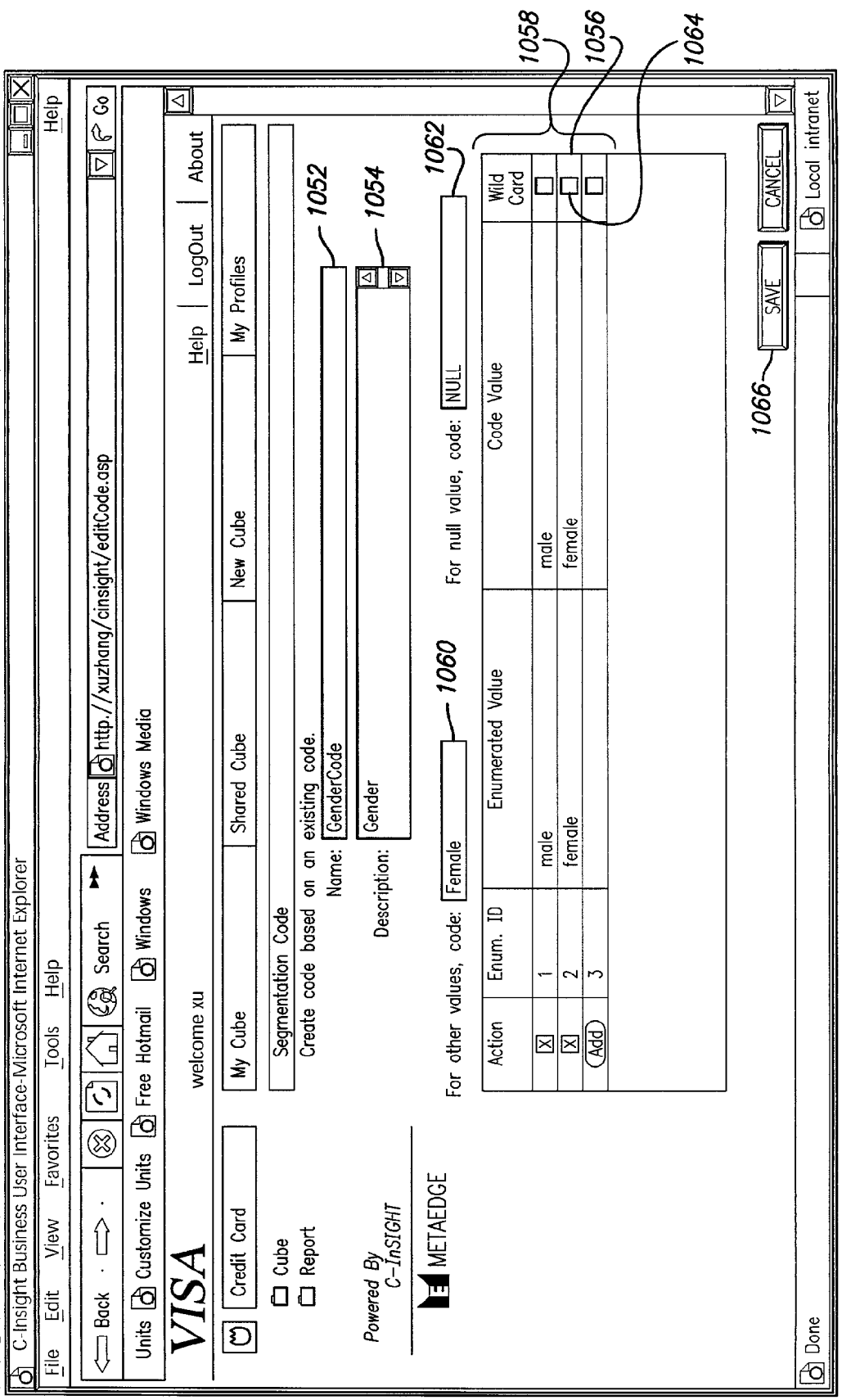

FIG. 10F illustrates a representative define segmentation code by enumeration interface in a specific embodiment of the present invention. As illustrated by interface panel 1050 of FIG. 10F, segmentation codes can be divided by enumeration in a specific embodiment of the present invention. Define segmentation code interface panel 1050 comprises a code name field 1052, and a description field 1054 for displaying information about the code. Define segmentation code by enumeration interface panel 1050 comprises a display area 1056 for displaying one or more existing segmentation codes, enumerated values for the codes, and code values.

Here, the user has selectively chosen to divide the segmentation code into two enumerated types, male and female. Accordingly, a plurality of segmentation division fields 1058 is provided in display area 1056 in order to receive input of information about these segmentations. An "other values" code field 1060 receives enumerated values input from the user, and a "null value" code field 1062 receives values for the null code input from the user. A wild card check box 1064 provides a mechanism for indicating that a particular enumerated type match data that is like the enumerated data. Once the user has input her segmentations, she can click a save button 1066 to invoke an error checking process for determining that none of the segmentation values entered overlap. If an error is detected, an error check summation screen 1066, such as illustrated by FIG. 10G is displayed.

FIG. 11 illustrates a representative profile interface in a specific embodiment of the present invention. As illustrated by FIG. 11, a representative profile interface panel 1100 comprises of a list of profiles 1102, a list of segmentation codes 1104, an editing interface icon 1106, a set permissions page icon 1108, a delete profile or code check box 1110, and a process profile or code check box 1112. Clicking on editing interface icon 1106 will invoke an interface for editing profiles. Clicking on the set permissions page icon 1108 will invoke the set permissions page, enabling the user to grant or revoke access rights to profiles and/or codes. Checking check box 1110 will cause the deletion of an associated profile or code, and/or allow group deletion of profiles and/or codes. Checking process profile or code check box 1112 will enable the system to process the profile and/or code, and/or allow group processing of profiles and/or codes.

In specific embodiments, a business user is permitted to delete her own cubes, profiles, and codes through either one or both of the My Cube and/or the My Profiling interfaces. Groups of individuals may also be permitted to delete cubes, profiles, and codes through one or more of these interfaces in various specific embodiments.

In specific embodiments, a business user is permitted to process her own cubes, profiles, and codes through either one or both of the My Cube and/or the My Profiling interfaces. Groups of individuals may also be permitted to process cubes, profiles, and codes through one or more of these interfaces in various specific embodiments.

FIG. 12 illustrates a representative define target customer set interface in a specific embodiment of the present invention. Using a define target customer set interface panel 1200, the user can select a specific set of values, which can be either derived from a data mining modules, or based on specific analysis report from within a profile. A profile value set comprises a set of values comprising the ranges in a segmentation of one or more attributes in the profile. For example, if an income attribute is segmented according to $0–$10,000.00, $10,001.00–$50,000.00, and over $50,001.00, the profile value set comprises the various income levels in this segmentation, i.e., $0, $10,000.00, $10,001.00, $50,000.00, and $50,001.00.

The customer set interface panel 1200 comprises a profile value set panel 1202 and an action list panel 1204. The profile value set can be defined and pulled into the dialog 1200 from the main window interface. The user can drag a profile value set 1201 from the profile value set panel 1202 and drop it into an icon 1203 in the action list panel 1204 to enforce a marketing action. When the user drops a profile value set 1201 to an icon 1203 in the action list panel 1204, the system will query the database 101 to retrieve a list of customers that satisfy the profile value set 1201, and depending on the action, will use the customer list as a source of parameters to the action. For example, if the user defines an e-mail template for icon 1203, and then drops the profile value set 1201 on it, an e-mail will be sent out to the list of customer with the personalized e-mail contents retrieved from the customer database 101.

EVENT ATTRIBUTES

For example, consider a representative example situation in which a customer 'A' subscribed to a service, then the customer 'A' changed equipment, then the customer 'A' converted the service type, and then customer 'A' cancelled the service. These events may be expressed using event attributes as shown below:

Customer 'A'
  subscribed to the service level 'L1' then
  2 months later, changed the equipment model to 'E2' then
  2 months later, converse the service level to 'L2'
  3 months later, cancelled the service.

In specific embodiments, information objects can be defined in order to find out which of the customers have the same event sequence as customer 'A'. For example, an appropriate choice of event objects could include a Subscription, a Model Change, an Upgrade Service Level, and a Termination. These events, i.e., subscription, model change, upgrade service level, and termination, can be collected into an event graph object to show the temporal relationships that exist between them. The time period information, i.e., 2 months later, 2 months later, and 3 months later, and service level and model information, i.e., level='L1', model='E2', and level='L2' comprise event attributes, which may be collected into an event attribute object. A representative example of an event graph object and an event attribute object are shown below:

Event Graph object:

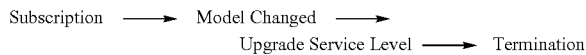

Event Attribute object:

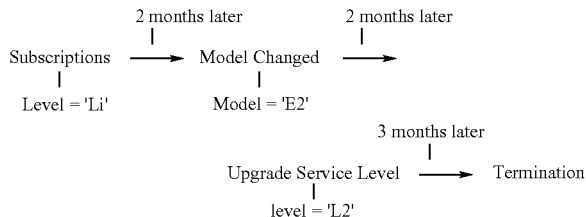

In specific embodiments, data structures can be defined for each of the information objects described above. For example, an event object can be defined by giving it an EventName, a centric table name (CtabName), an event table name (EventTabName), an event time stamp column name (EventTStampColName), an optional event type column (EventTypeColName), and an optional event type value (EventTypeVal). This may be expressed in a notation as shown below:

EventName(CTabName, EventTabName, EventTStampColName,

{EventTypeColName}, {EventTypeVal})

means to define event using
  event's centric table is CTabName
  event's event table is EventTabName,
  event's event timestamp column is EventTStampColName and
  event's event type column(optional) is EventTypeColName
  event's event type value(optional) is EventTypeVal Similarly, a data structure can be defined for each of the event graph object by giving it an event graph name, and a series of one or more event names. This may be expressed as indicated by the notation shown below:

EventGraphName(EventName$_1$-> EventName$_2$-> . . . -> EventName$_n$)

Means to define event graph containing EventName$_1$ follows by EventName$_2$ follows By . . . EventName$_n$ Analogously, a data structure can be defined for each of the event attributes in an event graph. For example, an event attribute object can be assigned an event attribute name, an event graph name, corresponding to an event graph having the event attributes, and a series of one or more event names. This may be expressed as indicated by the notation shown below:

EventAttributeName (
  EventGraphName (EventName$_i$ (f$_i$, d$_i$), . . . , EventName$_j$ (f$_j$,d$_j$))

means EventName$_i$, . . . , EventName$_j$ are selected in eventgraph EventGraphName with f$_i$ is node filter expression and d$_i$ is duration expression.

Figure 13:
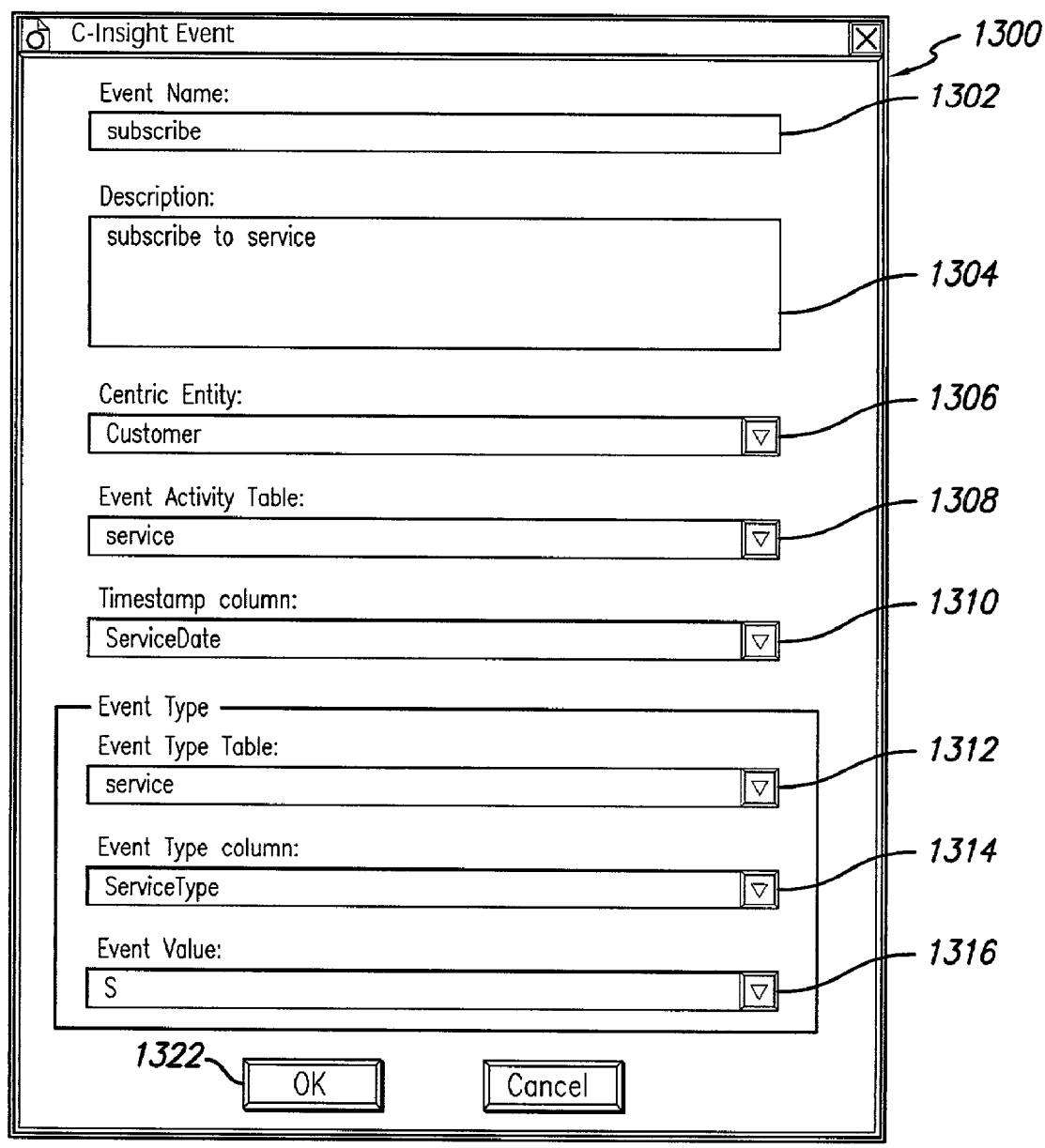
FIG. 13 illustrates a representative define event dialog in a specific embodiment of the present invention.

In a specific embodiment, a graphical user interface (GUI) is used to enable users to configure events and event attributes. Users can create, edit and delete, for example, events and event graphs. Further, users can create, edit, delete, and process derived attributes. FIG. 13 illustrates a representative define event dialog in a specific embodiment of the present invention. A define event dialog 1300 comprises an event name field 1302 and a description field 1304, in which a user can enter a description of the event. A centric entity pull down list 1306 provides selection of a centric entity, corresponding to focal group 421 of FIG. 4A. When a user selects a centric table from the centric entity pull down list 1306, an activity table that is related to the selected centric table is displayed in an event activity table pull down list 1308. Event activity pull down list 1308 provides selection of activities groups, which are one form of customized group 423 that relates to activities/events 415 in FIG. 4A. In FIG. 13, "Customer" has been chosen as a centric entity table and "Service" has been selected as event activity table.

Once the user selects an activity table, an event timestamp column pull down list 1310 provides all timestamp columns corresponding to the activity table, event activity parent activity table selected in event activity table pull down list 1308. An event type table pull down list 1312 will list an event table and event table lookup tables selected using pull down list 1308. When a user selects an event type table from pull down list 1312, an event type column pull down list 1314 will provide the non-PK and non-FK columns having data types of number or string. Responsive to a user selecting an event type column from pull down list 1314, an event values pull down list 1316 will list the non-null distinct values of the event type column selected using event type column pull down list 1314.

Once the user has entered the information into these fields, he/she clicks an 'OK' button 1322, causing an event definition comprised of the selected event table, event column, event timestamp column, and event column value to be stored in the repository 110. Event type information that can be entered using pull down lists 1312, 1314, and 1316 is considered optional. This is for an event table that does not contain any event type columns, such as, for example, a 'purchase' table that contains only the purchasing records, or a 'refund' table that contains only the refunding records.

Figure 14:
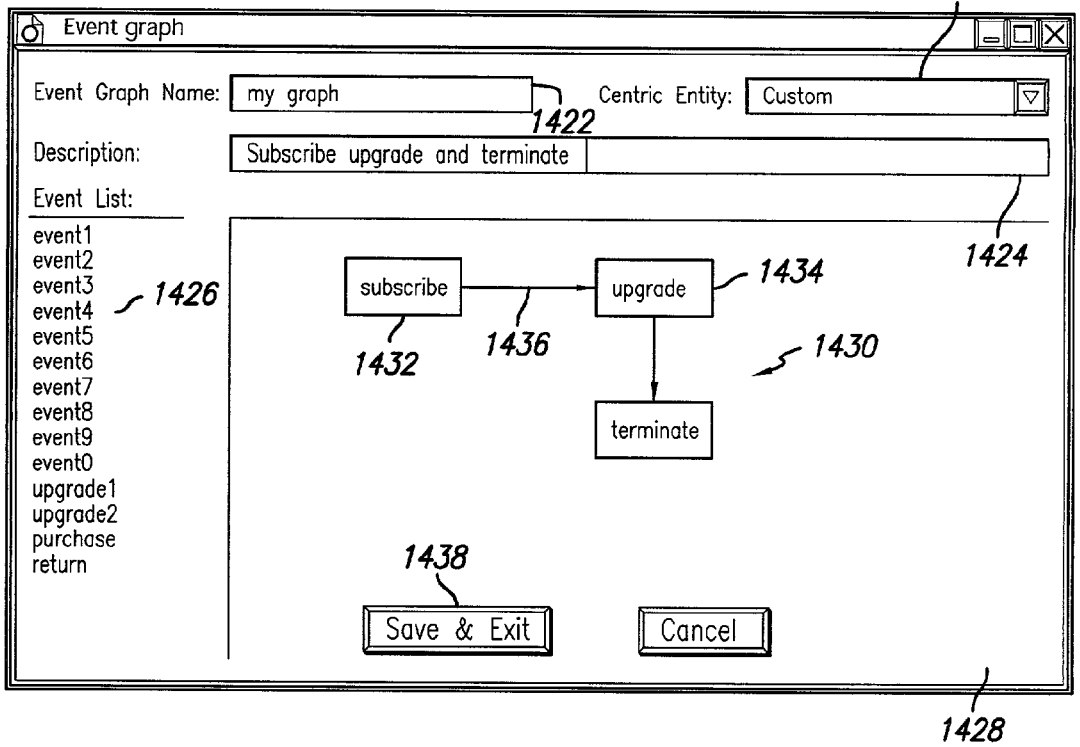
FIG. 14 illustrates a representative define event graph in another specific embodiment of the present invention.

FIG. 14 illustrates a representative define event graph in another specific embodiment of the present invention. A define event graph dialog 1420 comprises a name field 1422, a description field 1424, an event list 1426, a centric entity 1427, and a graph area 1428, in which a user can enter information in order to build an event graph 1430. The event list 1426 shows the defined events by short description which points to a triple event table/event column/event value. A user can give event graph 1430 a name and a description by entering this information into name field 1422 and description field 1424, respectively. The user can drag and drop events from event list 1426 to graph 1430 in the graph area 1428 in order to make event nodes, such as event node 1432 in the graph 1430. The user may drag from a first node 1432 to a second node 1434 to form an edge 1436 in the graph 1430 in order to indicate a time order dependency between the first and second nodes. Once the user has completed entering information, clicking a 'save' button 1438 causes entered information to be saved in repository 110. A valid graph is comprised by event nodes that contain same event timestamp column and event type column (if any) in the event tables, as shown below:

```
event1(CTab1,Etab1,ETSCol11,ETVCol11,val11)
event2(CTab1,Etab1,ETSCol11,ETVCol11,val12)
event3(CTab1,Etab1,ETSCol12,ETVCol12,val13)
event4(CTab1,Etab2,ETSCol21,ETVCol21,val21)
Then event1 -> event2 -> event4 is a valid graph.
But event1 -> event2 -> event3 is not a valid graph.
```

Figure 15:
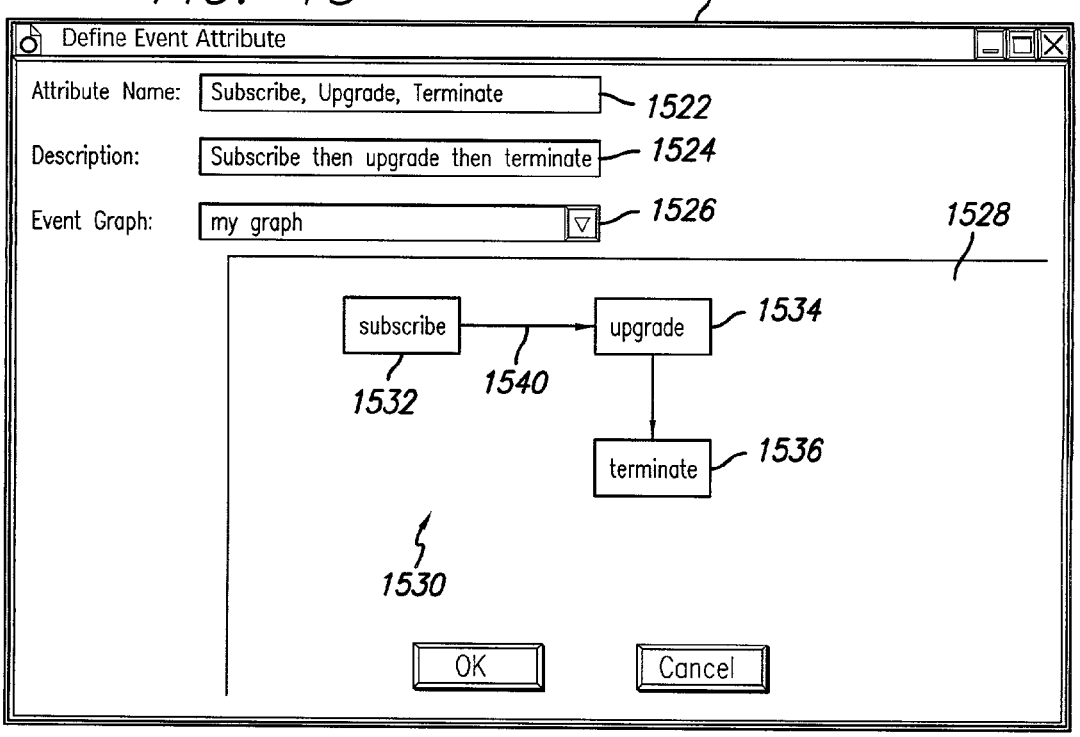
FIG. 15 illustrates a representative define event attribute dialog in a specific embodiment of the present invention.
Figure 16A:
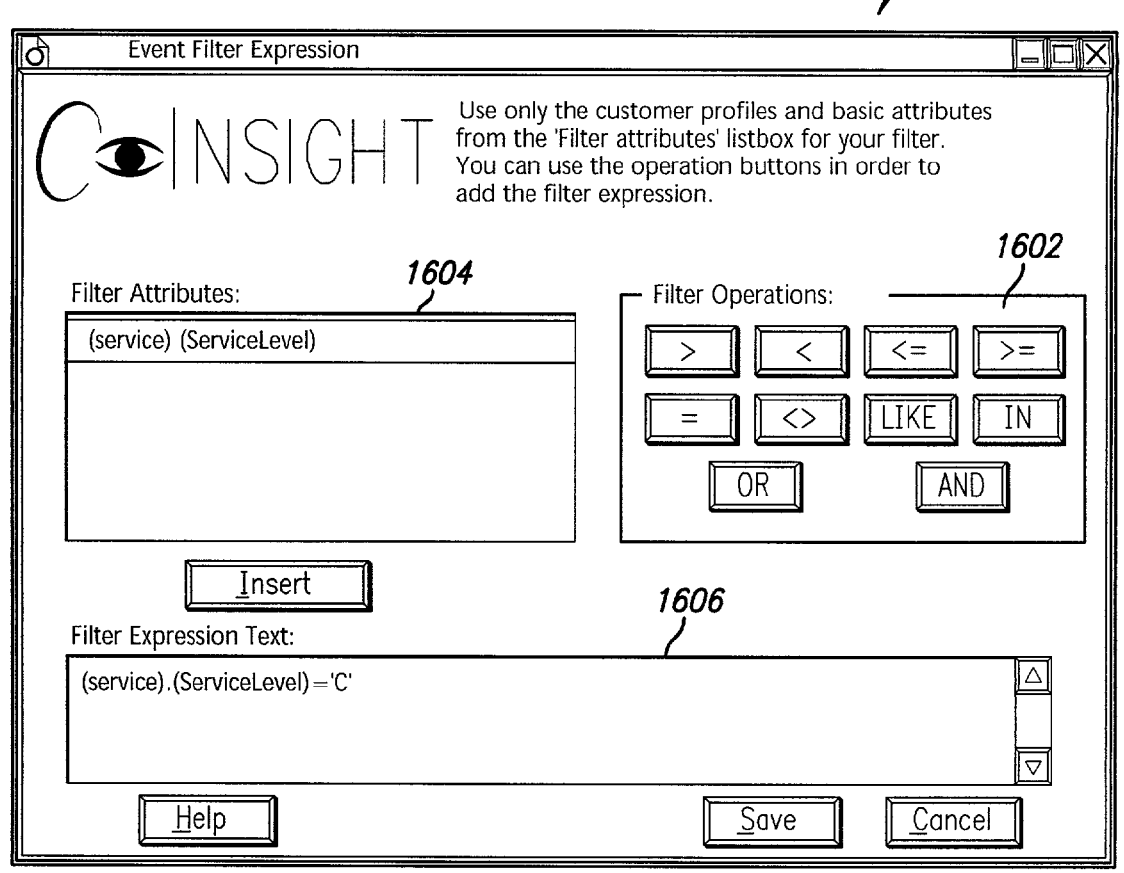
FIG. 16A illustrates a representative define node attribute dialog in a specific embodiment of the present invention.
Figure 16B:
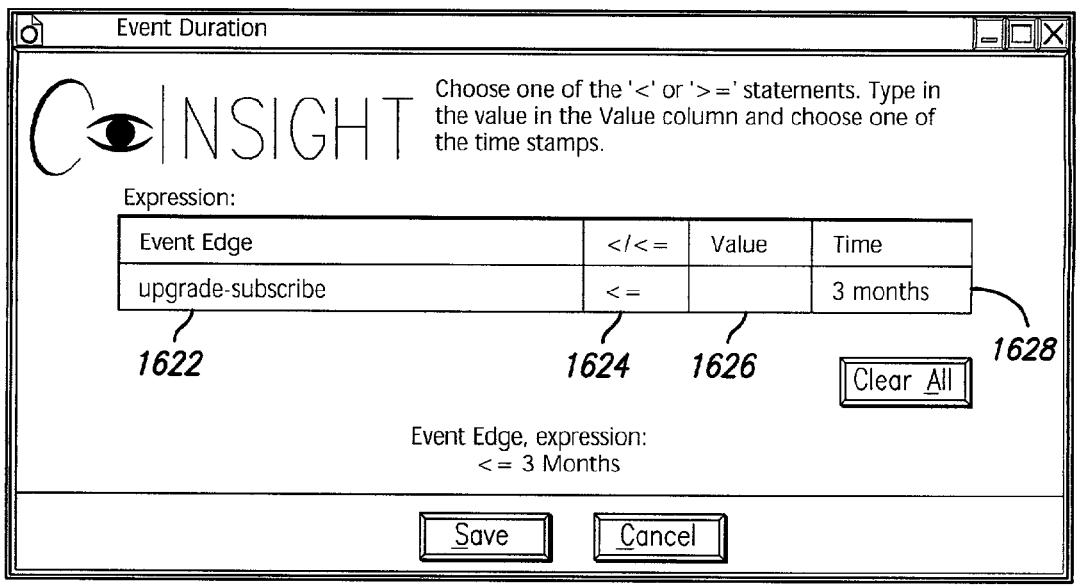
FIG. 16B illustrates a representative define edge attribute dialog in a specific embodiment of the present invention.

FIG. 15 illustrates another representative define event attribute dialog in another specific embodiment of the present invention. A define event attribute dialog 1520 comprises an attribute name field 1522, a description field 1524, an event graph pull down list 1526, and a graph area 1528, in which a user can enter information directly into nodes in an event graph 1530. In define event attribute dialog 1520, users may left click a node to select an event and/or right click a node to bring up a node filter expression dialog. Users can left click then right click an edge to specify a duration condition. In a specific embodiment, edges have a default condition of:

timestamp (event1)<timestamp (event2) if no condition is specified.

In a hypothetical example in a representative specific embodiment, a user selects all three nodes, i.e., 'subscribe' node 1532, 'upgrade' node 1534, and 'terminate' node 1536 of the event graph 1530. The user right clicks the "upgrade" node 1534 to invoke an event filter expression screen 1600 of FIG. 16A. Using the filter operations 1602, and filter attributes 1604, the user can build a filter expression 1606, which can be a Boolean condition, such as [service].[servicelevel]='C'. The filter attribute list contains numeric or string columns of event table and event table lookup tables except the PK, FKs, and event type columns.

The user can also configure edges. For an edge 1540 connecting 'subscribe' node 1532 to 'upgrade' node 1534, the user right clicks on edge 1540 to invoke an event duration screen 1620 of FIG. 16B. Using the edge selection field 1622, operation pull down list 1624, value input field 1626, time pull down list 1628 of screen 1620, the user can formulate an expression, such as specifying that the time duration is less than 3 months. This sequence of inputs indicates an event attribute that means subscribe, then upgrade to level 'C' in less than 1 month, then terminate. An upgrade termination duration has been defined, indicating upgrade termination.

In a specific embodiment, a resubscribe event node may be defined to indicate a cyclic event graph. For example, a user can define an event call resubscribe in an event graph like the following:

Subscribe ->terminate ->resubscribe

This sequence is equivalent to a cyclic event graph in which the events subscribe, then terminate, then subscribe.

Figure 17B:
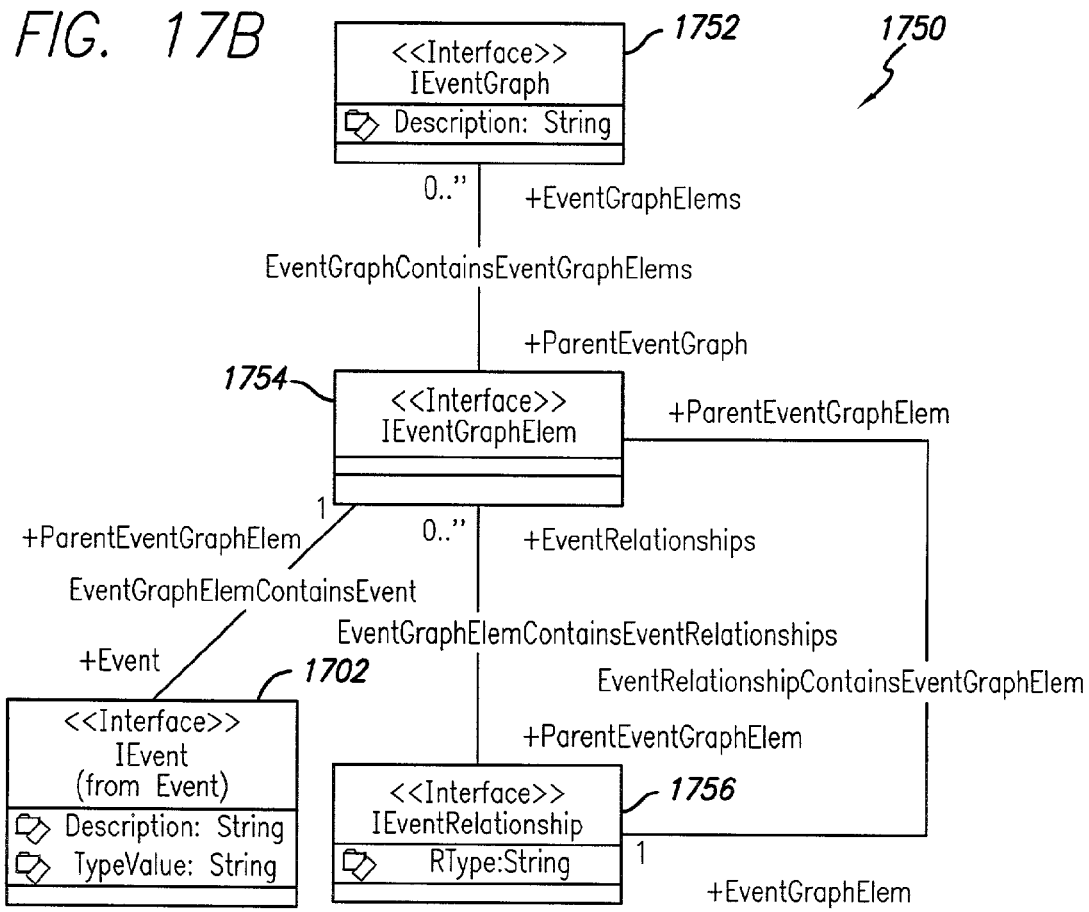
FIG. 17B illustrates a representative event graph diagram in a specific embodiment of the present invention.
Figure 17A:
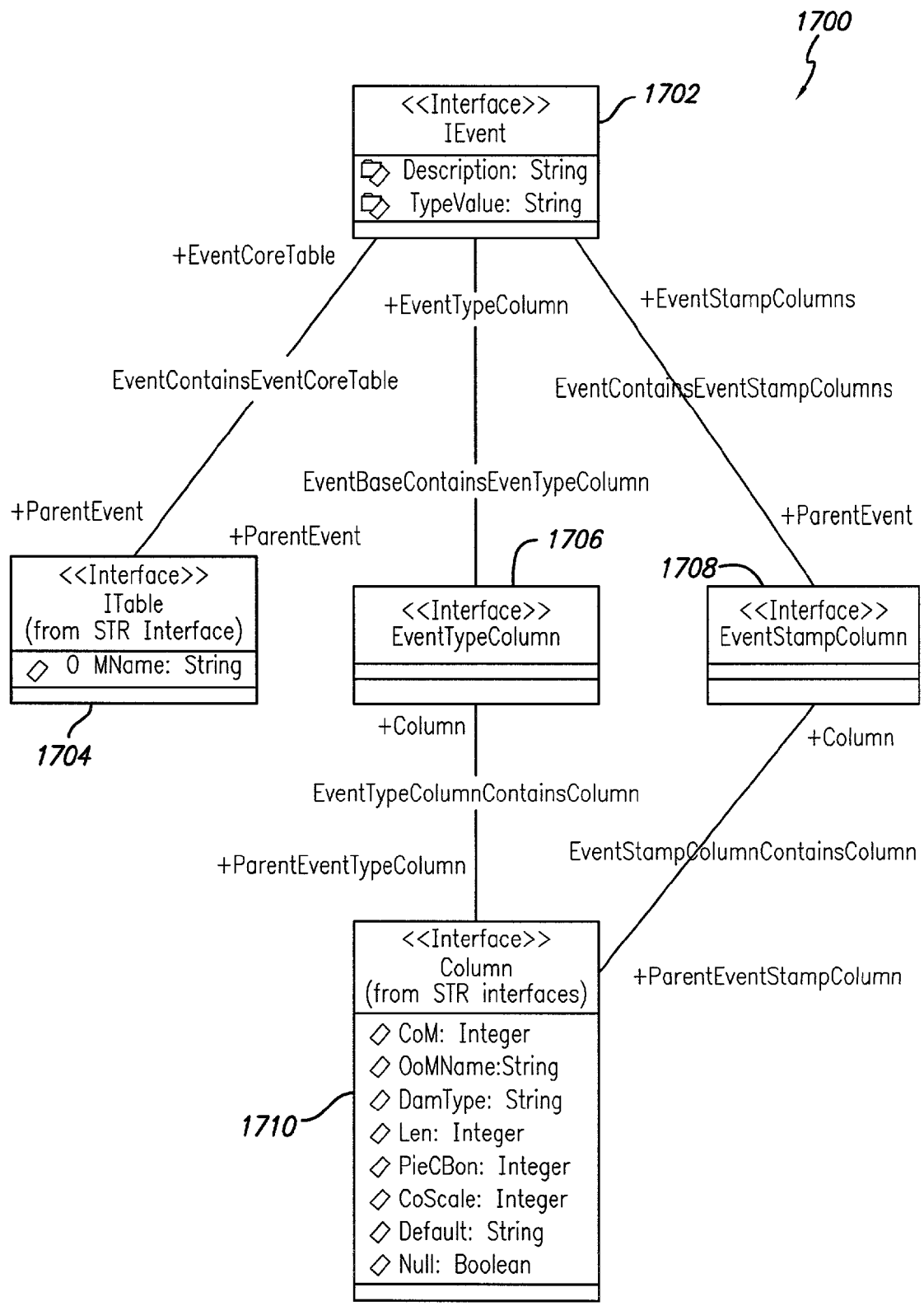
FIG. 17A illustrates a representative event model diagram in a specific embodiment of the present invention.

FIG. 17A illustrates a representative event model diagram in a specific embodiment of the present invention. Event model 1700 comprises a plurality of nodes and connections. Nodes represent information in tables of database 101. Connections represent relationships between the nodes. An event node 1702 comprises a description and typevalue. Both of these components are of data type string, however in other embodiments other data types can be used. Further, other or different data may be included in the nodes, one or more of the nodes depicted in event model 1700 may not be used in some specific embodiments, and in many specific embodiments, other nodes may be included in addition to or instead of the depicted nodes of event model 1700. In FIG. 17A, event node 1702 is connected to a table node 1704, an EventTypeColumn node 1706, and an EventTStampColumn node 1708. Both EventTypeColumn node 1706, and EventTStampColumn node 1708 are connected to a Column node 1710.

FIG. 17B illustrates a representative event graph diagram in a specific embodiment of the present invention. Event graph 1750 comprises a plurality of nodes and connections. Nodes represent information. Connections represent relationships between the nodes. An EventGraph node 1752 comprises a description of an event graph, such as event graph 1430 of FIG. 14. The EventGraph node 1752 is connected to an EventGraphElem node 1754. The EventGraphElem node 1754 represents one or more elements in the event graph, such as nodes 1432 and 1434 of FIG. 14. The EventGraphElem node 1754 is connected to an Event node 1702 of FIG. 17A, and an Event Relationship node 1756. The Event Relationship node 1756 indicates a relationship for EventGraphElem node 1754. In some specific embodiments, other or different data may be included in the nodes, one or more of the nodes depicted in event graph 1750 may not be used in some specific embodiments, and in many specific embodiments, other nodes may be included in addition to or instead of the depicted nodes of event graph 1750.

Figure 17C:
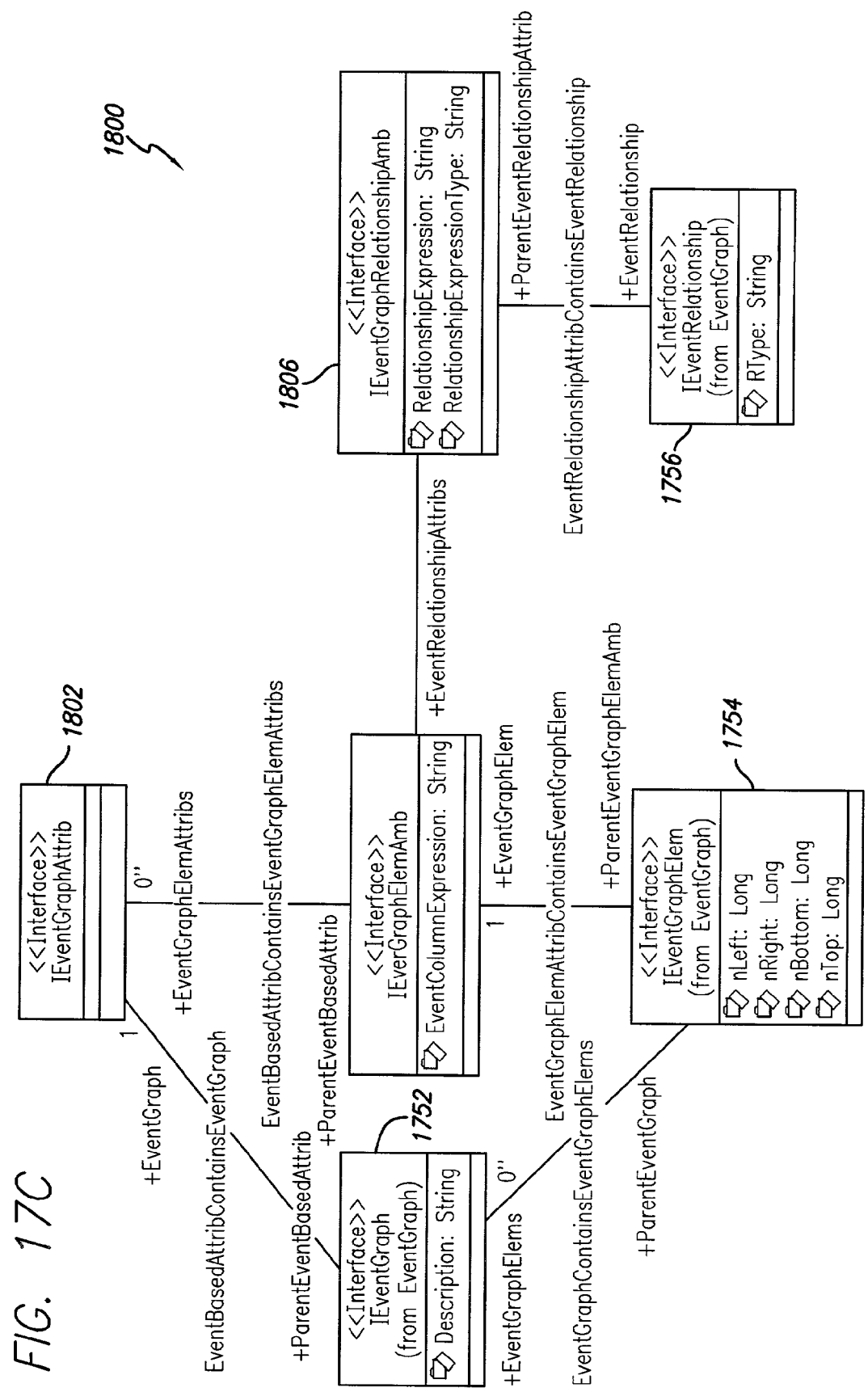
FIG. 17C illustrates a representative event based attribute diagram in a specific embodiment of the present invention.

FIG. 17C illustrates a representative event based attribute diagram in a specific embodiment of the present invention. Event based attribute model 1800 comprises a plurality of nodes and connections. Nodes represent information. Connections represent relationships between the nodes. EventGraph node 1752 of FIG. 17B is connected to an EventBasedAttrib node 1802, an EventGraphElemAttrib node 1804, and EventGraphElem node 1754 of FIG. 17B. The EventBasedAttrib node 1802 can provide attribute information about a specific event in the event graph. The EventGraphElemAttrib node 1804 is connected to an EventRelationshipAttrib node 1806 that can provide relationship attributes about the attributes in EventBasedAttrib node 1802. The EventRelationshipAttrib node 1806 is further connected to EventRelationship node 1756 of FIG. 17C. In some specific embodiments, other or different data may be included in the nodes, one or more of the nodes depicted in event based attribute model 1800 may not be used in some specific embodiments, and in many specific embodiments, other nodes may be included in addition to or instead of the depicted nodes of event based attribute model 1800.

In a specific embodiment, after the event attributes are input into the repository, the event attributes are processed in order to generate a result table call, CI_[EventAttributeName], which comprises two columns: (1) a [cids] column, comprising PK columns of the core table; and (2) an [EventAttributeName] column comprising a number of the occurrences of the event attribute for each id in the centric table. In specific embodiments, an SQL query is formulated in order to generate a result. A representative SQL statement in an example is shown below:

```
Centric PK id is cid
Event Tables are eventtab1 ... eventtabN
eventtabN-1.servicedate <= eventtabN.servicedate
Event1 ---->        Event2 ---->  ...      ---->EventN
|                   |                      |
contExpr1           cont1Expr2 ...         contExprN
typeVal1    typeVal2        ...            typeValN
    durExpr1        durExpr2               durExprN
where contExpr1x is the condition for event eventx
    durExprX is the duration expression between two events in format of
        datediff(day, eventtab1.servicedate, eventtab2.servicedate) > 10
1. Generate Table to gather all necessary information:
    select [cid], [eventdate], [eventtype] into TempX from [eventtabX] where
    [eventtype] = [typevalX] And contExprX
    ...
    Create union of all these tables into TempEV
    select * into TempEV from temp1
    union select * temp2 union
    ...
    union select * tempN
    select * into EventTab order by [cid], [eventdate]
2. Generate sql stmt to create store procedure as following example:
Create Procedure sp_CI_EVT_[Projname]_[EVTName] as
set nocount on
DECLARE @cid int, @servicetype as char(1), @servicedate datetime, @seq as int,
@CurrentID as int, @CurrentCNT as int, @CurrentType as char(1),
@start as int, @CurrentState as int,
@currentSDate as datetime, @CurrentUDate as datetime , @CurrentTDate as datetime
declare id_cursor cursor for
select customerid, servicedate, servicetype from temp1 order by customerid, servicedate
set @CurrentCNT = 0
set @CurrentType = 'S'
set @CurrentState = 0
set @start = 1
open id_cursor
delete from EventResult1
fetch next from id_cursor into @cid, @servicedate, @servicetype
while @@FETCH_STATUS = 0
Begin
if@start = 1
    Begin
        set @currentID = @cid
        set @start = 0 /* print 'start'*/
    End
if not @currentID = @cid
Begin
    set @currentID = @cid
        set @CurrentCNT = 0
    set @CurrentState = 0
End
if @servicetype = 'S' -- first event
    Begin
        set @CurrentState = 1
    set @CurrentSDate = @servicedate
    End
if @servicetype = 'U'
Begin
    if @CurrentState = 1
    Begin
    set @CurrentState = 2
    set @CurrentUDate = @servicedate
    End
    Else
    set @CurrentState = 0
End
if @servicetype = 'T'
    Begin
        if @CurrentState = 2
    Begin
```

-continued

```
    set @CurrentCNT = @CurrentCNT +1
    set @CurrentTDate = @ServiceDate
    insert into EventResult1 values (@currentID,
@CurrentSDate,@CurrentUDate,@CurrentTDate)
    End
        set @CurrentState = 0 -- last event
    End
fetch next from id_cursor into @cid, @servicedate, @servicetype
End
Close id_cursor
deallocate id_cursor
if @@error <> 0
    Begin
    return(1)
    End
return (0)
3. execute the procedure
4. select cid, count(*) into eventresult2 from eventresult1 where
        durexpr1 and ... and durexprN group by cid
5. do outer join with centric table to generate eventresult
6. create PK, FK for eventresult
```

The preceding has been a description of the preferred embodiment of the invention. It will be appreciated that deviations and modifications can be made without departing from the scope of the invention, which is defined by the appended claims.

What is claimed is:

1. A method, comprising:
   receiving an input of information indicating at least one of a plurality of events;
   receiving for each event an input of at least one of a plurality of attributes;
   displaying at least one node for each of said at least one of a plurality of events;
   displaying at least one of a plurality of edges for at least two of said plurality of events;
   wherein said at least one node for each of said at least one of a plurality of events and said at least one of a plurality of edges for at least two of said plurality of events form a graph; and
   thereupon creating a query to a database based upon said graph.

2. The method of claim 1, further comprising:
   receiving an input indicating a filter expression for information in said database; and
   storing said filter expression in said at least one node for each of said at least one of a plurality of events.

3. The method of claim 2, further comprising:
   a graphical user interface (GUI) with which said filter expression is defined.

4. The method of claim 1, wherein:
   said at least one of a plurality of attributes comprises at least one of a time, an event type, an event value.

5. The method of claim 1, further comprising:
   receiving an input indicating an event duration expression for information in said database; and
   storing said event duration expression in said at least one edge for each of said at least two of said plurality of events.

6. The method of claim 1, wherein
   said at least one of a plurality of edges is indicated by dragging and dropping a first one of said at least one of a plurality of events to a second one of said at least one of a plurality of events.

7. The method of claim 1, wherein:
   said at least one of a plurality of nodes corresponds to at least one of said plurality of events.

8. The method of claim 1, wherein:
   said at least one of a plurality of edges corresponds to a temporal relationship between said at least two of said plurality of events.

9. The method of claim 1, further comprising:
   opening said at least one of plurality of nodes; and
   selecting attribute information from a menu comprising a plurality of attributes for inclusion into said node.

10. The method of claim 1, comprising:
    opening said at least one of a plurality of edges; and
    selecting attribute information from a menu comprising a plurality of attributes for inclusion into said edge.

11. The method of claim 1, wherein creating a query to a database based upon said graph comprises:
    creating a query to a database based upon the at least one of a plurality of edges and the at least two of said plurality of events of the graph.

12. The method of claim 11, wherein creating a query to a database based upon the at least one of a plurality of edges and the at least two of said plurality of events of the graph comprises:
    converting a data structure to a query to a database.

13. An apparatus for managing information, comprising:
    a processor; and
    a memory, at least intermittently coupled with said processor;
    wherein said processor is operative to receive an input of information indicating at least one of a plurality of events; and to receive for each event an input of at least one of a plurality of attributes; and thereupon, said processor is operative to display at least one node for each of said at least one of a plurality of events and to display at least one of a plurality of edges for at least two of said plurality of events; and wherein said at least one node for each of said at least one of a plurality of events and said at least one of a plurality of edges for at least two of said plurality events form a graph; and thereupon said processor is operative to create a query to a database based upon said graph.

14. The apparatus of claim 13, wherein:
said processor is further operative to receive an input indicating a filter expression for information in said database; and store said filter expression in said at least one node for each of said at least one of a plurality of events.

15. The apparatus of claim 14, further comprising:
a graphical user interface (GUI) with which said filter expression is defined.

16. The apparatus of claim 14, wherein:
said processor is further operative to receive an input indicating an event duration expression for information in said database and store said event duration expression in said at least one edge for each of said at least two of said plurality of events.

17. The apparatus of claim 13, wherein:
said at least one of a plurality of attributes comprises at least one of a time, an event type, an event value.

18. The apparatus of claim 13, wherein:
said processor is further operative to receive an indication of said at least one of a plurality of edges, said indication comprising a dragging and dropping a first one of said at least one of a plurality of events to a second one of said at least one of a plurality of events.

19. The apparatus of claim 13, wherein:
said at least one of a plurality of nodes corresponds to at least one of said plurality of events.

20. The apparatus of claim 13, wherein:
said at least one of a plurality of edges corresponds to a temporal relationship between said at least two of said plurality of events.

21. A computer program product, comprising:
code that receives an input of information indicating at least one of a plurality of events;
code that receives for each event an input of at least one of a plurality of attributes;
code that displays at least one node for each of said at least one of a plurality of events;
code displays at least one of a plurality of edges for at least two of said plurality of events;
wherein said at least one node for each of said at least one of a plurality of events and said at least one of a plurality of edges for at least two of said plurality of events form a graph;
code that creates a query to a database based upon said graph; and
a computer readable storage medium for holding the codes.

22. The computer program product of claim 21, further comprising:
code that receives an input indicating a filter expression for information in said database; and
code that stores said filter expression in said at least one node for each of said at least one of a plurality of events.

23. The computer program product of claim 22, further comprising:
a graphical user interface (GUI) with which said filter expression is defined.

24. The computer program product of claim 21, wherein:
said at least one of a plurality of attributes comprises at least one of a time, an event type, an event value.

25. The computer program product of claim 21, further comprising:
code that receives an input indicating an event duration expression for information in said database; and
code that stores said event duration expression in said at least one edge for each of said at least two of said plurality of events.

26. The computer program product of claim 21, wherein said at least one of a plurality of edges is indicated by dragging and dropping a first one of said at least one of a plurality of events to a second one of said at least one of a plurality of events.

27. The computer program product of claim 21, wherein:
said at least one of a plurality of nodes corresponds to at least one of said plurality of events.

28. The computer program product of claim 21, wherein:
said at least one of a plurality of edges corresponds to a temporal relationship between said at least two of said plurality of events.

29. The computer program product of claim 21, further comprising:
code that opens said at least one of a plurality of nodes; and
code that selects attribute information from a menu comprising a plurality of attributes for inclusion into said node.

30. The computer program product of claim 21, further comprising:
code that opens said at least one of a plurality of edges; and
code that selects attribute information from a menu comprising a plurality of attributes for inclusion into said edge.

* * * * *

UNITED STATES PATENT AND TRADEMARK OFFICE
CERTIFICATE OF CORRECTION

PATENT NO.         : 7,111,010 B2  
APPLICATION NO. : 09/963145  
DATED                 : September 19, 2006  
INVENTOR(S)       : Chen It is certified that error appears in the above-identified patent and that said Letters Patent is hereby corrected as shown below:

On the Title Page,
Item (60), delete "60/265,373" and insert therefore --60/235,373--

Signed and Sealed this

Twelfth Day of December, 2006

JON W. DUDAS  
*Director of the United States Patent and Trademark Office*